(12) United States Patent
Klicpera

(10) Patent No.: US 9,749,792 B2
(45) Date of Patent: *Aug. 29, 2017

(54) WATER USE MONITORING APPARATUS

(71) Applicant: Michael Edward Klicpera, La Jolla, CA (US)

(72) Inventor: Michael Edward Klicpera, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,460

(22) Filed: Jan. 14, 2015

(65) Prior Publication Data
US 2016/0076909 A1    Mar. 17, 2016

Related U.S. Application Data

(63) Continuation-in-part of application No. 12/539,150, filed on Aug. 11, 2009, now Pat. No. 9,061,307, and
(Continued)

(51) Int. Cl.
| | |
|---|---|
| *E03B 7/07* | (2006.01) |
| *H04W 4/02* | (2009.01) |
| *G06Q 50/06* | (2012.01) |
| *F16K 31/05* | (2006.01) |
| *F16K 31/02* | (2006.01) |

(Continued)

(52) U.S. Cl.
CPC ............ *H04W 4/021* (2013.01); *E03B 7/071* (2013.01); *F16K 31/02* (2013.01); *F16K 31/05* (2013.01); *G01F 15/066* (2013.01); *G01F 15/0755* (2013.01); *G06Q 50/06* (2013.01); *G01F 1/10* (2013.01); *G01F 1/3209* (2013.01); *G01F 1/58* (2013.01); *G01F 1/66* (2013.01); *G01F 1/68* (2013.01); *G01F 1/84* (2013.01);
(Continued)

(58) Field of Classification Search
CPC ..... Y10T 137/86397; Y10T 137/86389; F16K 31/02; F16K 31/05; E03B 7/071
See application file for complete search history.

(56) References Cited

U.S. PATENT DOCUMENTS

| | | |
|---|---|---|
| 5,004,682 A | 4/1991 | Roberts |
| 5,580,791 A | 12/1996 | Thorpe et al. |

(Continued)

OTHER PUBLICATIONS

U.S. Appl. No. 10/228,784, filed Apr. 3, 2003, Chang.
(Continued)

*Primary Examiner* — Matthew W Jellett
(74) *Attorney, Agent, or Firm* — Michael Edward Klicpera

(57) ABSTRACT

The present invention is a water use and/or a water energy use monitoring apparatus that is affixed to the hot and cold water supply piping for continuously (or on demand) monitoring displaying the water and water energy (hot vs. ambient) use within a residential or commercial building. The water use monitor apparatus includes a power generation, a microprocessor, temperature and water flow sensors, optional water quality sensors, timing circuits, wireless circuitry, and a display means. A wired or wireless means is designed to electronically communicate water use, water energy use and/or water quality information to a remotely located display apparatus or typical cell phone, smart phones, or similar apparatus for convenient observation by a commercial, operator or occupier, resident, municipal or government agency.

34 Claims, 11 Drawing Sheets

Related U.S. Application Data a continuation-in-part of application No. 13/776,963, filed on Feb. 26, 2013, now Pat. No. 9,297,150, and a continuation-in-part of application No. 14/561,271, filed on Dec. 5, 2014, now Pat. No. 9,494,480.

(60) Provisional application No. 62/095,024, filed on Dec. 21, 2014.

(51) Int. Cl.
| | |
|---|---|
| *G01F 15/06* | (2006.01) |
| *G01F 15/075* | (2006.01) |
| *H04W 84/18* | (2009.01) |
| *G01F 1/10* | (2006.01) |
| *G01F 1/32* | (2006.01) |
| *G01F 1/58* | (2006.01) |
| *G01F 1/66* | (2006.01) |
| *G01F 1/68* | (2006.01) |
| *G01F 1/84* | (2006.01) |

(52) U.S. Cl.
CPC ...... *H04W 84/18* (2013.01); *Y10T 137/86389* (2015.04); *Y10T 137/86397* (2015.04)

(56) References Cited

U.S. PATENT DOCUMENTS

| | | |
|---|---|---|
| 6,246,677 B1 | 6/2001 | Nap et al. |
| 6,397,687 B1 | 6/2002 | Garmas |
| 6,543,479 B2 | 4/2003 | Coffey et al. |
| 6,556,142 B2 | 4/2003 | Dunstan |
| 6,997,064 B2 | 2/2006 | Bird et al. |
| 7,103,511 B2 | 9/2006 | Petite |
| 7,110,920 B2 | 9/2006 | McCarter et al. |
| 7,360,413 B2 | 4/2008 | Jeffries et al. |
| 8,214,496 B2 | 4/2009 | Gutt et al. |
| 7,711,796 B2 | 5/2010 | Gutt et al. |
| 8,073,931 B2 | 12/2011 | Dawes et al. |
| 8,086,702 B2 | 12/2011 | Baum et al. |
| 8,086,703 B2 | 12/2011 | Baum et al. |
| 8,122,131 B2 | 2/2012 | Baum et al. |
| 8,137,537 B2 | 3/2012 | Hirata et al. |
| 8,209,400 B2 | 6/2012 | Baum et al. |
| 8,335,842 B2 | 12/2012 | Raji et al. |
| 8,451,986 B2 | 5/2013 | Cohn et al. |
| 8,473,619 B2 | 6/2013 | Baum et al. |
| 8,477,011 B2 | 7/2013 | Tubb et al. |
| 8,478,844 B2 | 7/2013 | Baum et al. |
| 8,478,871 B2 | 7/2013 | Gutt et al. |
| 8,612,591 B2 | 12/2013 | Dawes et al. |
| 8,621,206 B2 | 12/2013 | Chang |
| 8,635,499 B2 | 1/2014 | Cohn et al. |
| 8,638,211 B2 | 1/2014 | Cohn et al. |
| 8,713,132 B2 | 4/2014 | Baum et al. |
| 8,819,178 B2 | 8/2014 | Baum et al. |
| 8,822,175 B2 | 9/2014 | Gibson |
| 8,825,871 B2 | 9/2014 | Baum et al. |
| 8,836,467 B1 | 9/2014 | Cohn et al. |
| 8,963,713 B2 | 2/2015 | Dawes et al. |
| 8,988,221 B2 | 3/2015 | Raji et al. |
| 8,996,665 B2 | 3/2015 | Baum et al. |
| 9,047,753 B2 | 6/2015 | Dawes et al. |
| 9,059,863 B2 | 6/2015 | Baum et al. |
| 9,100,446 B2 | 8/2015 | Cohn et al. |
| 9,141,276 B2 | 9/2015 | Dawes et al. |
| 9,144,143 B2 | 9/2015 | Raji et al. |
| 9,147,337 B2 | 9/2015 | Cohn et al. |
| 9,172,553 B2 | 10/2015 | Dawes et al. |
| 2005/0270173 A1* | 12/2005 | Boaz .................. H04Q 9/00 340/870.02 |
| 2006/0168611 A1* | 7/2006 | Fima .................. E03B 1/00 725/10 |
| 2008/0183842 A1 | 7/2008 | Raji et al. |
| 2009/0096586 A1 | 4/2009 | Tubb |
| 2009/0207017 A1 | 8/2009 | Erickson |
| 2010/0082744 A1 | 4/2010 | Raji et al. |
| 2014/0320304 A1 | 10/2014 | Blackwell et al. |

OTHER PUBLICATIONS

U.S. Appl. No. 10/142,302, filed Nov. 13, 2003, Kimberlain, et al.
U.S. Appl. No. 10/145,409, filed Feb. 11, 2003, Kimberlain et al.
U.S. Appl. No. 10/618,308, filed Apr. 15, 2004, Doan.
U.S. Appl. No. 12/025,196, filed Aug. 7, 2008, Chang.
U.S. Appl. No. 13/196,328, filed Feb. 2, 2012, Chang.
U.S. Appl. No. 14/089,317, filed Mar. 20, 2014, Chang.

* cited by examiner

Fig. 7

Water Use

| | | |
|---|---|---|
| Average Time: | 10 | minutes |
| Average Water Use: | 9.5 | liters/minute |
| Water Cost: | 7.6 | per 3785 liters |

Water Heater Use

| | | |
|---|---|---|
| Energy Type | Natural Gas | |
| State | California | |
| Cost | 2.043 | per Therm |
| Efficiency | 0.94 | |
| Avg. Ambient Water Temp. | 12.8 | centigrade |
| Desired Shower Temperature | 46.5 | centigrade |

Water Use (liters)

|  | Day | Week | Month | Year | 2 Year |
|---|---|---|---|---|---|
| Water | 284 | 1988 | 8520 | 103660 | 207320 |
| Energy | 0.31 | 2.59 | 7.37 | 89.58 | 179.2 |

Water Cost (San Diego)

|  | Day | Week | Month | Year | 2 Year |
|---|---|---|---|---|---|
| Water | $1.87 | $13.1 | $56.06 | $682.6 | $1365.1 |

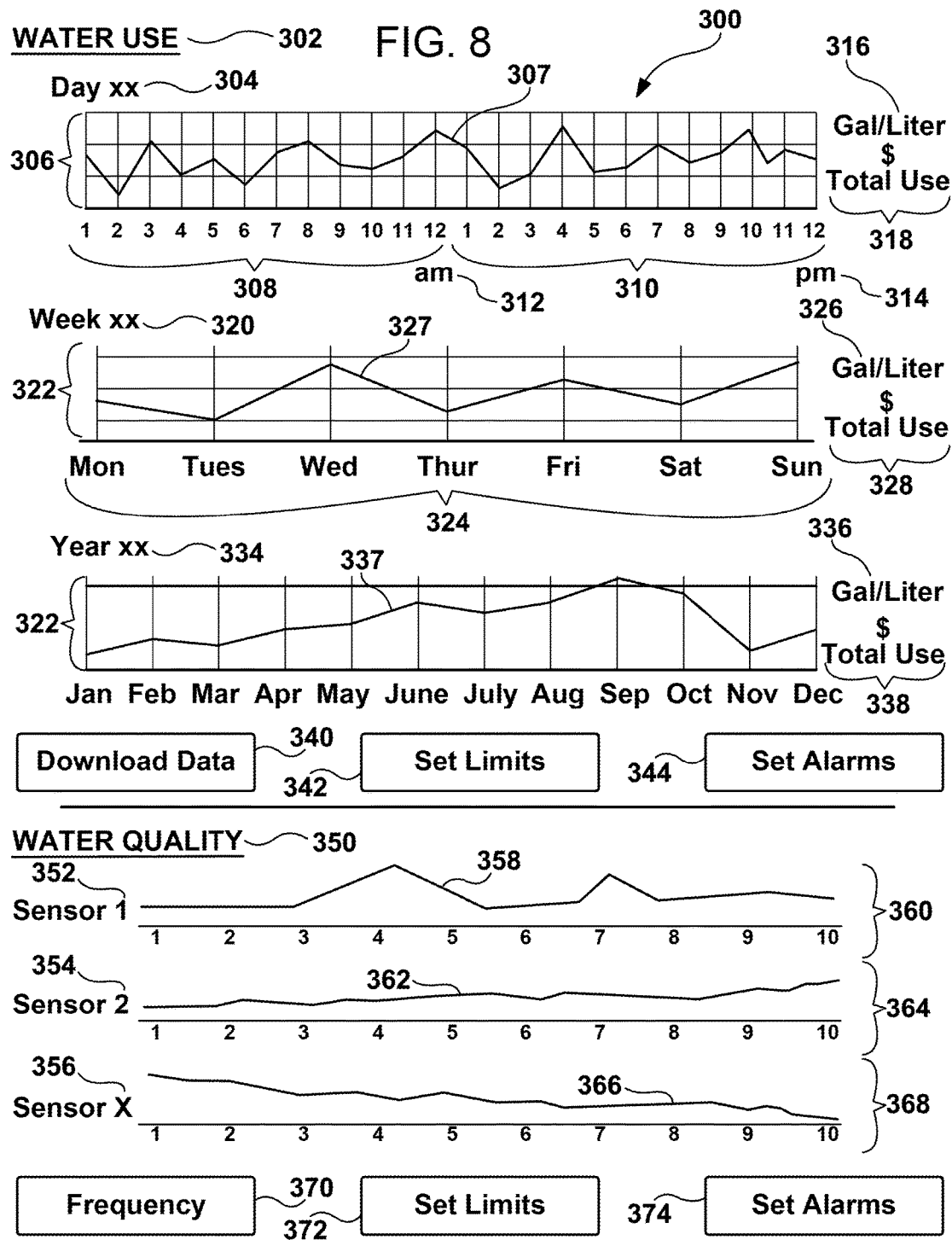

WATER USE MONITORING APPARATUS

RELATED APPLICATIONS

This Patent Application is a continuation-in-part of U.S. patent application Ser. No. 14/561,271 filed on Dec. 5, 2014, U.S. patent application Ser. No. 13/776,963 filed on Feb. 26, 2013, and U.S. patent application Ser. No. 12/539,150 filed on Aug. 11, 2009. All of these Patent Applications are incorporated herein by this reference in its entirety.

FIELD OF THE INVENTION

This apparatus and the method of use relates to a metering apparatus integrated with residential or commercial water supply piping, more particularly, relates to a water use with or without a water energy use monitoring apparatus. This apparatus has the capability of communicating with an optional remote display for viewing and recording within a residential or commercial building, and/or with an optional remote display for viewing or recording for a resident or company user/owner, government or municipal purposes.

BACKGROUND OF THE INVENTION

Water conservation is becoming a major issue for many cities, towns, and communities, and an apparatus for monitoring water and water energy uses at specific residential, corporate, (or government) sites could be useful in supporting water conservation and in assessing and controlling water resources.

Several municipalities are considering or have enacted water conservation laws or ordinances. For example, the city of San Diego, Calif. has considered enacting an ordinance requiring new multi-housing to include a secondary means for monitoring water use. Florida's Miami-Dade County Ordinance 08-14, effective on Jan. 1, 2009, defined restricted toilet, urinals, faucet and shower head water flow. California Assembly Bill 715 phases in lower flush volume requirements for water closets and urinals. Texas House Bill 2667 mandates showerhead ratings of <2.5 gallons per minutes and urinal flush volumes <0.5 gallons per flush. Los Angeles, Calif.'s High Efficiency Plumbing Fixtures Ordinance contains requirements to install high efficiency water fixtures for all new buildings and renovations.

For non-water related operations, the SmartMeter™ System, manufactured by GE and Landis+Gyr, collects electric and natural gas use data from a home or business. The SmartMetert™'s electric meter records and transfers residential electric use hourly, and commercial electric use in 15 minute increments. The SmartMeter™'s natural gas module(s) attached to a gas meters records daily gas use. The data collected by the SmartMeter™ is periodically transmitted via a secure wireless communication network. The SmartMeter™ system uses programmable solid-state meter technology that provides two-way communication between the meter at your home or business and the utility, using secure wireless network technology.

The solid-state digital Smart Meter™ electric meter records hourly meter reads and periodically transmits the reads via a dedicated radio frequency (RF) network back to a defined municipality. Each SmartMeter™ electric meter is equipped with a network radio, which transmits meter data to an electric network access point. The system uses RF mesh technology, which allows meters and other sensing devices to securely route data via nearby meters and relay devices, creating a "mesh" of network coverage. The system supports two-way communication between the meter and PG&E. SmartMeter™ electric meters can be upgraded remotely, providing the ability to implement future innovations easily and securely.

The electric network access point collects meter data from nearby electric meters and periodically transfers this data to defined municipality via a secure cellular network. Each RF mesh-enabled device (meters, relays) is connected to several other mesh-enabled devices, which function as signal repeaters, relaying the data to an access point. The access point device aggregates, encrypts, and sends the data back to the defined municipality over a secure commercial third-party network. The resulting RF mesh network can span large distances and reliably transmit data over rough or difficult terrain. If a meter or other transmitter drops out of the network, its neighbors find another route. The mesh continually optimizes routing to ensure information is passed from its source to its destination as quickly and efficiently as possible.

Most residential and commercial water supply lines have a primary water meter. However, the location of the primary water meter is usually not readily available or not in a convenient location for a commercial owner or occupier, or a resident to observe. Even if the primary water meter is available for review by a commercial owner or occupier, or resident, the display is a simple continuous or cumulative gauge that does not allow the reader to readily monitor their daily, weekly, monthly, and annual water uses. Furthermore, the primary water meter does not have the capability to wirelessly transfer water use information to a remote display (or recorder with data collection/database) that is conveniently located for review by the owner or occupant of a residence or building to encourage water conservation. In addition, the primary water meter only monitors commercial or residential supply water, and there is no capability to analyze hot and/or cold water use to provide water energy use information or distinguish between indoor and outdoor water use.

Accordingly, a need remains for a primary or secondary water monitor that is conveniently located in a commercial or residential setting and provides readily available water use in a format for encouraging water conservation.

Further accordingly, a need remains for a primary or secondary water monitor that is conveniently located in a commercial or residential setting that has wireless capability for displaying water use information to a remote display that is suitably located for observation by a commercial operator or occupier, or resident.

Further accordingly, a need remains for a primary or secondary water monitor that is conveniently located in a commercial or residential setting that has wireless capability for displaying and recording water use information for governmental or municipal operators or agencies.

Further accordingly, a need remains for a primary or secondary water monitor that is conveniently installed in a commercial or residential water supply line that captures hot and/or cold water use and can provide water energy calculation(s).

Further accordingly, a need remains for a primary or secondary water monitor that is installed in a commercial or residential water supply line that independently captures indoor and outdoor water use.

Further accordingly, a need remains for a primary or secondary water monitor that is conveniently installed in a commercial or residential water supply line that monitors for leaking conditions and can communicate this alarming situation by wireless communication to an owner or occupant of a residence or commercial building.

SUMMARY OF THE INVENTION

The present invention comprises a water use and water energy use monitoring display apparatus having a base station attached to a water supply with wireless or wire capability to communicate with one or more remote display and for recording apparatus devices. More specifically the present invention is a water use and/or a water energy use monitoring apparatus base station that is affixed to the water supply piping (connected to either connected to the cold and hot water supply lines) for continuous, or on demand, monitoring the water and water energy (hot vs. ambient) or in another embodiment the single water supply line used within a residential or commercial building. In addition, the present invention could be used with non-commercial water sources such as private wells and other non-commercial water sources. The water use and water energy use monitoring display apparatus base station can optionally have a display means for displaying a plurality of water parameters. A first wire or wireless means is incorporated to a remote display and/or recording display for viewing water parameter data by the commercial owner, occupier or home/apartment/condominium resident. A second wire or wireless means is designed for monitoring and recording water parameter data by civil, commercial, governmental or municipal operators or agencies, using a remote display and/or recorder means connected by a secure wire or wireless communication network. A third wireless communication means is designed to use cellular format technology to transmit water and water energy parameter data to a remote location. The housing of the water use monitor apparatus base station or the display/recording remotes can be fabricated from materials (e.g. a polymeric or metallic or any combination and possibly include chrome, brass white or colored finishes or combination of these finishes and materials of construction). The water use monitor apparatus base station includes a power generation, a microprocessor, temperature sensor, water flow sensor and optional water quality sensors, optional high sensitive water flow sensor for detecting leaking conditions and providing a separate data for indoor and outdoor water use, timing circuits, wireless circuitry, and an optional display means. Ergonomically placed buttons or touch screen technology can be integrated with this optional display as the base station or the display and recording remotes to change parameter units (e.g. metric to US), set alarm conditions (e.g. volume set points), calibrate sensors, and program features (e.g. change the language, input a cell, mobile or standard telephone number for certain communications). A first wired or wireless means is designed to electronically communicate the water use and/or water energy use information to a remotely located display for convenient observation by a commercial operator or occupier, or home/apartment/condominium resident. A secondary wireless means is designed to electronically and wirelessly communicate water and water energy use information to governmental or municipal operators or agencies. A third wireless means is designed for communicating to an offsite central monitoring computer or cell, mobile or other telephone lines via satellite, microwave technology, the internet, cell tower, telephone lines, and the like to a governmental or municipal operator or a residential or corporate owner.

BRIEF DESCRIPTION OF THE DRAWINGS

FIG. 1 is a perspective view of the embodiment comprising the water use and water energy use monitoring display apparatus base station affixed to the input cold and hot water supply piping for continuously monitoring of the water and energy use within a residential or commercial building. Also shown in FIG. 1 is the optional wireless or wired capability of the water use and a water energy use monitoring apparatus for communicating water use and water energy use information to a conveniently located remote display/recorder for the commercial operator or occupier or residential individual and an optional display/recorder for a governmental, civil, commercial or municipal operators or agencies. In addition, FIG. 1 also shows a wireless means for communicating to an offsite central monitoring computer or cell, mobile or other telephone lines via satellite, microwave technology, the internet, cell tower, telephone lines, and the like.

FIG. 7 is an example of a water energy data format that uses cold/ambient water and hot water to provide water usage and water energy costs.

FIG. 8 is a perspective view of a first application (APP), or a first page of a application (APP), displayed on a typical cell phone, smart phone or similar apparatus.

Corresponding reference characters indicate corresponding parts throughout the several views. The exemplifications set out herein illustrate example embodiments of the invention, and such exemplifications are not to be construed as limiting the scope of the invention in any manner.

DESCRIPTION OF THE PREFERRED EMBODIMENTS

Figure 1:
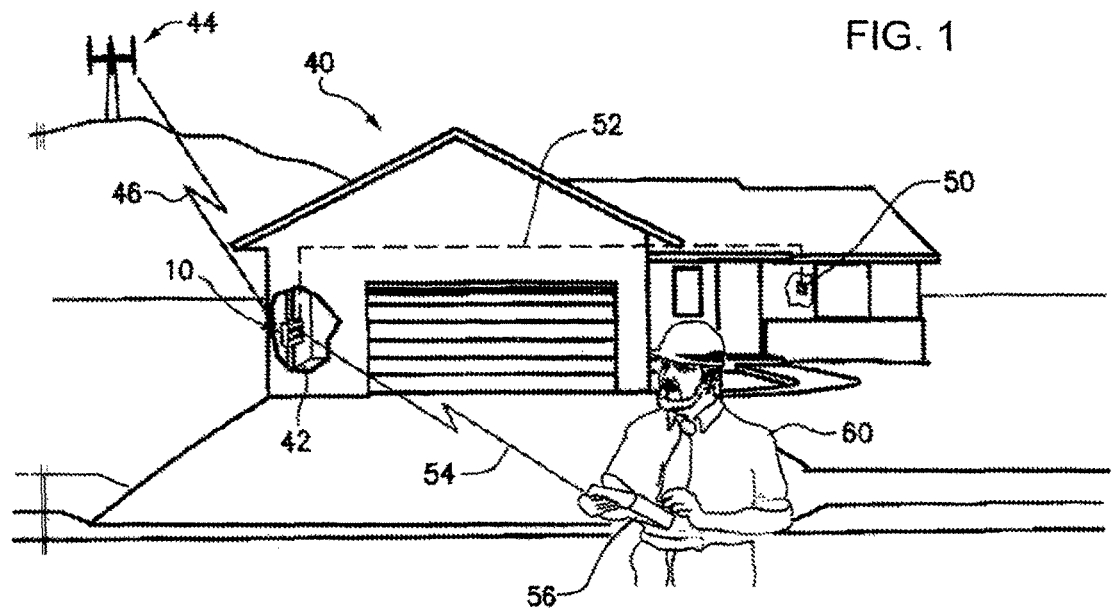

Definitions of word or phrases to be used herein are presented below:

Water Use refers to the total volume of water used over a period of time.

Water Energy Use refers to the ratio of cold or ambient water to heated water use or to the ratio of hot water to total water use or as further defined herein.

Residential and Commercial operations refer to multi-unit apartment buildings, condominiums, hospitals, dormitories, commercial office buildings, homes, and the like.

Encryption refers to a privacy technology that prevents anyone but the intended recipient(s) to download, review or read confidential information and data.

Authentication refers to the technology that ensures that a message, data or information that is downloaded or transferred from a one person or device to another declared or intended person or device.

Integrity refers to technology that ensures that a message, information or data does not alter in any way during transit.

Non-repudiation refers to the technology that prevents a sender from denying that a message, data or information was sent.

Cellular format technology refers to all current and future variants, revisions and generations (e.g. third generation (3G), fourth generation (4G), fifth generation (5G) and all future generations) of Global System for Mobile Communication (GSM), General Packet Radio Service (GPSR), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA, Integrated Digital Enhance Network (iDEN), HSPA+, WiMAX, LTE, Flash-OFDM, HIPERMAN, WiFi, IBurst, UMTS, W-CDMA, HSPDA+HSUPA, UMTS-TDD and other formats for utilizing cell phone technology, antenna distributions and/or any combinations thereof, and including the use of satellite, microwave technology, the internet, cell tower, and/or telephone lines.

A typical cell phone, smart phones, or other electronic apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the APPLE®, SAMSUNG®, HP®, ACER®, MICROSOFT®, NOOK®, GOOGLE®, SONY®, KINDLE® and other tablets manufactured by these and other manufactures), APPLE TOUCH®, a smart or internet capable television, wireless timepiece or watch (APPLE®, SAMSUNG®) and other electronic apparatus with WIFI and wireless capability, and remote computers and controllers having internet, wireless and/or cell format technology connectivity.

Geo-fencing generally refers to a radius around a home, corporation or point location or can be a predefined set of boundaries, like school attendance zones or neighborhood boundaries. When a device having geo-fencing technology of a location-based service enters or exits a geo-fence area, the device receives a generated notification of such entrance, exit or movement. This notification might contain specific information about the location of the device or simply utilized the location information to a remote apparatus. The device having geo-fencing generally uses GPS (global positional system) for location determination but with multiple cell towers servicing a cell phone, smart phone or similar apparatus, the multiple cell towers format can utilize triangulation or multi-lateration of radio signals between (several) radio towers of the network and the phone. To locate the phone using multi-lateration of radio signals, it must emit at least one other signal (roaming) to contact the next nearby antenna or cell tower and this location process does not require an active call. GSM cell phone technology is based on the signal strength to nearby antennas. The technology of locating is based on measuring power levels and antenna patterns and uses the concept that a powered mobile phone always communicates wirelessly with one of the closest base stations, so knowledge of the location of the base station implies the cell phone is nearby. Advanced systems determine the sector in which the mobile phone resides and roughly estimate also the distance to the base station. Further approximation can be done by interpolating signals between adjacent antenna towers. Geo-fencing processes may achieve a precision of down to 25-75 feet in urban areas where mobile traffic and density of antenna towers is sufficiently high whereas. Rural and desolate areas may see miles between base stations and therefore determine locations is obviously less precise. Wifi data can also be used to identify a cell phone, smart phone or similar apparatus location. Indoor environment creates problems and has poor performance of the GPS-based methods whereas WiFi technology is designed to provide another method to provide location of Geo-fencing technology. Many current cell phones, smart phones and similar apparatus combine GPS with Wi-Fi for both active calling and positioning systems. When a device with geo-fencing technology exist or enters a defined area, a notice might be sent to a cell phone, smart phone or similar apparatus, to an email account, to a text (SMS), or to perform a or software operation. Geo-fencing allows users of the system to draw zones around places of residence or corporations, customer's sites and secure areas.

The term "water use" apparatus generally refers to apparatuses that are connected to a water supply and have a water control valve or flow control mechanism to turn on and off the water supply, such as irrigation valves and systems, hot water heaters, washing machines, dishwashers, kitchen faucets, bathroom faucets, showers, toilets, refrigerators with water supply and ice makers, Jacuzzi and pools with water supplies, decorative fountains, any other water use devices.

There are two embodiments shown in the drawings and described in the specification. The first embodiment is a water use and water energy monitoring apparatus having a base station 10 that is positioned in close proximity to the hot and cold or ambient water supply. The second embodiment is a water use monitoring apparatus has a base station 126 that is positioned in close proximity to only the cold or ambient water supply and not to the hot water supply. Many of the features, characteristics and components described in this specification are common between the apparatus 10 and apparatus 126 and hence are interchangeable. In the regard and in an effort to minimize redundancy, many of the common features, characteristics and components are referenced commonly as apparatus 10, 126.

Referring now to the drawings and particularly to FIG. 1 is a perspective view of the first embodiment comprising the comprising the water use monitoring display apparatus base station 10 affixed to the hot and cold (see second embodiment 126 in FIG. 6) water supply piping in an appropriate location for water monitoring 42 and for continuously monitoring of the water and water energy use within a residential or commercial building 40. This can be useful for an individual or commercial operator employing water conservation methods (e.g. reduce the sprinkler frequency or duration, encourage individuals to take shorter showers, fix leaking devices). Alternately, the monitoring of indoor water use and outdoor water use could be utilized by the particular water supplying municipality or government agency to apply different rates for indoor water use and outdoor water use. In addition, since many municipal agencies include a sewer cost in a ratio of the total supply use, the difference between indoor water use and outdoor water use can reduced the total sewer cost associated with only the indoor use, thus saving the consumer costs. In certain situations, a control valve can be located at a particular location, e.g. the irrigation valve or ball valve whereby by utilizing the two-way wireless capability of the present invention apparatus 10, 126 whereby the owner, water supplying municipality or government agency can remotely control water use (e.g. turn the main water supply off after a leaking notice, send out a code that inhibits outdoor water use on certain days or at certain hours of the day). For accurate measurements of water use or water energy use the present invention should be installed between the pressure reducing valve or civil, commercial, governmental or municipal supply water sources (with potential meter) and/or any distribution lines. It is also anticipated by the Applicant that present invention can be used on wells and in situations where the water source is not obtained from a commercial or municipal operations. The water use and water energy use monitoring apparatus base station 10, 126 can update, upload or download water and energy use on various frequencies, e.g. once per minute, once per hour, once per day, or can send information upon sensing the initiation of water use (after no water use period) on the display/recorder screen (shown in FIG. 2).

Also shown in FIG. 1 is a first wired or wireless communication means 52 from the water use and water energy use monitoring apparatus base station 10, 126 for communicating water use and water energy use information or data to a conveniently located first display and/or recorder apparatus 50 (defined in more detail in FIG. 5) located in a convenient location for the commercial operator or occupier or residential individual to observe daily, weekly, monthly or annual water use. The water use and water energy use monitoring apparatus base station 10, 126 can be programmed to communicate at other time frequencies, such as every 5 seconds or every minute, for various purposes, for example, to identify leaking conditions. The first wireless communication means 52 preferably utilizes encryption, authentic, integrity and non-repudiate techniques to provide a secure transfer of the water and energy use from the water/energy use from the monitoring base station apparatus 10, 126 to the first remote and/or recorder 50. The first wired or wireless communication means 52 can send data on various frequencies, e.g. once per minute, once per hour, once per day, or can send information upon sensing an initiation to the first remote and/or recorder 50 or atypical cell phone, smart phones, or similar apparatus (see FIG. 9). Furthermore, the first wired or wireless communication means 52 can send data or information upon the sending of a request signal. The request signal can be generated by, for example, the pushing of a requesting button located on the first remote display and/or recorder 50 that transmits a request for water and energy use data to the water and energy monitoring apparatus base station 10, 126. The use of the request signal can minimize the use of wireless signals within the house or commercial building, conserving energy, minimizing the interference with other wireless devices, and reduce the exposure of wireless energy to individuals. Furthermore, the first wireless communication means 52 can consist of two-way transmission, commonly known as transceiver technology, such that the monitoring display apparatus base station 10, 126 can transmit and receive electronic signals from the first display and/or recording apparatus 50 and similarly, and the first display and/or recording apparatus 50 can transmit and receive electronic signals from the monitoring display apparatus base station 10, 126. The first wired or wireless communication 52 can be either one-way transmission, or half duplex and/or full duplex two-way transmission.

The second optional wireless communication means 54 is preferred to transit, upload or download water parameter data or information via a secure wireless communication network providing information to a governmental, civil or municipal employee or individual 60 using a second remote display and/or recorder apparatus 56 (or a typical cell phone, smart phones, or similar apparatus as shown in FIG. 9) for property owners, governmental, civil, commercial or municipal operators or agencies purposes. It is anticipated that the second wireless communication means 54 can also be received by a moving vehicle or can communicate with cellular format technology utilizing cell towers 44 using another third wireless communication 46. The second optional wireless communication means 54 preferably utilizes encryption, authentic, integrity and non-repudiate techniques to provide a secure transfer of the water and energy use from the water monitoring display base station 10, 126 to the second remote display and/or recorder apparatus 56. Also, the second wireless communication means 54 should include specific identification information e.g. house or commercial building address, IP address or other specific technology. The second optional wireless communication means 56 can send data on various frequencies, e.g. once per minute, once per hour, once per day, or can send information upon sensing an initiation to the second remote and/or recorder 56. The water use and water energy use monitoring apparatus base station 10, 126 can be programmed to communicate at other time frequencies, such as every 5 seconds or every minute, for various purposes, for example, to identify leaking conditions. Furthermore, the second optional wireless 56 communication means can send data or information upon the sending of a request signal. The request signal can be generated by, for example, the pushing of a requesting button located on the second remote display and/or recorder 56 that transmits a request for water and energy use data to the water and energy monitoring apparatus base station 10, 126. The use of the request signal can minimize the use of wireless signals within the house or commercial building, conserving energy, minimizing the interference with other wireless devices, and reduce the exposure of wireless energy to individuals. Furthermore, the second wireless communication means 54 can consist of two-way transmission, commonly known as transceiver technology, such that the monitoring display apparatus base station 10, 126 can transmit and receive electronic signals from the second optional display and/or recording apparatus 56 and similarly, and the second optional display and/or recording apparatus can transmit and receive electronic signals from the monitoring display apparatus base station 10, 126. Hence, the second optional wireless communication means 46 can be either one-way transmission, or half duplex and/or full duplex two-way transmission.

The third optional wireless communication means 46 is designed to communicate data under a cellular format technology with offsite central monitoring computer or cell, mobile or other telephone lines via satellite, microwave technology, the internet, cell tower, telephone lines, and the like. It is anticipated that the third wireless communication means 46 can transmit information to a programmed cell or phone number for communicating water parameter data or alarm situations to the owner or a municipal/governmental agency (such as announcing a water leak situation). Also, the third wireless communication means 46 should include specific identification information e.g. house or commercial building address, IP address or other specific technology. The third wireless communication means 46 can send data on various frequencies, e.g. once per minute, once per hour, once per day, or can send information upon sensing the initiation (alarm situation) to the programmed cell or phone number. The water use and water energy use monitoring apparatus base station 10, 126 can be programmed to communicate at other time frequencies, such as every 5 seconds or every minute, for various purposes, for example, to identify leaking conditions. The request signal can be generated by, for example, a request signal transmitted by a remote station (not shown). The use of the request signal can minimize the use of wireless signals within the house or commercial building, conserving energy, minimizing the interference with other wireless devices, and reduce the exposure of wireless energy to individuals. Furthermore, the third wireless communication means 46 can consist of two-way transmission, commonly known as transceiver technology, such that the monitoring display apparatus base station 10, 126 can transmit and receive electronic signals from the remote station and similarly, the remote station can transmit and receive electronic signals from the water use and water energy use monitoring display apparatus base station 10, 126. The third wireless means 46 can also be designed for communicating to an offsite central monitoring computer or cell, mobile or other telephone lines via satellite, microwave technology, the internet, cell tower, telephone lines, and the like. The third communication means 46 can also comprise a RF mesh-enabled device (meters, relays) is connected to several other mesh-enabled devices, which function as signal repeaters, relaying the data to an access point. The access point device aggregates, encrypts, and sends the data back to a municipal or government agency over a secure commercial third-party network. The resulting RF mesh network can span large distances and reliably transmit data over rough or difficult terrain. If a meter or other transmitter drops out of the network, its neighbors find another route. The mesh continually optimizes routing to ensure information is passed from its source to its destination as quickly and efficiently as possible. Furthermore, it is anticipated that the third wireless means can "piggy back" or be designed to be incorporated into and/or cooperation with electric and gas smart meters communication/transmission mesh technology. This takes advantage of the communication/transmission mesh means already in place thereby, minimizes cross talk and cross interference in wireless transmissions, and minimized overall wireless signals in residential or commercial area. The terminal communication/transmission of water parameter data can designed to be sent to a difference source, e.g. water municipality versus the electric or gas company. The third optional wireless communication can be either one-way transmission, or half duplex and/or full duplex two-way transmission. This third wireless technology 46 is designed for long range uses that can communicate with remote computers, for example, property owners, municipal and government uses, control, and billing practices. It is anticipated that the billing practices can be conducted by an independent corporate entity. This third wireless technology 46 can also be used to communicate with a home resident or corporate individual on their typical cell phone, smart phones, or similar apparatus 400 (see FIG. 9).

Of all smart meter technologies, one critical technological problems of the present invention is secure data communication. Each base station 10, 126 must be able to reliably and securely communicate the information collected to some central location. Considering the varying environments and locations where present invention meters are found, that problem can be daunting. Among the solutions proposed are: the use of cell phone/pager networks, satellite, licensed radio combination licensed and unlicensed radio, and power line communication. Not only the medium used for communication purposes but the type of network used is also critical. As such one would find: fixed wireless, mesh network or a combination of the two. There are several other potential network configurations possible, including the use of Wi-Fi and other internet related networks. To date no one solution seems to be optimal for all applications. Rural municipalities have very different communication problems from urban utilities or utilities located in difficult locations such as mountainous regions or areas ill-served by wireless and internet companies.

There is a growing trend towards the use of TCP/IP technology as a common communication platform for the present invention applications, so that utilities can deploy multiple communication systems, while using IP technology as a common management platform. Other solutions suggest the use of a single, universal connector separating the function of the smart grid device and its communication module. A universal metering interface would allow for development and mass production of smart meters and smart grid devices prior to the communication standards being set, and then for the relevant communication modules to be easily added or switched when they are. This would lower the risk of investing in the wrong standard as well as permit a single product to be used globally even if regional communication standards vary. The cellular format technology or other communication means can be used to transfer or download water parameter data from a residence/commercial operation, or well operation, to a remote monitoring site, or used to upload data, information or software updates to the water use and water energy use monitoring display apparatus 10, 126. In addition, the water leak monitoring capability of the present invention, described below, can use the cell tower or other communication means to communicate an alarm or message that a leak has developed in the residential/commercial or well water system. This leak identification means can call either a programmed cell or phone number, or can send the alarm or message to a governing utility or municipality. Digital signals and data can be communicated directly through wiring or wireless means 46, 52, and 54.

The water sensors and/or water parameter sensors can transmit analog or digital data that is communicated either through direct wiring or through a wireless means 46, 52, and 54. Amplification may be necessary by a circuit and then communicated directly to the microprocessor 84 or through one of the analog-to-digital modules if necessary. Remote display and/or a recording apparatus 50 (which is shown in more detail as 110 in FIG. 5) has the relatively important function of providing an individual or entity to review water use and water parameter data for auditing or monitoring purposes. It is also anticipated by the Applicants that the display means 12, 14, and 16 (shown in FIG. 2) can be located remotely from the water use base station 10, 126 containing the CPU or microprocessor 84 with communication and control lines 83 (shown in FIG. 3) that communicate either wired or wirelessly. In addition, typical cell phones, smart phones and similar apparatus can be located remotely from the water use base station 10, 126 containing the CPU or microprocessor 84 with communication and control lines 83 (shown in FIG. 3) that communicate wirelessly. Hence, the communication and control lines 83 can be used to transfer water use and water parameters to a remotely positioned display receiver apparatus (not shown) or the display means 12, 14, and 16 can be eliminated to be replaced by the first display and/or recording apparatus 50, 110 or typical cell phone, smart phone or similar apparatus. The first wireless communication means 52, the optional second and third wireless communication means 46 and 56, and the optional wireless communication and control lines 83, can use radio-frequency, Bluetooth, ZigBee WiFi, optical or other wireless technology for transferring the water parameter data generated by the sensors and collected by the microprocessor and sent to a wireless to a display means and/or a remotely positioned receiver apparatus. Examples of Bluetooth modules (using the 2.4 GHz band as WiFi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Another example of the wireless protocols that can be utilized with the present invention is the ZigBee, Z-wave and IEE 802.15.4 modulation technology. Applicants recognize that there are numerous wireless protocols that have been developed that, although not specifically listed, could be utilized with the present invention for data transfer purposes.

In addition, the wireless or wire data transfer 46, 52 and 56 (and 83) can be connected to the Internet using the IP or DHCP protocols whereby the data can be monitored remotely over the Internet using a software program designed to record, display, analyze and/or audit the water parameter data. The present invention would probably have to "log on" to a server to report the water parameters or it could respond to queries once its presence is known to the server.

Also some wireless routers support a form of "private" point-to-point or bridging operation which could be used to transfer water parameter data from the present invention to a receiving apparatus. Other kinds of proprietary protocols to be used with the present invention are possible as well. For example, there is the ISM (industrial, scientific and medical) bands. The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are typically given over to uses intended for unlicensed operation, since unlicensed operation typically needs to be tolerant of interference from other devices anyway. In the United States of America, ISM uses of the ISM bands are governed by Part 18 of the FCC rules, while Part 15 Subpart B contains the rules for unlicensed communication devices, even those that use the ISM frequencies. Part 18 ISM rules prohibit using ISM for communications.

The ISM bands defined by the ITU-R are:

| Frequency range [Hz] | Center frequency [Hz] |
|---|---|
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

While currently the 430 MHz and 9040 MHz frequencies are commonly used in the US, it is anticipated by the Applicants that the other frequencies could be used for water parameter transfers.

Another protocol known as CAN or CAN-bus (ISO 11898-1) that was originally designed for automotive applications, but now moving into industrial applications is another type of network that could be used to transfer water parameter data. Devices that are connected by a CAN network are typically sensors, actuators and control devices. A CAN message never reaches these devices directly, but instead a host-processor and a CAN Controller is needed between these devices and the bus.

It is anticipated by the Applicant that the present invention water use parameter display and monitoring device utilizing the said wireless communication with the one or more remote display and/or recorder apparatus can automatically convert back and forth from radio frequency format, ZigBee or Bluetooth format to a cellular format technology to accommodate different range requirements.

Furthermore, the present invention can communicate utilizing optical technology and other wireless networks such a cell phone technology or private networks.

The transfer of data or information through wired or wireless technology can be initiated using a "wake up" button or signal from the first or second remote display/recorder.

Several different data formats that may be used to exchange data, including but not limited to: binary, XML, XHTML and XHTML Basic, XHTML Basic as an Info-set in another form besides tagged text, Binary encoded equivalents of XML Info-sets including Wireless Binary XML ("WBXML"), ASN.1 encoded XML, SVG, Direct Internet Message Encapsulation ("DIME"), CSV, XML RPC, SOAP (with signature at SOAP level and/or enclosed content level), SOAP (using WS-SECURITY with signature at SOAP level and/or enclosed content level), application specific content like spreadsheet data, an HTTP response to an unsolicited HTTP request, a response to an unsolicited message, HHF, PQDIF, MODBUS, ION®, or other SCADA protocol where a response can be packaged up and embedded in another protocol or format. These formats are frequently sent as MIME or UUENCODE attachments and are considered part of the protocol stack.

The water use and water energy use monitoring activities will require security due to economic impact or violation of municipal or governmental law and ordinances or fraudulent activities. SPOT is a technology that uses the FM band and is coupled with a new digital radio infrastructure.

There are various security techniques, including encryption, authentication, integrity and non-repudiation that provide secure communications.

With Public Key Encryption, each user has a pair of keys, a public encryption key, and a private decryption key. A second user can send the first user a protected message by encrypting the message using the first user's public encryption key. The first user then decrypts the message using their private decryption key. The two keys are different, and it is not possible to calculate the private key from the public key. In most applications, the message is encrypted with a randomly generated session key, the random key is encrypted with the public key and the encrypted message and encrypted key are sent to the recipient. The recipient uses their private key to decrypt the session key, and the newly decrypted session key to decrypt the message.

Digital signatures are provided by key pairs as well, and provide authentication, integrity and non-repudiation. In this case a sender signs a one-way hash of a message before sending it, and the recipient uses the sender's public key to decrypt the message and verify the signature. When signing large documents, it is known to take a one-way hash function of the plain text of the document and then sign the hash. This eliminates the need to sign the entire document. In some cases, the digital signature is generated by encrypting the hash with the private key such that it can be decrypted using the signers public key. These public/private key pairs and associated certificate key pairs may be computed using hard to reverse functions including prime number and elliptic curve techniques.

One-way Hash Functions are small pieces of data that identify larger pieces of data and provide authentication and integrity. Ideal hash functions cannot be reversed engineered by analyzing hashed values, hence the 'one-way' moniker. An example of a one-way hash function is the Secure Hash Algorithm. X.509 and PGP each define standards for digital certificate and public key formats.

Various encryption algorithms such as RSA, Advanced Encryption Standard ("AES"), DES and Triple DES exist. RSA is a commonly used encryption and authentication system for Internet communications.

Secure Sockets Layer ("SSL") creates a secure connection between two communicating applications. For the purposes of the disclosed embodiments, SSL and Transport Layer Security ("TLS") are equivalent. These protocols are employed by web browsers and web servers in conjunction with HTTP to perform cryptographically secure web transactions. A web resource retrievable with HTTP over TLS is usually represented by the protocol identifier "https" in the URI. TLS can and is used by a variety of Application protocols.

Secure HTTP (S-HTTP or HTTPS) provides independently applicable security services for transaction confidentiality, authenticity and integrity of origin.

S/MIME and Pretty Good Privacy ("PGP") provide encryption and authentication for email and other messages, allowing users to encrypt a message to anyone who has a public key. This technology allows a message to be signed with a digital signature using a private key, preventing individuals from reading messages not addressed to them.

Microsoft Passport is an online service that allows a user to employ their email address and a single password to create a unique identity.

Internet Protocol Security ("IPSec") secures IP traffic across the Internet, and is particularly useful for implementing VPNs. Point-to-Point Tunneling Protocol ("PPTP") is a protocol that allows entities to extend their local network through private "tunnels" over the Internet. This kind of connection is known as a VPN. Layer Two Tunneling Protocol ("L2TP") is an extension of the PPTP protocol.

A Media Access Control Address ("MAC Address") is a number that is appended to a digital message and provides authentication and integrity for the message.

The XML Signature syntax associates a cryptographic signature value with Web resources using XML markup. XML signature also provides for the signing of XML data, whether that data is a fragment of the document which also holds the signature itself or a separate document, and whether the document is logically the same but physically different. This is important because the logically same XML fragment can be embodied differently. Different embodiments of logically equivalent XML fragments can be authenticated by converting to a common embodiment of the fragment before performing cryptographic functions. XML Encryption provides a process for encrypting/decrypting digital content, including XML documents and portions thereof, and an XML syntax used to represent the encrypted content and information that enables an intended recipient to decrypt it.

Before the water use and water energy use monitoring apparatus base station 10, 126 and remote displays and/or recorders 52, 54 (and 110 as shown in detail in FIG. 5) or cell phone, smart phone, or other similar apparatus (see FIG. 9) should communicate securely with one another and therefore they need to be provided with identities. The identity must not be easy to assume either intentionally or accidentally.

Identities are particularly relevant in multi-site scenarios, where the water use and water energy use monitoring apparatus base stations 10, 126 are aggregated across a wide geographic area containing multiple sites, serviced by multiple utilities, each site operating on one or more municipal agencies. Each water use and water energy use monitoring apparatus base station 10, 126 needs to identify itself when queried by a civil, commercial, municipal or governmental operator or agency.

In one example, each water use and water energy use monitoring apparatus 10, 126 will be identified and verified to see if its identification is already in the central storage. This identity can be implemented using various values, including MAC address, Universal Unique Identifier ("UUID"), TCP/IP address, DNS name, email address, serial number, an unique string of characters issued by a municipal or governmental agency.

It is important that within a given geographic area, no two water use and water energy use monitoring apparatus base station 10, 126 will have the same identity. It is therefore preferred that the entity, municipality or authority name become a portion of the identity. The fabrication process could include inserting a unique identity in the water use and water energy use monitoring apparatus base station 10, 126 at manufacturing or repair time.

To protect its identity, it should be stored in a location that cannot be easily accessed or replaced either physically or electronically.

PKI certificate based authentication schemes are utilized for machine-to-machine authentication. The water use and water energy use monitoring apparatus base station 10, 126 is issued one or more PKI certificates, associated identities and identity-related secrets, such as private keys, during manufacturing. Alternately, an identity and certificate are assigned by an authority unrelated to the device manufacturer and transferred to water use and water energy use monitoring apparatus 10, 126 in a manner that keeps all secrets private.

A user registry maintains a database of device identities, associated with installed and operating water use and water energy use monitoring apparatus base station 10, 126. The registry must be updated whenever a water use and water energy use monitoring apparatus base station 10, 126 is brought into or removed from service. The registry may be implemented as a distributed registry with a host name encoded within the Metering Point corresponding to a registry for that particular host. Alternatively, the registry can be implemented as a single large database. The registry can be implemented as a relational database, XML files, Comma Separated Value ("CSV") files, or Resource Description Files ("RDF"), or any mechanism that allows associated lookup when combined with the appropriate software. The registry enforces uniqueness of metering points, thereby preventing two devices from having the same identification address at the same instant.

Encryption, authentication, integrity and non-repudiation may be important characteristics when the water and energy use monitoring apparatus base station 10, 126 is sharing data or information with the remote displays. When a water use and water energy use monitoring apparatus 10, 126 receives or uploads data and information such as a control command signal to send or transmit data and information it is critical that the device can authenticate the sender and be sure of the integrity of the data and information. Encryption provides privacy by preventing anyone but the intended recipient of a message from reading it. Encryption can be provided point-to-point, or end-to-end, depending on the nature of the channel and the data. Only a portion of the data may be encrypted. EM Components can encrypt messages using encryption schemes such as PGP, S/MIME, XML Encryption, or SSL. Signing data provides assurance that the data comes from the desired source, and that it has not been tampered with. Signing helps prevent so-called "man in the middle" attacks where someone with legitimate or illegitimate access to data intercepts the data and tampers with it or forges data. This can occur with all aspects of communication, including installing certificates, and exchanging frameworks and all types of EM data.

Non-repudiation prevents the sender from denying that they sent a message. Non-repudiation can be provided by signing, electronic witnessing and technologies that assert a document was read before it was signed. Similar techniques exist for ensuring non-repudiability of contracts. Here, the water use and water energy use monitoring apparatus 10, 126 include sign data, data packets or messages using PGP, S/MIME, XML Signature or TLS/SSL to provide for non-repudiation of those messages or data.

The water use and water energy use monitoring apparatus base station 10, 126 will communicate with the residential or commercial remote display and/or recorder apparatuses 50, 56 (and 110 as shown in detail in FIG. 5) and the remote station at a specifically determined timing frequency. The remote and/or recorder apparatuses 50, 56 can be a cell phone, smart phone or other similar apparatus (see FIG. 9). This update frequency can be programmed into the present invention for various time periods, e.g. once per minute, twice per hour, once per minute, once per hour, once per day, once per week, or once per month/year. In the optional second wireless communication means 54 with outside civil, commercial, governmental or municipal agencies, data and information can be sent only occasionally or upon demand. Also the data or information can be processed-by an automated system and reports are only created every day, or week, or month, there is some leeway in when the data must be sent. The water use and water energy use monitoring apparatus base station 10, 126 can be programmed to communicate at other time frequencies, such as every 5 seconds or every minute, for various purposes, for example, to identify leaking conditions. In this case, encryption and signing calculations can be executed only when there is free processing time. This scheme performs well on water use and water energy use monitoring apparatus base station 10, 126 where important real-time calculations can take up significant available calculation time for small periods, but over time periods of a few hours there is processing time to spare.

In an another embodiment, encrypted data is streamed across the Internet or cell tower technology as it is generated using the aforementioned techniques. This has the advantage that water use and water energy use monitoring apparatus 10, 126 does not need to store encrypted data.

In an another embodiment, water use and water energy use monitoring apparatus base station 10, 126 contains a removable or a non-removable storage device that can contain water and energy parameter data. This removable storage device may be removed from time to time to upgrade configuration data, or to download stored data to a remote computer or apparatus. The water use and water energy use monitoring apparatus base station 10, 126 may be fitted with a physical lock that prevents unauthorized individuals from taking the removable storage device.

A resident or commercial consumer of data and information may wish to verify that received data represents what the data the civil, commercial, government or municipal provider claims it represents. It is difficult for a user to confirm the calculation techniques, source registers and source modules used to arrive at a value, so some techniques are needed to aid in this endeavor.

Software may be designed to check for valid signatures before an upload is attempted, and only allow certain users to upload unverified firmware. The firmware itself may verify signatures to ensure firmware has not been tampered with and is from an authorized source, and that the entity attempting the upgrade is authorized to perform an upgrade. Third parties may upload their own firmware written in their language of choice, such as Java, Prolog, Haskell, binary executable code, C#, ECMA Common Language Runtime ("ECMA CLR"), or ION® Object Configurations. Depending on the platform, source code or some repurposed version of the source code (i.e. ECMA CLR or target processor machine code) is digitally signed by the party and uploaded. Such code would be allowed to perform only specific actions based on trust level of the signer. For example, unsigned code or code signed by a non-trusted entity will not be allowed to read the second wireless communication mean 54 or the third wireless communication means 46. In additional, the water and energy monitoring base station 10, 126 or the first remote display and/or recording means 50 could has a microprocessor that includes a data memory bank for are calling the water and/or energy use parameter data that can be compared with the data that is uploaded by the government or municipal second remote display/recording means 56 or the data the is uploaded by the wireless cellular format communication means 46 remote states.

In operation, before water use and water energy use monitoring apparatus 10, 126 can transmit data or information to the second optional remote, it must verify that the second display remote is authorized to communicate with the present invention.

In addition, any stored data, including cached data and data stored in a database, is tagged with a digital signature. When the data is retrieved, the digital signature can be used to verify that the data has not been tampered with over time.

Figure 5:
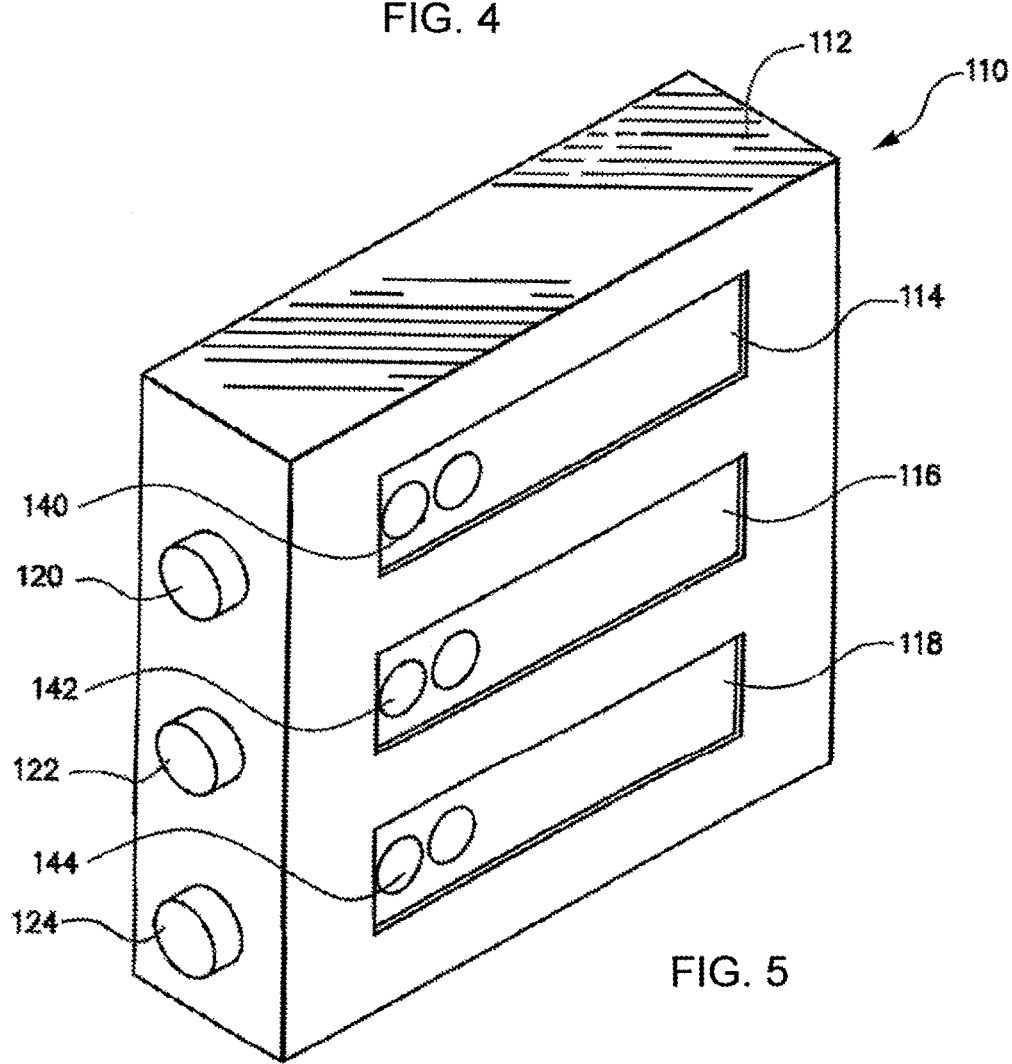
FIG. 5 is a perspective view of the first or second or third display/recording remote having a plurality of display means and a plurality of hardware and/or software buttons.
Figure 6:
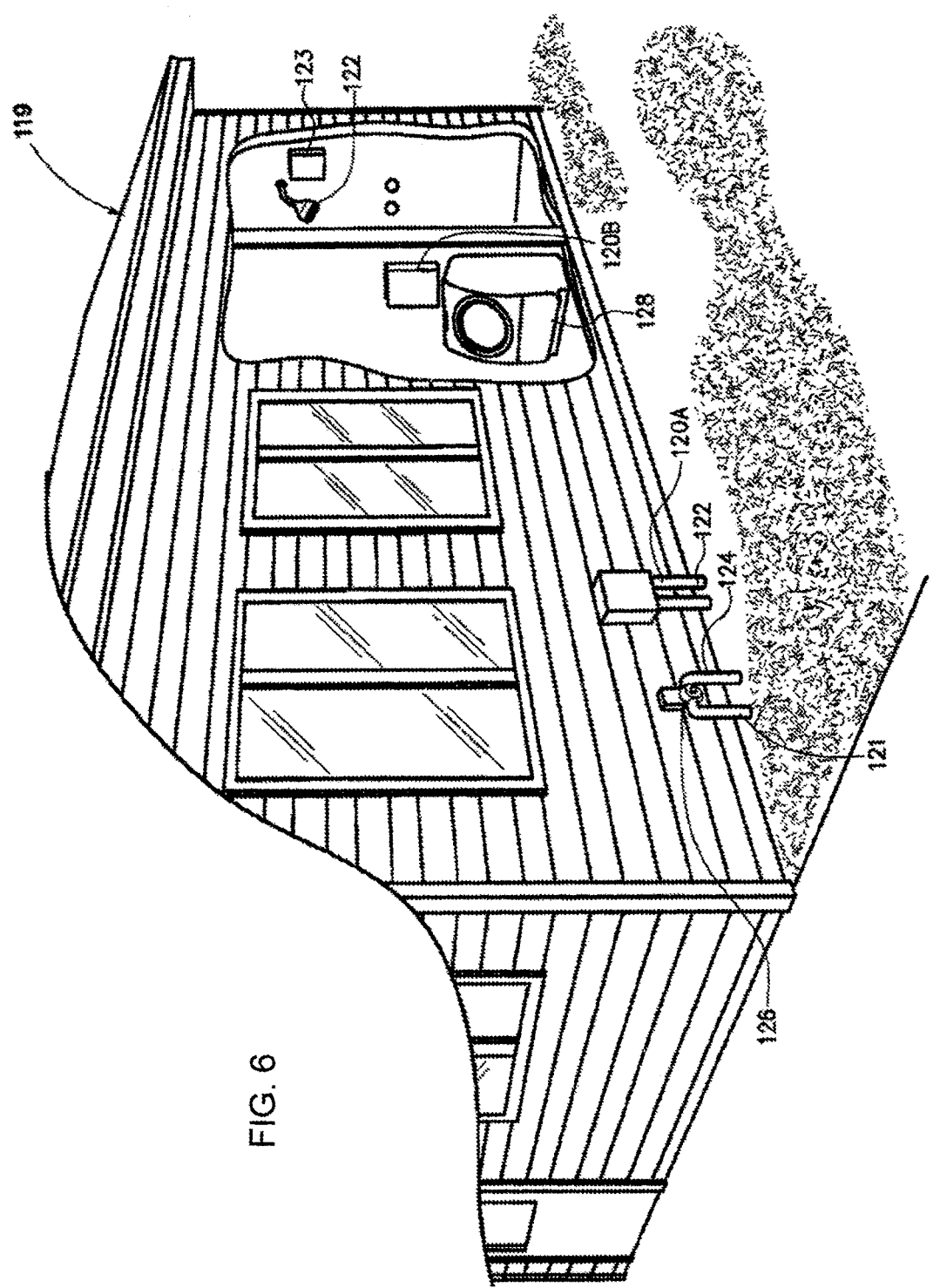
FIG. 6 is a perspective view of a plurality of high sensitive water flow sensors including a transceiver that is attached to various locations of a typical house for monitoring indoor water use and leak detection.

As shown in FIG. 1 but applicable to FIG. 6, is a first wired or wireless communication means 52 from the water use and water energy use monitoring apparatus base station 126 for communicating water use information or data to a conveniently located first remote display and/or recorder apparatus 50 (defined in more detail in FIG. 5) located in a convenient location for the commercial operator or occupier or residential individual to observe daily, weekly, monthly or annual water use. The first remote display and/or recorded apparatus 50 can be a typical cell phone, smart phone, or similar apparatus (see FIG. 9) that is using wireless, Bluetooth technology or other wireless technology. The first wireless communication means 52 preferably utilizes some confidential technology such as encryption, authentic, integrity and non-repudiate techniques to provide a secure transfer of the water use from the monitoring base station apparatus 126 to the first remote display and/or recording apparatus 50. The first wired or wireless communication means 52 can send data on various frequencies, e.g. once per minute, once per hour, once per day, once per week, once per month/year or can send information upon sensing an initiation to the first remote and/or recording apparatus 50. Furthermore, the first wired or wireless communication means 52 can send data or information upon the sending of a request signal. The request signal can be generated by, for example, the pushing of a requesting button located on the first remote display and/or recording apparatus 50 that transmits a request for water use data to the water and water energy monitoring apparatus base station 10, 126. The use of the request signal can minimize the use of wireless signals within the house or commercial building, conserving energy, minimizing the interference with other wireless devices, and reduce the exposure of wireless energy to individuals. Furthermore, the first wireless communication means 52 can consist of two-way transmission, commonly known as transceiver technology, such that the monitoring display apparatus base station 126 can transmit and receive electronic signals from the first display and/or recording apparatus 50 and similarly, and the first display and/or recording apparatus 50 can transmit and receive electronic signals from the monitoring display apparatus base station 126. Hence, the first wired or wireless communication means 52 can be either one-way transmission, or half duplex and/or full duplex two-way transmission.

As shown in FIG. 1 but applicable to FIG. 6, the second optional wireless communication means 54 is preferred to transmit, upload or download water parameter data or information via a secure wireless communication network providing information to a property owner, governmental, civil or municipal employee or individual 60 using a second remote display and/or recorder apparatus 56 for governmental, civil, commercial or municipal operators or agencies purposes. It is anticipated that the second wireless communication means 54 can also be received by a moving vehicle or can communicate with cellular format technology utilizing cell towers 44 using another third wireless communication 46. The second optional wireless communication means 54 preferably utilizes some confidential technology such as encryption, authentic, integrity and non-repudiate techniques to provide a secure transfer of the water use from the monitoring base station apparatus 126 to a second display and/or recorder 56. The second display and/or recorded can be a typical cell phone, smart phone, or similar apparatus (see FIG. 9) that is using wireless, Bluetooth technology or other wireless technology. Also, the second wireless communication means 54 should include specific identification information e.g. house or commercial building address, IP address or a similar unique technology. The second optional wireless 56 communication means can send data on various frequencies, e.g. once per minute, once per hour, once per day, or can send information upon sensing an initiation to the second remote and/or recorder 56. Furthermore, the second optional wireless communication means 56 can send data or information upon the sending of a request signal. The request signal can be generated by, for example, the pushing of a requesting button located on the second remote display and/or recorder 56 that transmits a request for water use data to the water and energy monitoring apparatus base station 126. The use of the request signal can minimize the use of wireless signals within the house or commercial building, conserving energy, minimizing the interference with other wireless devices, and reduce the exposure of wireless energy to individuals. Furthermore, the second wireless communication means 54 can consist of two-way transmission, commonly known as transceiver technology, such that the monitoring display apparatus base station 126 can transmit and receive electronic signals from the second display and/or recording apparatus 56 and similarly, and the second display and/or recording apparatus 56 can transmit and receive electronic signals from the monitoring display apparatus base station 126. Hence, the second optional wireless communication means 46 can be either one-way transmission, or half duplex and/or full duplex two-way transmission.

As shown in FIG. 1 but applicable to FIGS. 5, 6 and 9, is the third optional wireless communication means 46 is designed to communicate data under a cellular format technology with offsite central monitoring computer or cell, mobile or other telephone lines via satellite, microwave technology, the internet, cell tower, telephone lines, and the like. It is anticipated that the third wireless communication means 46 can transmit information to a programmed cell or phone number for communicating water parameter data or alarm situations to the property owner or a municipal/governmental agency (such as announcing a water leak situation). The information can be send to a typical cell phone, smart phone, or similar apparatus (see FIG. 9). Also, the third wireless communication means 46 should include specific identification information e.g. house or commercial building address. IP address or similar unique technology. The third wireless communication means 46 can send data on various frequencies, e.g. once per minute, once per hour, once per day, once per week, once per month/year or can send information upon sensing the initiation (alarm situation) to the programmed cell or phone number. The request signal can be generated by, for example, a request signal transmitted by a remote station (not shown). The use of the request signal can minimize the use of wireless signals within the house or commercial building, conserving energy, minimizing the interference with other wireless devices, and reduce the exposure of wireless energy to individuals. Furthermore, the third wireless communication means 46 can consist of two-way transmission, commonly known as transceiver technology, such that the monitoring display apparatus base station 126 can transmit and receive electronic signals from the remote station and similarly, the remote station can transmit and receive electronic signals front the water use and water energy use monitoring display apparatus base station 126. The third wireless means 46 can also be designed for communicating to an offsite central monitoring computer or cell, mobile or other telephone lines via satellite, microwave technology, the internet, cell tower, telephone lines, and the like. The third communication means 46 can also comprise a RF mesh-enabled device (meters, relays) is connected to several other mesh-enabled devices, which function as signal repeaters, relaying the data to an access point. The access point device aggregates, encrypts, and sends the data back to a municipal or government agency over a secure commercial third-party network. The resulting RF mesh network can span large distances and reliably transmit data over rough or difficult terrain. If a meter or other transmitter drops out of the network, its neighbors find another route. The mesh continually optimizes routing to ensure information is passed from its source to its destination as quickly and efficiently as possible. The third optional wireless communication can be either one-way transmission, or half duplex and/or full duplex two-way transmission.

Figure 2:
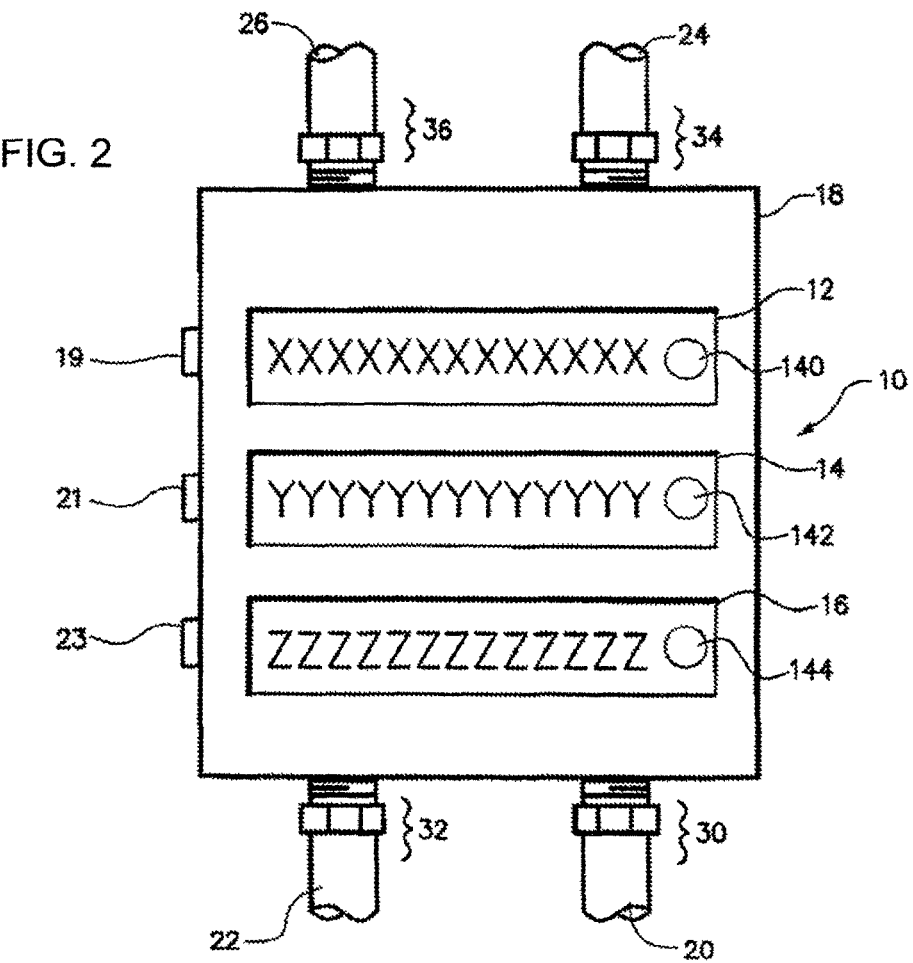
FIG. 2 is a front view of a water use and water energy use monitoring apparatus base station showing input hot and cold water supplies lines and output hot and cold water supply lines with optional display means having one or more display screens and a plurality of hardware and/or software buttons.

Referring now to the drawings and particularly to FIG. 2 is a perspective view of the first embodiment comprising a water/energy use monitoring display apparatus 10 attached to the cold and hot input water supply piping 14 and the cold and hot output water supply piping. The first embodiment of the show display apparatus 10 is designed to become attached to water supply piping in easily installation and aesthetically pleasing format. In the first embodiment, the water use and water energy use display and monitoring apparatus 10 should be installed near the hot and cold or ambient water sources before any distribution lines such that the total volume or quantity of hot and cold or ambient water can be monitored and recorded. In the second embodiment 126 where only the water use is monitored, the present invention water parameter use display and monitoring device can be installed near the cold or ambient water source or supply line before the hot water generation device and before any distribution lines (e.g. at the pressure regulator) such that the total volume or quantity of cold or ambient water can be monitored and recorded. It is anticipated by the Applicant that the present invention water parameter use display and monitoring device 126 can be incorporated into or serve as the pressure regulator (pressure reduction valve) or primary water meter at residential or commercial facilities. The components of the first embodiment of the present invention include a plurality of water pipe joint unions or sections 30, 32, 34 and 36, a housing section 18 containing the electrical circuitry and microprocessor, a power source with a water proof removable cover, and first 12, second 14 and third 16 water use and water parameter display mechanisms.

The plurality of water pipe unions or joints 30, 32, 34 and 36 can be fabricated from typical metallic piping materials such as brass, brass alloys, steel, galvanized steel, copper, copper allows or any combination thereof. The water pipe joint can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes. As shown in FIG. 2, the water union or joints 30, 32, 34, and 36 generally have a female thread (not shown) within the input end for engaging the male treads of a typical water supply lines 20 and 22 and water delivery lines 24 and 26. For certain applications, the male/female thread locations can be changed to accommodate certain attachment forms or specifications. In addition, other attachment means, such as adhesive, snap fit joint, compression fitting, flare fitting or other technologies can be employed.

The material for fabricating the water pipe union or joint 30, 32, 34 and 36 is not particularly important except that the union or joint has to engage the water supply and delivery lines with a relatively water tight seal, and that preferably there should be a sealing means that functions 1) to secure in place, any parameter sensors that are projecting into the water stream and 2) to provide a water-tight seal that can prevent any water from penetrating past the seal and 3) include structural integrity to withstand continuous water pressure and other forces Various washer designs fabricated from compounds of rubber, urethane, elastomeric or thermosetting polymeric compounds have been disclosed and are in present in similar uses. Seal and sealing technology is well known in the art. The joint between the water pipe union and the water supply and delivery lines could be screw and thread technology, snap fit, compression fitting, flare fitting, or use adhesive technology. For example, in the case of fabricating with a metallic component, a solder, brazed, or sweat joint could be used. For example, in the case of polymeric, the extending or articulating could be an extension of the display apparatus manufactured by molding, heat bonding, or adhesive technology. The joint may be designed to be permanent or removable.

Further referring to FIG. 2, the present invention base station apparatus 10 includes a housing 18, a computerized circuit board (depicted in FIG. 3), the display means housing having a optional door for replacing or regenerating the power source or removable data chip and a plurality of buttons or activators 19, 21, and 23, or software buttons (e.g. touch screen technology) 140, 142, and 144, that allow for certain modification of the software instructions (change units, change language, change from metric to US standard, set alarms, calibrate sensors, or establish communication with wired or wireless sensors). While FIG. 2 shows three hard buttons 19, 21 and 23 and three software button activators 140, 142 and 144, it is anticipated by the Applicant that a different series of hard or software buttons can be used, and/or a different series of software button sequencing can be utilized. Furthermore, other hard button technology can be used, such as a rotary switches or multiple membrane switch technology. The housing 18 can be fabricated from a metallic material such as brass, brass alloys, steel, galvanized steel, copper, copper allows or any combination thereof. The display means housing can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the the match with various presently marketed finishes. The material for fabricating the housing 18 is not particularly important except and the size of the display means will generally determine the size of the housing but it does not have to be substantially rectangular as shown, any number of geometric configurations could be used in the present invention.

The plurality of display means 12, 14, and 16 and as presented in FIG. 2 utilizes one or more illuminating technologies, such as LCD, LED, gas plasma, fluorescence, incandescent, halogen, halide, or other lighting technologies but should be able to provide sufficient lighting for observing the data and information in dark conditions. In addition, the display means and display means housing should be able to sustain capability in moist wet conditions. The present invention can include one or more than one display means to show various water use and water energy use parameters. Provided only as an example, display means 12 can display different levels of water use with a color hue or format providing a visual cue. For example, a water supply municipal can have data to be downloaded to the base station 10, 126 so that a green background or parameter digits for a $1^{st}$ hundred cubic feet (e.g. a first 14 HCF) level, yellow background or parameter digits for a $2^{nd}$ hundred cubic feet (e.g. second 14 HCF) level, and red background or parameter digits for a $3^{rd}$ hundred cubic feet (e.g. a third 28 HCF) level can be displayed. In addition, costs for the hundred cubic feet water can be downloaded and displayed. For example, the other embodiment with only the flow and water use display can be manufactured to reduce overall costs. The optional displays 12, 14 and 16 can have touch screen capability. Furthermore, the orientation of the water use and water energy use parameters can be presented in various formats. For example, the flow parameter can be on top 12 with the date parameter on the bottom 16 and with the energy parameter sandwiched between 14. The optional displays 12, 14, and 16 can have a background light or parameter alpha-numeric digits that is used for various purposes, for example, for providing better lighting conditions or changing color e.g. from green to yellow and to red, to display an alarming condition (e.g. water use over time has exceed a certain level). It is also anticipated that the displays 12, 14 and 16, can have various colors displayed at once (e.g. blue and green characters with a white or yellow backlight. Displaying of all water and water energy parameters can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters and water energy parameters one at a time with a specific delay and sequencing. An example of a LCD unit that can be used with the present invention is the color graphic 128×128 LCD-00569 marketed by Sparkfun Electronics in Boulder, Colo. Digitikey, Mouser and other electronic supply warehouses have many other variants and other LCD, LED, gas plasma, fluorescence, incandescent, halogen, halide, or other lighting technologies that can be utilized with the present invention.

The optional display means 12, 14, and 16 can be programmed to display one or more parameters in a visual means that can be either an analog, character or digital display, or combination of display means. Information obtained from the appropriate sensor monitoring or measuring the water parameters such as temperature, date/time, flow rate or water quality parameters can be displayed in an appropriate format on the display means. The optional displays 12, 14 and 16 can have touch screen capability. For example, when a sensor is monitoring or measuring the rate of water flowing from a water source or the display means could show any flow between 1.0 gal/min (3.8 liters/min) to many thousands of gals/day. For example, when a sensor is monitoring the temperature of hot and cold (ambient) water flowing through the housing, the display means could show any energy ratio calculation that takes into effect the overall temperature and total volume of heated water vs. the total volume of cold or ambient water. It is anticipated by the Applicant that many different water energy calculations might be utilized by the present invention. Furthermore, the display can be programmed to display calendar information, such as the date and current time (12 hr. or 24 hr. format). The optional displays 12, 14, and 16 can have a background light or parameter alpha-numeric digits that is used for various purposes, for example, for providing better lighting conditions or changing color e.g. from green to yellow and to red, to display an alarming condition (e.g. water use over time has exceed a certain level). It is also anticipated that the optional displays 12, 14 and 16, can have various colors displayed at once (e.g. blue and green characters with a white or yellow backlight).

It is anticipated by the Applicant the present invention can be fabricated and marketed with one, two or more display means. For example, a lower cost display assembly can be fabricated and sold that only has a temperature sensor and temperature display means. A more expensive display assembly can be fabricated and sold that has temperature, flow, timing and other sensors with various programmed methods and a shut off mechanism.

Also shown in FIG. 2, one or more ergonomically 19, 21, and/or 23 placed buttons or activators can be incorporated into the display means housing to allow the modification of certain parameter units (e.g. metric to US), set alarm conditions (e.g. flow/volume rate-set points), or to program certain settings, e.g. over water use alarm, monitor continuous leakage (e.g. valve not completely shut off, broken pipe), calibrate sensors, or establish communication with wired or wireless sensors. The buttons will electrically communicate with the electronic circuit board contained with the housing 18 and respond to programmed instructions integrated within the CPU or microprocessor and associated circuitry of the electronic circuit board. The buttons or activators 19, 21 and/or 23 should be mounted with the display means housing 18 with the capability to protect the buttons and electronic circuitry with the housing for exposure to moist and wet conditions. Software buttons 140, 142, and 144 (e.g. touch screen technology) can replace or be used in conjunction with the button or activators 19, 21, and 23.

A visual alarm or signal can be incorporated into the present invention whereby a preset alarm or programmed alarm, changes the one or more of the screen displays, for example, blinking a parameter or backlight, or changing the color of a parameter or backlight (e.g. green to yellow to red). For example, one or more displays can exhibit a first background or text color (e.g. green) when a first volume range of water use has been monitored. After a second volume range of water use has been monitored, the one or more displays can exhibit a second background or text color (e.g. yellow). And when a third volume range of water use has been monitored, the one or more displays can exhibit a third background or text color (e.g. red) when a third volume range of water use has been monitored.

A preset alarm might include visual reference, for example, an in-operative condition, broken sensor, low power source, leaking condition, optional sensor warning (e.g. chlorine level, TDA, biological, hardness or pH levels high), and some other default limits. Programmed visual alarms would allow for individual selection (e.g. volume over set point, flow rate set point, total volume exceeded set points) which might be restricted or not by the default settings.

In addition, an auditory alarm (or combined visual/auditory) can be incorporated into the present invention whereby a preset alarm or programmed alarm, changes the screen display (flashing), for example, using sound or pulsing a specific noise, or changing the color of a parameter. For example, the temperature display can change from green to yellow to red when a water use levels are crossed with an auditory signal. A preset alarm might include visual reference, for example, an in-operative condition, broken sensor, low power source, leaking condition, optional sensor warning (e.g. chlorine level, TDA, biological, hardness or pH levels high), and some other default limits. Programmed auditory or visual alarms would allow for individual selection (e.g. temperature over set point, time past set point, flow rate set points) which might be restricted or not by the default settings.

In addition, the water use monitoring display apparatus 10, 126 can include water shut off or variable water flow means to turn completely or partially turn off the water supply if an alarm condition or setting point is exceeded and has been activated. The variable water flow means can set the water flow to be anywhere between 1% and 99% of the total water supply flow. The water shut off means or variable water flow means is electrically connected to the CPU or microprocessor 84 and the power means thereby controlling the application of electrical power to activate or de-activate the water shut off means or variable water flow means. The water shut off means or variable water flow means can comprise, for example, a typical ball valve or solenoid shut off valve incorporate into the connection union such that water from the source is closed such that no water exits the shower or bath water head. The water shut off means or variable water flow means can be activated if an alarm state has been achieved, e.g. 200 gals/day of water is exceeded or the total of 15 gallons of water has flowed since the water source was closed. The alarm or settings can be a default setting installed by the manufacturer or programmed by the user. The water shut off means or variable water flow means can be activated by software instructions, or initiated by a command communicated over the optional second 54 and third 46 wireless means. As an example, many irrigation manufactures (Orbit, Hunter irrigation products) incorporate battery control valves and there are numerous other flow valves using standard electrical energy are available, e.g. ball valves, gate valves, butterfly valves.

Figure 3:
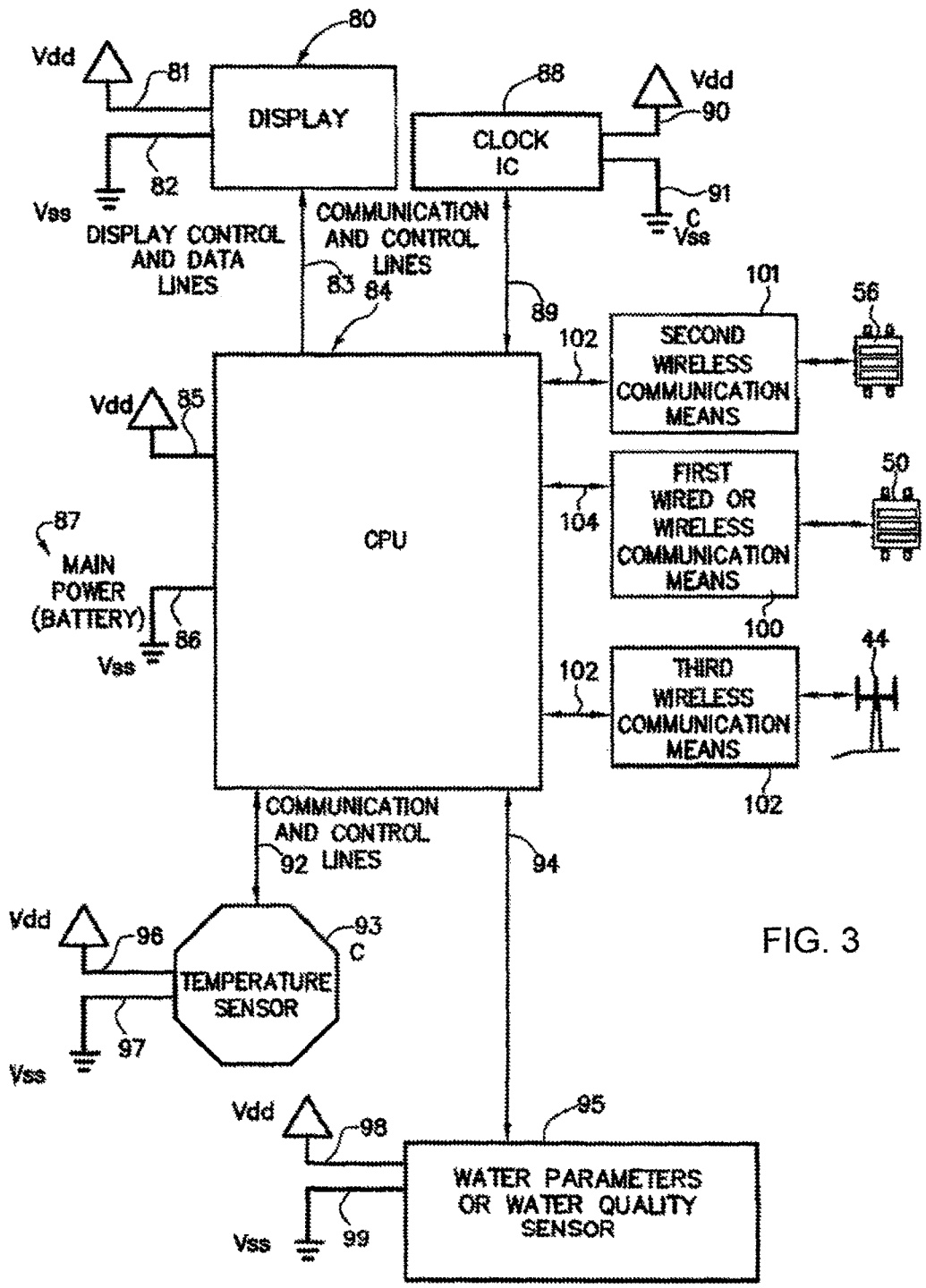
FIG. 3 is an electrical schematic showing the main power, CPU or microprocessor, the analog or digital display means, the timing circuit, the temperature sensor, and the flow sensor.

Now referring to FIG. 3, shown is a is a timing clock integrated circuit 88 with data transfer means 89 for communicating with the CPU or microprocessor 84 and having a power line 85 and ground line 86, a temperature sensor or temperature integrated circuit 93 with a data transfer means 92 for communicating with the CPU or microprocessor 84 and having a power line 96 and ground 97, and the flow sensor (e.g. pressure, ultrasonic, turbine flow) or flow sensor integrated circuit 95 with a data transfer means 94 for communicating with the CPU or microprocessor 84 with a power line 98 and ground line 99. The power line 98 can utilize battery technology or other DC power sources, or can be AC powered using standard 120 or 220/240 volt supply lines, or 24 volt low AC power that is commonly used for sprinkler systems. It is anticipated that a water flow generation apparatus that can be utilized with rechargeable batteries for powering the water and water energy monitoring base unit 10, 126. The integrated circuits for the timing clock 88, temperature sensor 93 and flow sensor 95 can include circuitry to convert analog data to a digital format. Also shown is a first wire or wireless electronic communication means 100 with a data transfer means 104, and a second wire or wireless electronic communication means 101 with a data transfer means 102, where both data transfer means 102 and 104 communicates with the CPU 84.

The microprocessor 84 that processes the information supplied by the various sensors described herein (FIG. 4) uses internal instructions to control the information projected on the display 80 and for processing alarm states. The microprocessor can include an EEPROM or any type of memory section that allows for specific programming to be incorporated as processing instructions. Furthermore, the microprocessor 84 may have the capability to convert analog signals into digital information for decoding and processing. An example of a microprocessor 84 that could be used is the PIC16F876 28-pin 8-Bin CMOS FLASH micro-controllers manufactured by Microchip Technology, Inc. This particular microprocessor has a 128K EEPROM Data memory bank for flash memory of specific instructions and utilizes a 35-word instruction set. It also has five 10-bit Analog-to-Digital Inputs that can provide the means for converting information obtained from the various sensors described herein (FIG. 4) from its analog format into a digitized form for processing by the instruction sets of the CPU or microprocessor 84. Another example of a microprocessor 84 that could be used for the CPU or microprocessor is the MSP430 family of processors from Texas Instruments in Dallas, Tex. There are hundreds of variants but for an example, the MSP430F436IPN (80 pin package) or MSP430F436IPZ (100 pin package) could be utilized in the present invention. It is anticipated by the Applicant that more powerful microprocessors with more memory capacity may be utilized to accommodate the more complex audio or verbal communications means. There are many other variants or other microprocessors, whether commercially marketed or privately fabricated, that can be used with the present invention.

In addition, a means to record and digitally story the water parameters or data can be incorporated into the present invention. An integrated memory circuit can be incorporated into the CPU or microprocessor 84, or can be a separate memory circuit, and can include associated circuitry with a means to transfer the recorded data to a removable media, such as a flash mount on an electronic circuit board to control the display means and communicate with the sensors. Various data access ports, such as serial, parallel, or USP, internet, can be used to transfer the stored data to another device, such as a computer. The CPU or microprocessor 84 and associated circuitry mounted on the electronic circuit board can also have the capability to be programmed for controlling certain display means (e.g. U.S. or metric units), programming alarm or setting states (e.g. flash all display means different colors e.g. red when the total volume has exceeded a certain volume, for example, 200 gallons/day).

Figure 4:
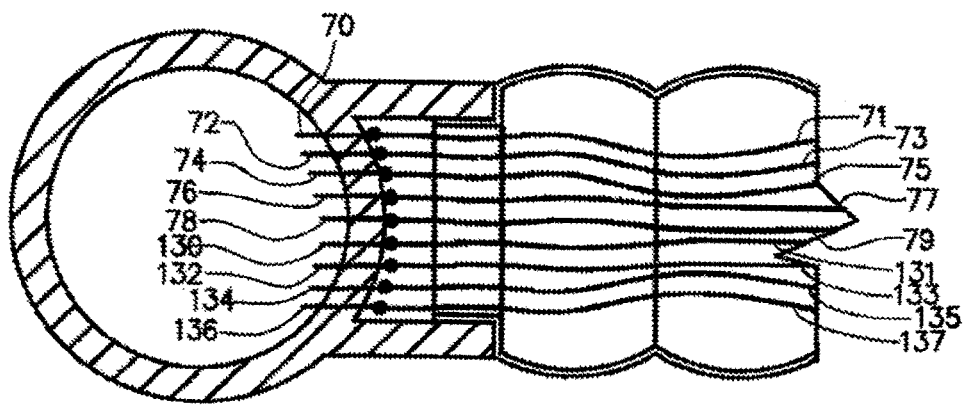
FIG. 4 is a cross-section perspective view showing a plurality of water parameter sensors located in relative positions within the supply line lumen and the connecting wires.

Also shown in FIG. 3, is the timing circuit 88 functioning to communicate with the CPU or microprocessor 84 to display such information such as the time of day and current date and/or a time stamp for the duration that the water supply has turned been on and off. For monitoring the time stamp parameters of the water flowing through the present invention, the use of various trip switches or water sensors as depicted in FIG. 4 are positioned in close proximity to the flowing water to be monitored. Various mechanical, magnetic or software switches can be utilized to communicate a signal to the CPU or microprocessor 84 that water supply has been initiated and then the software instructions and CPU or microprocessor can display the cumulative time that the water supply is flowing through the present invention. The mechanical, magnetic or software switch will have the capability to also communicate a signal to the CPU or microprocessor 84 that the water supply has been shut off such that the software instructions and CPU or microprocessor can calculate various parameters, such as, but not limited to, the duration of water supply, total number of gallons or liters of water used and flow rates.

Technologies that can be use as the timing circuit 88 include electrical resistance sensors, ohm meter, multi-meter electrical current sensors: galvanometer, ammeter, electrical voltage sensors: leaf electroscope, voltmeter electrical power sensors, watt-hour meters magnetism sensors, magnetic compass, fluxgate compass, magnetometer, Hall effect device. In addition, various chemical technologies, such as oxygen sensors, ion-selective electrodes, and redox electrodes might be used. Furthermore, optical radiation technology can be used as the timing sensor, such as light sensors, on photo-detectors including semi-conduction devices such as photocells, photodiodes, phototransistors, CCDs, and image sensors; vacuum tube devices like photoelectric tubes, photomultiplier tubes, and mechanical instruments such as the Nichols radiometer, infra-red sensors, especially used as occupancy sensors for lighting and environmental controls, interferometry-interference fringes between transmitted and reflected light-waves produced by a coherent source such as a laser are counted and the distance is calculated. In addition, fiber optic sensors are capable of extremely high precision.

Because the present invention water use and water energy monitoring apparatus can be used in situations where the source of water comes for a well or non-commercial operation, and furthermore, where the commercial operations water treatments plants are under pressure to provide more water supplies or where problems, breakdowns or accidental situations can cause contamination of the water source, the present invention can be fitted with, display parameters of, and provide warning for, numerous mineral, elements and biological contaminates. As illustrated in FIG. 4 is a cross-section showing the one or more sensors 70, 72, 74, 76, 78, 80, 140 and/or 142 located in close proximity to water supply line 20, 22 and/or a water delivery supply line 24, 26 and their relative position of the sensors in the supply line lumen 38 and the connecting wires 71, 73, 75, 77, 79, 81, 141 and 143 for the display means. For exemplary purposes, sensor 70 could be a timing sensor e.g. to monitor when water is flowing, sensor 72 can be a temperature sensor, sensor 74 can be a flow sensor, 76 can be a halogen (e.g. chloride or fluoride) sensor, 78 can be a total dissolved solids sensor, 80 can be a biological or fecal sensor, and 140 can be a water hardness sensor and 142 can be a specific iron or other mineral sensor.

In general, a sensor is a type of transducer. A direct type indicating sensors, for example, a mercury thermometer, is human readable. However, other sensors must be paired with an indicator or display, for instance, thermocouple sensor. Most sensors are electrical or electronic, although other types exist.

Technological progress allows for more and more to be manufactured on the microscopic scale as micro-sensors using MEMS technology. In most cases a micro-sensor reaches a significantly higher speed and sensitivity compared with macroscopic approaches.

There are many types of sensors that can be used with the present invention. Since a significant small change involves an exchange of energy, sensors can be classified according to the type of energy transfer that they detect. For measuring or monitoring the temperature of the water flowing from the shower or bath head, the use of various thermocouples or thermistor sensors 70 as depicted in FIG. 3 is protruding within the water supply lumen 38 (or in close proximity to the water to be measured) and mounted within the articulating joint mechanism 22. Wires 71 are shown extending from the sensor 70 to electronically communicate with the CPU or microprocessor 84 and display unit.

In 1821, the German-Estonian physicist Thomas Johann Seebeck discovered that when any conductor (such as a metal) is subjected to a thermal gradient, it will generate a voltage. This is now known as the thermoelectric effect or Seebeck effect. Any attempt to measure this voltage necessarily involves connecting another conductor to the "hot" end. This additional conductor will then also experience the temperature gradient, and develop a voltage of its own which will oppose the original. Fortunately, the magnitude of the effect depends on the metal in use. Using a dissimilar metal to complete the circuit will have a different voltage generated, leaving a small difference voltage available for measurement, which increases with temperature. This difference can typically be between 1 and 70 micro-volts per degree Celsius for the modern range of available in metal combinations. Certain combinations have become popular as industry standards, driven by cost, availability convenience, melting points, chemical properties, stability, and output.

It is important to note that thermocouples measure the temperature difference between two points, not absolute temperature. In traditional applications, one of the junctions, the cold junction, was maintained at a known (reference) temperature, while the other end was attached to a probe.

For example, the cold junction could be at copper traces on the circuit board. Another temperature sensor will measure the temperature at this point, so that the temperature at the probe lip can be calculated. Having available a known temperature cold junction, while useful for laboratory calibrations, is simply not convenient for most directly connected indicating and control instruments. They incorporate into their circuits an artificial cold junction using some other thermally sensitive device (such as a thermistor or diode) to measure the temperature of the input connections at the instrument, with special care being taken to minimize any temperature gradient between terminals. Hence, the voltage from a known cold junction can be simulated, and the appropriate connection applied. This is known as cold junction compensation.

Additionally, cold junction compensation can be performed by software. Device voltages can be translated into temperatures by two methods. Values cast either be found in look-up tables or approximated using polynomial coefficients.

Any extension cable or compensating cable must be selected to match die thermocouple. It generates a voltage proportional to the difference between the hot junction and cold junction, and is connected in the correct polarity so that the additional voltage is added to the thermocouple voltage, compensating for die temperature difference between the hot end cold junctions.

The relationship between the temperature difference and the output voltage of a thermocouple is generally nonlinear and is approximated by a polynomial interpolation.

$$T = \sum_{n=0}^{N} a_n v^n$$

The coefficients $a_n$ are given for n from 0 to between 5 and 9. To achieve accurate measurements lie equation is usually implemented in a digital controller or stored in a lookup table. Some older devices use analog filters.

A variety of thermocouples are available, suitable for different measurements applications (industrial, scientific, food temperature, medical research, etc.). They are usually selected based on the temperature range and sensitivity needed. Thermocouples with low sensitivities (B, R, and S types) have correspondingly lower resolutions. Other selection criteria include the inertness of the thermocouple material, and whether or not it is magnetic. The thermocouple types are listed below with the positive electrode first, followed by the negative electrode. For example, listed below are a number of thermocouples types.

Type K—Chromel (Nickel-Chromium Alloy)/Alumel (Nickel-Aluminum Alloy). This is the most commonly used general purpose thermocouple. It is inexpensive and, owing to its popularity, available in a wide variety of probes. They are available in the 200° C. to +1200° C. range. Time type K was specified at a time when metallurgy was less advanced than it is today and, consequently, characteristics vary considerably between examples. Another potential problem arises in sonnies situations since one of the constituent materials is magnetic (Nickel). The characteristic of the thermocouple undergoes a step change when a magnetic material readies its Curie point. This occurs for this thermocouple at 354° C. Sensitivity is approximately 41 µV/° C.

Type B—Chromel/Constantan (Copper-Nickel Alloy). Type B has a high output (65 µV/° C.) winch makes it well suited to cryogenic use. Additionally, it is non-magnetic.

Type J—Iron/Constantan. Type J has a limited range (−40 to +750° C.) makes type J generally less popular than type K. The main application is with old equipment that cannot accept modern thermocouples. J types cannot be used above 760° C. as an abrupt magnetic transformation causes permanent de-calibration. The magnetic properties also prevent use in some applications. Type J's have a sensitivity of ~52 µV/° C.

Type N—Nicrosil (Nickel-Chromium-Silicon Alloy)/Nisil (Nickel-Silicon Alloy). Type N thermocouples generally have high stability and resistance to high temperature oxidation which makes Type N suitable for high temperature measurements without the cost of platinum (B, R, 5) types. They can withstand temperatures above 1200 C°. Sensitivity is about 39 µV/° C. at 900° C., slightly lower than a Type K. Designed to be an improved type K, it is becoming more popular.

Thermocouple types B, R, and S are all noble metal thermocouples and exhibit similar characteristics. They are the most stable of all thermocouples, but due to their low sensitivity (approximately 10 µV/° C.) they are usually only used for high temperature measurement (>300° C.).

Type B—Platinum 30% Rhodium/Platinum 6% Rhodium. Suited for high temperature measurements up to 1800° C. Type B thermocouples (due to the shape of there temperature-voltage curve) give the same output at 0° C. and 42° C. This makes them useless below 50° C.

Type R—Platinum 13% Rhodium/Platinum. Suited for bight temperature measurements up to 1600° C. Low sensitivity (10 µV/° C.) and high cost makes Type R unsuitable for general purpose use.

Type S—Platinum 10% Rhodium/Platinum. Suited for high temperature measurements up to 1600°. Low sensitivity (10 µV/° C.) and high cost makes them unsuitable for general purpose use. Due to its high stability, Type S is used as the standard of calibration for the melting point of gold (1064.43° C.).

Type T—Copper/Constantan. Suited for measurements in the −200 to 350° C. range. Often used as a differential measurement since only copper wire touches the probes. As both conductors are non-magnetic, type T thermocouples are a popular choice for applications such as electrical generators which contain strong magnetic fields. Type T thermocouples have a sensitivity of ~43 µV/° C.

Type C—Tungsten 5% Rhenium/Tungsten 26% Rhenium. Suited for measurements in the 32 to 4208° F. (0 to 2320 C°). This thermocouple is well-suited for vacuum furnaces at extremely high temperature and must never be used in the presence of oxygen at temperatures above 500° F.

Type M—Nickel Alloy 19/Nickel-Molybdenum Alloy 20. This type is used in the vacuum furnaces as well for the same reasons as with type C above. Upper temperature is limited to 2500° F. (1400° C.). Though it is a less common type of thermocouple, look-up tables to correlate temperature to EMF (mini-volt output) are available.

A thermistor is a type of resistor used to measure temperature changes, relying on the change in its resistance with changing temperature, Thermistor is a combination of time words thermal and resistor. The thermistor was invented by Samuel Ruben in 1930, and was disclosed in U.S. Pat. No. 2,021,491.

If we assume that the relationship between resistance amid temperature is linear (i.e. we make a first-order approximation), then we can say that:

$$\Delta R = K \Delta T$$

Where:

$\Delta R$ change in resistance
$\Delta T$=change in temperature
k=first-order temperature coefficient of resistance Thermistors can be classified into two types depending on the sign of k. If k is positive, the resistance increases with increasing temperature, and the device is called a positive temperature coefficient (PTC) thermistor (Posistor). If is negative, the resistance decreases with in decreasing temperature, and the device is call a negative temperature coefficient (NTC) thermistor.

Thermistors differ from resistance temperature detectors in that the materials used in a thermistor is generally a ceramic or polymer, while RTDs use pure metals. The temperature response is also different; RTDs are useful over larger temperature ranges.

Other thermal technologies that can be employed include temperature sensors: thermometers, bi-metal thermometers and thermostats, heat sensors such as bolometers and calorimeter.

It is anticipated by the Applicant that various types of thermocouples or thermistors can be used for the present invention. It is not important what type of thermocouple or thermistor is utilized for monitoring or measuring the temperature of the water entering the shower head, bath head or water supply lines except that it is accurate for the appropriate temperature range monitored or measured.

In order to monitor or measure the flow rate of the water being delivered by the water supply line various flow measuring technologies are applicable to the present invention. For measuring or monitoring the rate of the water flowing through the shower or bath head, the use of various venturi type sensors or pressure sensors 74 as depicted in FIG. 4 are positioned in close proximity to the water to be measured.

One means to monitor flow parameter is to create a venturi, which constricts the flow in some fashion, and measure the differential pressure that results across the constriction. This method is widely used to measure flow rate in the transmission of gas or liquids trough pipelines, and has been used since Roman Empire times. The venturi effect is all example of Bernoulli's principle, in the case of incompressible fluid flow through a tube or pipe with a constriction in it. The fluid velocity must increase through the constriction to satisfy the equation of continuity, while its pressure must decrease due to conservation of energy: the gain in kinetic energy is supplied by a drop in pressure or a pressure gradient force. The effect is named after Giovanni Battista Venturi, (1746-1822), an Italian physicist.

Using Bernoulli's equation in the special case of incompressible fluids (such as the approximation of a water jet), the theoretical pressure drop at the constriction would be given by the formula:

$$(p2)(v_2^2 - v_1^2)$$

In addition, the flow sensor 74 can be fabricated from pressure sensor technology. Pressure sensors are used in numerous ways for control and monitoring in thousands of everyday applications. Pressure sensors can be used in systems to measure other variables such as fluid/gas flow, speed, water level, and altitude. Pressure sensors can alternatively called pressure transducers, pressure transmitters, pressure senders, pressure indicators among other names.

Pressure sensors can vary considerably in technology, design, performance, application suitability and cost. A conservative estimate would be that there may be over 50 technologies and at least 300 companies making pressure sensors worldwide.

There are also a category of pressure sensors that are designed to measure in a dynamic mode for capturing very high speed changes in pressure. Example applications for this type of sensor would be in the measuring of combustion pressure in a engine cylinder or in a gas turbine. These sensors are commonly manufactured out of piezoelectric materials like quartz.

Some pressure sensors function in a binary manner, i.e., when pressure is applied to a pressure sensor, the sensor acts to complete or break an electrical circuit. Some speed cameras use them. These types of sensors are also known as a pressure switches.

In addition, various flow measuring technologies can be utilized as the flow sensor 74. In general, a flow sensor is a device for sensing the rate of fluid flow. Typically a flow sensor is the sensing element used in a flow meter, or flow logger, to record the flow of fluids. There are various kinds of flow meters, including some that have a vane that is pushed by the fluid, and can drive a rotary potentiometer, or similar device. Other flow meters use a displacement piston, pushing it against a spring. Flow meters are related to devices called velocimeters that measure velocity of fluids flowing through them. Laser-based interferometry is often used for air flow measurement, but for liquids, it is often easier to measure the flow. Another approach is Doppler-based methods for flow measurement. Hall effect sensors may also be used, on a flapper valve, or vane, to sense the position of the vane, as displaced by fluid flow. A fluid dynamics problem is easily solved (especially in non-compressible fluids) by knowing the flow at all nodes in a network. Alternatively, pressure sensors can be placed at each node, and the fluid network can be solved by knowing the pressure at every node. These two situations are analogous to knowing the currents or knowing the currents at every node (noncompressible fluid being conserved in the same manner as Kirchoff's current or voltage laws, in which conservation of fluid is analogous to conservation of electrons in a circuit). Flow meters generally cost more than pressure sensors, so it is often more economical to solve a fluid dynamics network monitoring problem by way of pressure sensors, than to use flow meters.

In addition, there are several types of mechanical flow meters that can be utilized with the present invention as the flow sensor 74 that are listed below.

Piston Meter—Due to the fact that they used for domestic water measurement Piston meters, (also known as Rotary Piston, or Semi-Positive displacement meters) are the most common in the UK and are used for almost all meter sizes up to and including 40 mm (1½"). The piston meter operates on the principle of a piston rotating within a chamber of known volume. For each rotation, an amount of water passes through the piston chamber. Through a gear mechanism and, sometimes, a magnetic drive, a needle dial and odometer type display is advanced.

Woltmann Meter—Woltman meters, commonly referred to as Helix meters are popular at larger sizes. Jet meters (single or Multi-Jet) are increasing in popularity in the UK at larger sizes and are commonplace in the EU.

Dall Tube—A shortened form of the Venturi. Lower pressure drop than an orifice plate.

Orifice Plate—Another simple method of measurement uses an orifice plate, which is basically a plate with a hole through it. It is placed in the flow and constricts the flow. It uses the same principle as the venturi meter in that the differential pressure relates to the velocity of the fluid flow (Bernoulli's principle).

Pitot tube—Measurement of the pressure within a pitot tube in the flowing fluid, or the cooling of a heated element by the passing fluid are two other methods that are used. These types of sensors are advantageous in that they are rugged, so not easily damaged in an extreme environment. A pitot tube is an L shaped tube which is also able to measure fluid flow.

Paddle wheel—The paddle wheel translates the mechanical action of paddles rotating in the liquid flow around an axis into a user-readable rate of flow (gpm, lpm, etc.). The paddle tends to be inserted into the flow.

Pelton wheel—The Pelton wheel turbine (better described as a radial turbine) translates the mechanical action of the Pelton wheel rotating in the liquid flow around an axis into a user-readable rate of flow (gpm, lpm, etc.). The Pelton wheel tends to have all the flow travelling around it.

Turbine flow meter—The turbine flowmeter (better described as an axial turbine) translates the mechanical action of the turbine rotating in the liquid flow around an axis into a user-readable rate of flow (gpm, lpm, etc.). The turbine tends to have all the flow travelling around it.

Thermal mass flow meters—Thermal mass flow meters generally use one or more heated elements to measure the mass flow of gas. They provide a direct mass flow readout, and do not need any additional pressure temperature compensation over their specified range. Thermal mass flow meters are used for compressed air, nitrogen, helium, argon, oxygen, natural gas. In fact, most gases can be measured as long as they are fairly clean and non-corrosive.

Vortex flowmeters—Another method of flow measurement involves placing an object (called a shedder bar) in the path of the fluid. As the fluid passes this bar, disturbances in the flow called vortices are created. The vortices trail behind the cylinder in two rolls, alternatively from the top or the bottom of the cylinder. This vortex trail is called the Von Kármán vortex street after von Karman's 1912 mathematical description of the phenomenon. The speed at which these vortices are created is proportional to the flow rate of the fluid. Inside the shedder bar is a piezoelectric crystal, which produces a small, but measurable, voltage pulse every time a vortex is created. The frequency of this voltage pulse is also proportional to the fluid flow rate, and is measured by the flowmeter electronics. With f=SV/L where, f=the frequency of the vortices L=the characteristic length of the bluff body V=the velocity of the flow over the bluff body S=Strouhal Number and is a constant for a given body shape.

In addition, various magnetic, ultrasound and Coriolis flow meters can be utilized with the present invention to function as the flow sensor 74. Modern innovations in the measurement of flow rate incorporate electronic devices that can correct for varying pressure and temperature (i.e. density) conditions, non-linearities, and for the characteristics of the fluid. The most common flow meter apart from the mechanical flow meters, is the magnetic flow meter, commonly referred to as a "mag meter" or an "electromag". A magnetic field is applied to the metering tube, which results in a potential difference proportional to the flow velocity perpendicular to the flux lines. The physical principle at work is Faraday's law of electromagnetic induction. The magnetic flow meter requires a conducting fluid, e.g. water, and an electrical insulating pipe surface, e.g. a rubber lined non-magnetic steel tube.

Ultrasonic flow meters—Ultrasonic flow meters measure the difference of the transit time of ultrasonic pulses propagating in and against flow direction. This time difference is a measure for the average velocity of the fluid along the path of the ultrasonic beam. By using the absolute transit times both the averaged fluid velocity and the speed of sound can be calculated. Using the two transit times $t_{up}$ and $t_{down}$ and the distance between receiving and transmitting transducers L and the inclination angle α one can write the equations:

$$v = \frac{L}{2\sin(\alpha)} \frac{t_{up} - t_{down}}{t_{up}t_{down}} \text{ and } c = \frac{L}{2} \frac{t_{up} + t_{down}}{t_{up}t_{down}}$$

Where v is the average velocity of the fluid along the sound path and c is the speed of sound.

Measurement of the doppler shift resulting in reflecting an ultrasonic beam off the flowing fluid is another recent innovation made possible by electronics. By passing an ultrasonic beam through the water pipe, bouncing it off of a reflective plate then reversing the direction of the beam and repeating the measurement the volume of water flow can be estimated. The speed of transmission is affected by the movement of water in the supply pipe and by comparing the time taken to complete the cycle upstream versus downstream the flow of water through the supple pipe can be measured. The difference between the two speeds is a measure of true volume flow. A wide-beam sensor can also be used to measure flow independent of the cross-sectional area of the water pipe.

Coriolis flow meters—Using the Coriolis effect causes a laterally vibrating tube to distort, a direct measurement of mass flow can be obtained in a Coriolis flow meter. Furthermore, a direct measure of the density of the fluid is obtained. Coriolis measurement can be very accurate irrespective of the type of gas or liquid that is measured; the same measurement tube can be used for hydrogen gas and peanut butter without recalibration.

Laser-doppler flow meter. Fluid flow can be measured through the use of a monochromatic laser diode. The laser probe is inserted into a water pipe and turned on, where the light scatters and a small portion is reflected back to the probe. The signal is then processed to calculate flow within the water pipe. There are limitations to the use of a laser doppler probe; flow within a water pipe is dependent on volume illuminated, which is often assumed rather than measured and varies with the optical properties of the water pipe. In addition, variations in the type and placement of the probe within identical water pipes result in variations in reading. The laser doppler has the advantage of sampling a small volume of water, allowing for great precision, but does not necessarily represent the flow within an entire water system. The flow meter is more useful for relative rather than absolute measurements.

It is anticipated that the individual water sensors 95 can be installed at particular areas of the house, for example, the showers, the kitchen faucet, the bathroom faucets, the bathroom tub, the bathroom toilets, the washing machine, water heater, dishwasher and/or the outside irrigation system. In addition, additional outdoor water uses such as pool water maintenance (water addition), Jacuzzi, and water fountains can be included for water use monitoring. The individual water sensors 95 in different areas of a house (or corporation) can be transferred to an owner, individual user, corporate responsible individuals, government agencies or municipalities to review water use and water conservation information on a remote device, such as a cell phone, smart phone, or similar apparatus, or to a remote computer.

The flow sensors with 95 can communicate wirelessly or wired 94 with the microprocessor or microcontroller 84 that has software that learns about water usage at a particular station, home, and/or company. Calibration of the sensors with the base station 10, 126 can be initiated by pressing hard buttons 114, 116, and 118 and/or software button activators 140, 144, and 146 on the base station 10, 126, or by the remote display and/or a recording apparatus 50, and/or typical cell phones, smart phones and similar apparatus 40 can be located remotely from the base station 10, 126. In this embodiment, the multiple independent flow sensors 95 can communicate the independent water usage by wired or wireless communicating a unique code to the base station 10, 126 that is programmed to calculate transfer of data for a specific period directly by the microprocessor or microcontroller 84 for processing. Then such water parameter information can be transfer to a remote source, e.g. remote display and/or a recording apparatus 50, 110 and/or a typical cell phone, smart phone, or similar apparatus 400, or to a remote computer. In this embodiment, the multiple flow sensors 95 can be engaged to the main water supply, irrigation system, washing machine, water heater, dishwasher, kitchen faucets, bathroom faucets, and/or toilets, and any combinations thereof, and send unique code data to the microprocessor or microcontroller 84 must be programmed through a calibration phase.

In another embodiment, an owner/user can enter a programmed "water use calibration mode" by pressing a specific hard or soft button on the base station 10, 126 or touch screen display 80, or sending an electronic signal from a display and/or recorded apparatus 50, 110 and/or another remote device such as a cell phone, smart phone, or similar apparatus 400, or to from a remote computer. Since independent water use apparatuses with associated water control valves and/or flow control mechanisms have unique flow rates, and pressure and sound patterns when closed or opened, the base station flow sensor, and the optional pressure sensor and optional acoustic/sound monitoring mechanism, can be incorporated into the base station 10, 126 and function to assist identify the independent water use apparatus and its water control valve and/or flow control mechanism. In the first phase, while the base stations 10, 126 is in the water use apparatus calibration mode, the user independently turns on one water use apparatus (e.g. washing machine) for a specified period and the calibration software monitors the flow rate, the optional pressure and optional sound patterns for that particular water use apparatus. The user continues these steps for each independent water use apparatus until all water use apparatuses desired to be monitored and are calibrated. The software can use the calibration data for each water use apparatus and record its water pattern or signature (actual independent flow rates, variation of flow rate over time, measured duration, variations in pressure patterns (e.g. pressure changes at onset of water flow and pressure changes when turned off, and any variations during water flow duration, and optional acoustic/sound frequency) to assign and record the pattern or signature of water use to a particular water use device. Then, when water use data can be communicated to a display and/or a recording apparatus 50, 110 and/or cell phone, smart phone, or similar apparatus 400, or to a remote computer, the independent flow rates and water use can be displayed appropriately in an graphic (e.g. pie) format (see FIG. 9A).

It is anticipated by the Applicant that there can be an "Automatic Learning Mode" where the software learns about a owner's water use in a residence, corporation, building or structure over time without the calibration steps. In this embodiment, a single water flow sensor located at or in close proximity to the base stations 10, 126 incorporates the automatic learning mode software. Since independent water use devices and their associated water valves and/or flow control mechanisms have unique flow rates, and pressure and sound patterns when being closed or opened, the base station flow sensor, and the optional pressure sensor and optional acoustic/sound monitoring mechanism, can be incorporated into the base station 10, 126 and function to assist identify the independent water use device and its water control valve and/or flow control mechanism. A user can enter into a programmed "Automatic Learning Mode", by pressing a specific hard or soft button on the base station 10, 126 or touch screen display 80, or sending an electronic signal from a display and/or recorded apparatus 50, 110 and/or another remote device such as a cell phone, smart phone, or similar apparatus 400, or to a remote computer which initiates the software to monitor the water use that occurs during the next weeks or months, and during this period the software enters an automatic learning phase. In this phase, the base station with automatic learning mode software privately tracks an owner's water flow and volume use during each day, week and/or month, for each independent water use apparatus, monitoring and recording the water use at during different times of the day and days of the week. As one example, after a period of time, the automatic learning mode software monitors a washing machine and determines the range of water flow used and, records the water flow pattern or signature (actual independent flow rates, variation of flow rate over time, duration, variations in optional pressure patterns (e.g. pressure changes at onset of water flow and pressure changes when turned off, and any variations during water flow duration, and optional acoustic/sound frequency) during the duration of water use and determine timing parameters, and creates unique water use patterns or signature to identify the example washing machine water use. In another example, generally after a toilet is flushed, usually within a minute or two the bathroom faucet would turn on (to wash one's hands), the automatic learning mode software can identify the pattern, water use and timing parameters, and optionally use pressure and acoustic/sound frequency patterns to identify the both toilet(s) and bathroom faucet(s) water use. The automatic learning software could analyze, record, and store actual independent flow rates, variation of flow rate over time, typical durations, variations in pressure patterns (e.g. pressure changes at onset of water flow and pressure changes when turned off, and any variations during water flow duration, (and optional acoustic/sound frequency) to assign the unique patterns of water use for the toilet and bathroom faucet. In another example, either during or soon after a shower (and the software recognized the shower water use pattern), the hot water heater begins using water to replenish the hot water used for the shower. The automatic learning software can analyze, record and store actual independent flow rates, variation of flow rate over time, expected duration, variations in pressure patterns (e.g. pressure changes at onset of water flow and pressure changes when turned off, and any variations during water flow duration, (and optional acoustic/sound frequency) to assign the patterns of water use for both the shower and hot water heater. Irrigation watering usually occurs at a regular pattern (generally in the morning or evening hours) and the learning software could record and store flow and duration patterns for irrigation. The automatic learning software could record and store actual independent flow rates, variation of flow rate over time, expected duration, variations in pressure patterns (e.g. pressure changes at onset of water flow and pressure changes when turned off, and any variations during water flow duration, (and optional acoustic/sound frequency) to assign the unique patterns of water use for the, toilet, bathroom faucet, shower hot water heater, and irrigation system). Then, when water use data can be communicated to a cell phone, smart phone, or similar apparatus, or to a remote computer, and the independent flow rates and water use can be displayed appropriately in an graphic (e.g. pie) format (See FIG. 9A).

In addition, as referred to in FIG. 6, optionally sensitive flow sensor(s) 120a, 120b, 121 and 123, 121 and 123 can be mounted at appropriate locations with monitoring software incorporated into either the flow sensors or the water use and water energy use monitoring display apparatus base station 10, 126 can be employed to monitor leaks that are ascertained, that can communicate to the present invention water monitoring base station. A warning can be displayed on the first remote monitor or an immediate message can be sent to a programmed cell phone number by wireless communication means 46, 52 and/or 54. In this optional operation, a plurality of wireless or wired water very sensitive flow sensors 120a, 120b, 121 and 123, 121 and 123 can be installed in close proximity of the supply lines, for example washing machines, sprinkler systems, refrigerator water supply lines, and other potential leaking sites, The water use and water energy use monitoring display apparatus base unit 10, 126 periodically reads and stores data point water flow information corresponding to either a flow condition, no flow condition, or a slow flow condition through the supply line of the particular water fixture. Alternately, the pressure sensor can be in communication with the water supply line and can be used to determine leaks. For example, the water control valve can be turned off at a specified period of time to determine if the water pressure decreased, indicating a water leak condition. The water use and water energy use monitoring display apparatus base station 10, 126 is configured to periodically receive a stream of stored data points from the at least one wireless flow sensor node by way of at least one coordinator node. The base station is configured to determine, based on an analysis of the stream of data points, whether a leak exists in at least one of the water fixtures. The water use and water energy use monitoring display apparatus base station 10, 126 is designed, the when a leak is detected, to provide a warning light, display, or alarm, or using the wired or wireless technology or third communication means 46, 52 and/or 54) to communicate the leak condition to a resident, commercial unit operator or manager, repair service person and/or municipal or governmental agency. The communication can be wirelessly transmitted by WIFI or cell format technology, microwave technology or satellite communication technology.

The base station 10, 126 can be programmed to automatically send a signal to turn off the main water supply when a leak is sensed. If there are independent water control devices mount remotely from the base station 10, 126, the base station can communicate wirelessly or hard wired with the leak monitoring/control devices. With multiple sensors positioned around a residence or corporation, government agency or institution, it can also send out the location of the leak, e.g. at the washing machine, kitchen faucet, water heater. It is anticipated that a single water flow sensor located at the base station 10, 126 can function to determine the presence of a leak. The single water flow sensor can be an invasive type, e.g. water turbine, impeller flow and/or paddle wheel, or non-invasive e.g. ultrasonic and/or magnetic flow sensor. The software can monitor the single flow sensor and if the water flow continues for a long period of time and is relatively continues in flow rate, the presence or a broken pipe, faucet left on, or water heater failure, other condition, an alarm can be initiated and then text or email messages sent to a cell phone, smart phone or similar apparatus, visual lights or audio sounds, and/or the water control means can shut off the main water supply to the residence or corporation. It is therefore an object of the present invention to providing a system whereby residential property owner or industrial/commercial owner may easily protect themselves against catastrophic damages caused by broken water pipes or leaking fixture.

In addition, as shown in FIG. 4, is an optional halogen (chloride or fluoride) sensor 76. There are currently several types sensors and technology are available on the commercial market that can be used with the present invention as chlorine and fluoride are common compounds or elements that are added to the water supply in an attempt to maintain clean water. The sensor 76 communicates with the water use and water energy use monitoring display apparatus base station apparatus 10, 126 through wired 77 (or wireless means) which includes specific software instructions to display the halogen parameter on one of the displays or provide an alarm that is programmed that is triggered when an certain level or percentage is exceeded.

In addition, as shown in FIG. 4, is an optional Total Dissolved Solids (TDS) sensor 78 measures are the total amount of mobile charged ions, including minerals, salts or metals dissolved in a given volume of water, expressed in units of mg per unit volume of water (mag/L), also referred to as parts per million (ppm). TDS is directly related to the purity of water and the quality of water purification systems and affects everything that consumes, lives in, or uses water, whether organic or inorganic, whether for better or for worse. "Dissolved solids" refer to any minerals, salts, metals, cations or anions dissolved in water. This includes anything present in water other than the pure water (H20) molecule and suspended solids. (Suspended solids are any particles/substances that are neither dissolved nor settled in the water, such as wood pulp.) In general, the total dissolved solids concentration is the sum of the cations (positively charged) and anions (negatively charged) ions in the water. Parts per Million (ppm) is the weight-to-weight ratio of any ion to water. A TDS sensor or meter is based on the electrical conductivity (EC) of water. Pure H20 has virtually zero conductivity. Conductivity is usually about 100 times the total cations or anions expressed as equivalents. TDS is calculated by converting the EC by a factor of 0.5 to 1.0 times the EC, depending upon the levels. Typically, the higher the level of EC, the higher the conversion factor to determine the TDS. TDS comes from organic sources such as leaves, silt, plankton, and industrial waste and sewage. Other sources come from runoff from urban areas, road salts used on street during the winter, and fertilizers and pesticides used on lawns and farms. Dissolved solids also come from inorganic materials such as rocks and air that may contain calcium bicarbonate, nitrogen, iron phosphorous, sulfur, and other minerals. Many of these materials form salts, which are compounds that contain both a metal and a nonmetal. Salts usually dissolve in water forming ions. Ions are particles that have a positive or negative charge. Water may also pick up metals such as lead or copper as they travel through pipes used to distribute water to consumers. Note that the efficacy of water purifications systems in removing total dissolved solids will be reduced over time, so it is highly recommended to monitor the quality of a filter or membrane and replace them when required. The sensor 78 communicates with the water use and water energy use monitoring display apparatus base station apparatus 10, 126 through wired 79 (or wireless means) which includes specific software instructions to display the TDS parameter on one of the displays or provide an alarm that is programmed that is triggered when an certain level or percentage is exceeded.

The EPA Secondary Regulations advise a maximum contamination level (MCL) of 500 mg/liter (500 parts per million (ppm)) for TDS. Numerous water supplies exceed this level. When TDS levels exceed 1000 mg/L it is generally considered unfit for human consumption. A high level of TDS is an indicator of potential concerns, and warrants further investigation. Most often, high levels of TDS are caused by the presence of potassium, chlorides and sodium. These ions have little or no short-term effects, but toxic ions (lead arsenic, cadmium, nitrate and others) may also be dissolved in the water.

In addition, as shown in FIG. 4, is an optional sensor 130 to measure or monitor the amount of metallic substances such as iron. Metallic or iron content in water can cause discoloration and other problems. It is anticipated by the Applicant that sensors for other metals, such as mercury, copper, silver, lead, or metallic elements can be utilized with the present invention. Mercury and lead consumption and exposure are known to be hazardous to humans. One method known to measure iron in a water sample is to use a Hall sensor biased with a magnet. As the sensor is positioned over the iron, more flux will pass through the Hall sensor. The sensor 130 communicates with the water use and water energy use monitoring display apparatus base station apparatus 10, 126 through wired 131 (or wireless means) which includes specific software instructions to display the metallic or iron parameter on one of the displays or provide an alarm that is programmed that is triggered when a certain level or percentage is exceeded.

In addition, as shown in FIG. 4, is a biological or fecal coliform (bacteria) sensor 132. In general, increased levels of fecal coliforms provide a warning of failure water treatment, a break in the integrity of the distribution system, or possible contamination with pathogens. When levels are high there may be an elevated risk of waterborne diseases or gastroenteritis. The presence of fecal coliform in water system may indicate that the water has been contaminated with the fecal material of humans or other animals. Fecal coliform bacteria can enter rivers or storm drains through direct discharge of waste from mammals and birds, from agricultural and storm runoff, and from human sewage. Failing home septic systems can allow coliforms in the effluent to flow into the water table, aquifers, drainage ditches and nearby surface waters and can contaminate wells or water systems. Sewage connections that are connected to storm drains pipes can also allow human sewage into surface waters. Some older industrial cities, particularly in the Northeast and Midwest of the United States, use a combined sewer system to handle waste. A combined sewer carries both domestic sewage and storm-water. During high rainfall periods, a combined sewer can become overloaded and overflow to a nearby stream or river, bypassing treatments. Pets can contribute to fecal contamination of surface waters. Runoff from roads, parking lots, and yards can carry animal wastes to streams through storm sewers. Birds can be a significant source of fecal coliform bacteria Agricultural practices such as allowing livestock to graze near water bodies, spreading manure as fertilizer on fields during dry periods, using sewage sludge bio-solids and allowing livestock watering in streams can all contribute to fecal coliform contamination. Some waterborne pathogenic diseases that may coincide with fecal coliform contamination include ear infections, dysentery, typhoid fever, viral and bacterial gastroenteritis, and hepatitis A and C. Reduction of fecal coliform in wastewater may require the use of chlorine and other disinfectant chemicals. Such materials may kill the fecal coliform and disease bacteria. They also kill bacteria essential to the proper balance of the aquatic environment, endangering the survival of species dependent on those bacteria. So higher levels of fecal coliform require higher levels of chlorine, threatening those aquatic organisms. Municipalities that maintain a public water supply will typically monitor and treat for fecal coliforms. In waters of the U.S., Canada and other countries, water quality is monitored to protect the health of the general public. In the U.S., fecal coliform testing is one of the nine tests of water quality that form the overall water-quality rating in a process used by U.S. EPA. However, in certain situations, such as septic systems, wells, and cross-contamination in plumbing distal to the site where water quality is tested, provides a risk. The fecal coliform assay should only be used to assess the presence of fecal matter in situations where fecal coliforms of non-fecal origin are not commonly encountered. EPA has approved a number of different methods to analyze samples for bacteria. The sensor 132 communicates with the water use and water energy use monitoring display apparatus base station apparatus 10, 126 through wired 133 (or wireless means) which includes specific software instructions to display the fecal coliform parameter on one of the displays or provide an alarm that is programmed that is triggered when an certain level or percentage is exceeded.

The monitoring of fecal coliform and other contaminates may also become very important where many municipalities and cities are considering the use of sewage treated water, commonly known as grey water, and contamination may be useful in these situations.

In addition, as shown in FIG. 4, is an optional pH sensor 134. Various pH sensors available in the current market can be utilized with the present invention. The sensor 134 communicates with the water use and water energy use monitoring display apparatus base station apparatus 10, 126 through wired 135 (or wireless means) which includes specific software instructions to display the pH parameter on one of the displays or provide an alarm that is programmed that is triggered when a certain level or percentage is exceeded.

In additional, as shown in FIG. 4, is an optional water hardness sensor 136. As pure water is a good solvent and picks up impurities easily and is often called the universal solvent. When water is combined with carbon dioxide to form very weak carbonic acid, an even better solvent results. As water moves through soil and rock, it dissolves very small amounts of minerals and holds them in solution. Calcium and magnesium dissolved in water are the two most common minerals that make water "hard." The degree of hardness becomes greater as the calcium and magnesium content increases and is related to the concentration of multivalent cations dissolved in the water. Hard water interferes with almost every cleaning task from laundering and dishwashing to bathing and personal grooming. Clothes laundered in hard water may look dingy and feel harsh and scratchy. Dishes and glasses may be spotted when dry. Hard water may cause a film on glass shower doors, shower walls, bathtubs, sinks, faucets, etc. Hair washed in hard water may feel sticky and look dull. Water flow may be reduced by deposits in pipes. Dealing with hard water problems in the home can be a nuisance. The amount of hardness minerals in water affects the amount of soap and detergent necessary for cleaning. Soap used in hard water combines with the minerals to form a sticky soap curd. Some synthetic detergents are less effective in hard water because the active ingredient is partially inactivated by hardness, even though it stays dissolved. Bathing with soap in hard water leaves a film of sticky soap curd on the skin. The film may prevent removal of soil and bacteria. Soap curd interferes with the return of skin to its normal, slightly acid condition, and may lead to irritation. Soap curd on hair may make it dull, lifeless and difficult to manage. When doing laundry in hard water, soap curds lodge in fabric during washing to make fabric stiff and rough. Incomplete soil removal from laundry causes graying of white fabric and the loss of brightness in colors. A sour odor can develop in clothes. Continuous laundering in hard water can shorten the life of clothes. In addition, soap curds can deposit on dishes, bathtubs and showers, and all water fixtures. Hard water also contributes to inefficient and costly operation of water-using appliances. Heated hard water forms a scale of calcium and magnesium minerals that can contribute to the inefficient operation or failure of water-using appliances. Pipes can become clogged with scale that reduces water flow and ultimately requires pipe replacement.

The hardness of your water is generally reported in grains per gallon, milligrams per liter (mg/l) or parts per million (ppm). One grain of hardness equals 17.1 mg/l or ppm of hardness.

The Environmental Protection Agency establishes standards for drinking water which fall into two categories—Primary Standards and Secondary Standards.

Primary Standards are based on health considerations and Secondary Standards are based on taste, odor, color, corrosivity, foaming, and staining properties of water. There is no Primary or Secondary standard for water hardness. Water hardness is classified by the U.S. Department of Interior and the Water Quality Association as follows:

| Classification | mg/l or ppm | grains/gal |
| --- | --- | --- |
| Soft | 0-17.1 | 0-1 |
| Slightly hard | 17.1-60 | 1-3.5 |
| Moderately hard | 60-120 | 3.5-7.0 |
| Hard | 120-180 | 7.0-10.5 |
| Very Hard | 180 & over | 10.5 & over |

NOTE:
Other organizations may use slightly different classifications.

The sensor 136 communicates with the water use and water energy use monitoring display apparatus base station apparatus 10, 126 through wired 13 (or wireless means) which includes specific software instructions to display the pH parameter on one of the displays or provide an alarm that is programmed that is triggered when an certain level or percentage is exceeded. The water parameter use and monitoring apparatus can use a typical cell phone, smart phones, or similar apparatus includes an application (APP) for a consumer/resident, corporate entity, or municipality that show water quality parameters.

Now referring to FIG. 5, which presents a more detailed example 110 of the first remote display and/or recording apparatus 50 or the second optional (handheld) display and/or recording apparatus 56. The first display/recording apparatus 50 or optional second (handheld) display and/or recording apparatus 56, represented as apparatus 110, includes a housing or container 112, display means 114, 116, and 118 and/or software control buttons 140, 142, and 144, the electronic circuit board (microprocessor) with wire or wireless capability, and power source which are common components between the two display and/or recording apparatuses. It is also anticipated that an optional third display/recorder (not shown) could utilized with computer or television that has an internet, intranet, wire or wireless means. In addition, it is anticipated by the Applicant that the first 50, second 56 and third display recorders could be a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, a smart or internet capable television, wireless timepiece or wireless watch (Apple. Samsung) and other similar apparatus with WIFI and wireless capability, and remote computers and controllers having internet, wireless and/or cell format technology connectivity.

In this first display/recorder 50, the second display/recorder 56, or the third computer, televisions or a typical cell phone, smart phones, or similar apparatus can utilize custom software and/or market software that will be used to transfer the water parameter information from the primary or secondary water/energy use monitoring display apparatus 10, 126 to the first display and/or recording apparatus 50, the second display and/or recording apparatus 56, or the third computer or television.

The example of the first remote display and/or recording apparatus 50, or the second remote display/recording apparatus 56, represented as apparatus 110, includes within the housing or container 112, a computerized circuit board (depicted in FIG. 3), that communicates with the one or more display means 114, 116, and 118. The housing 112 can have an optional door for replacing a battery power source or removable data chip, or electrical connector for regenerating the power source. The apparatus 110 has a plurality of buttons 120, 122, and 124 and/or software buttons or activators (e.g. touch screen) 140, 142, 144 that allow for certain modification of the software instructions (change units, change language, change from metric to US standard, set alarms, initiate communication with wired or wireless means). While FIG. 5 shows three hard buttons 114, 116, and 118 and six software button activators 140, 144, and 146, it is anticipated by the Applicant that a different series of hard or software buttons can be used, and/or a different series of software button sequencing can be utilized. For example, other hard button technology can be used, such as a rotary switches or multiple membrane switch technology. The housing or container 112 can be fabricated from a metallic material such as brass, brass alloys, steel, galvanized steel, copper, copper allows or any combination thereof. The display means housing can be fabricated from a number of polymeric materials, such as polyvinyl chloride (PVC), polyethylene, polybutylene, acryaontirile-butadiene-styrene (ABS), rubber modified styrene, polypropylene, polyacetal, polyethylene, or nylon. The base material can be painted white or colored finishes or coated with various brass, silver and gold type materials to accommodate the match with various presently marketed finishes. The material for fabricating the housing 112 is not particularly important except and the size of the display means will generally determine the size of the housing but it does not have to be substantially rectangular as shown, any number of geometric configurations could be used in the present invention.

The plurality of display means 114, 116, and 118 and as presented in FIG. 5 utilizes one or more illuminating technologies, such as LCD, LED, gas plasma, fluorescence, incandescent, halogen, halide, or other lighting technologies but should be able to provide sufficient lighting for observing the data and information in dark conditions. In addition, the display means and display means housing should be able to sustain capability in moist wet conditions. The present invention can include one or more than one display means to show various water use and water energy use parameters. Provided only as an example, display means 114, 116, and/or 118 can display different levels of water use with a color hue or format providing a visual cue or water use or alarm conditions. For example, a green background or parameter digits for a $1^{st}$ hundred cubic feet (e.g. a first 14 HCF) level, yellow background or parameter digits for a $2^{nd}$ hundred cubic feet (a second 14 HCF) level, and red background or parameter digits for a $3^{rd}$ hundred cubic feet (28 HCF) level, can be displayed. For example, the other embodiment with only the flow and water use display can be manufactured to reduce overall costs. Furthermore, the orientation of the water use and water energy use parameters can be presented in various formats. For example, the flow parameter can be on top 114 with the date parameter on the bottom 118 and with the energy parameter sandwiched between 116. The displays 114, 116, and 118 can have a background light or parameter alpha-numeric digits that is used for various purposes, for example, for providing better lighting conditions or changing colors e.g. from green to yellow and to red, to display alarming condition (e.g. water use over time has exceed a certain level). Displaying of all water and water energy parameters can utilize a gang multiple LCD, LED, gas plasma, fluorescence, incandescent, halogen, halide, or other lighting technologies separate displays, custom displays, graphic displays or a single line display which sufficient digits that sequences the presentation of the water parameters and water energy parameters one at a time with a specific delay and sequencing. An example of a LCD unit that can be used with the present invention is the color graphic 128×128 LCD-00569 marketed by Sparkfun Electronics in Boulder, Colo. Digitikey, Mouser and other electronic supply warehouses have many other variants and other LCD, LED, gas plasma, fluorescence, incandescent, halogen, halide, or other lighting technologies that can be utilized with the present invention.

The display means 114, 116, and 118 can be programmed to display one or more parameters in a visual means that can be either an analog, character or digital display, or combination of display means. Information obtained from the appropriate sensor monitoring or measuring the water parameters such as temperature, date/time, and flow rate can be displayed in an appropriate format on the display means. For example, when a sensor is monitoring or measuring the rate of water flowing from a water source or through the shower head, the display means could show any flow between 0 gal/min (0 liters/min) to many thousands of gals/day. For example, when a sensor is monitoring the shower temperature of water flowing through the housing, the display means could show any energy ratio calculation that takes into effect the overall temperature and total volume of heated water vs. the total volume of cold or ambient water. It is anticipated by the Applicant that many different water energy calculations might be utilized by the present invention. Furthermore, the display can be programmed to display calendar information, such as the date and current time (12 hr. or 24 hr. format).

It is anticipated by the Applicant the present invention can be fabricated and marketed with one, two or more display means. For example, a lower cost display assembly can be fabricated and sold that only has a temperature sensor and temperature display means. A more expensive display assembly can be fabricated and sold that has temperature, flow, timing and other sensors with various programmed methods and a shut off mechanism.

Also shown in FIG. 5, one or more ergonomically 120, 122, 124 placed buttons or activators which can be incorporated into the display means housing or container or touch screen software buttons 140, 142, and/or 144 to allow the modification of certain parameter units (e.g. metric to US), set alarm conditions (e.g. flow/volume rate-set points), or to program certain settings, e.g. over water use alarm, monitor continuous leakage (valve not complete shut off). The buttons will electrically communicate with the electronic circuit board and microprocessor 84 contained within the housing or container 112 and respond to programmed instructions integrated within the CPU or microprocessor 84 and associated circuitry of the electronic circuit board. The buttons or activators 120, 122 and/or 124 should be mounted with the display means housing or container 112 with the capability to protect the buttons and electronic circuitry with the housing for exposure to moist and wet conditions. It is also an alternative design to use touch sensitive display means or touch screen technology.

Also as shown in FIG. 3 but applicable to FIG. 5, is an CPU or microprocessor 84 and associated circuitry mounted on a electronic circuit board with a power source and contained within the first remote display and/or recording apparatus 50, or the second remote display and/or recording apparatus 56. The microprocessor 84 controls the display and/or recording apparatuses and communicates with the sensors. The CPU or microprocessor 84 and associated circuitry mounted on the electronic circuit board can also have the capability to be programmed for controlling certain display means (e.g. U.S. or metric units), programming certain alarm or setting states (e.g. flash all display means red when the total volume has exceeded a certain volume, for example, 150 gallons/day).

Now referring to FIG. 6 is a perspective view home 119 having of a plurality of optional sensitive water flow sensors with one-way transmission, half duplex or full duplex transceivers 120*a*, 120*b*, 121 and 123, attached to various locations for monitoring water use and furthermore for monitoring for water leaks in addition to the flow sensor 74.

In regard to FIG. 6, the wireless data transfer or communication means can use radio-frequency, Bluetooth, ZigBee, WiFi, optical or other wireless technology for transferring the water parameter data generated by the water use, water energy and water quality sensors and collected by the microprocessor 84 and sent to a remote display and/or recording apparatus 50, 56. Display and/or recorder receiver apparatus 50, 56 can have the function allows an individual or entity to review that data for auditing or monitoring purposes. Examples of Bluetooth modules (using the 2.4 GHz band as WiFi) that can be added to the present invention are the RN-41 Bluetooth modules available from Roving Networks in Los Gatos, Calif., the KC-41, KC 11.4, KC-5100, KC-216 or KC-225 data serial modules from KC Wireless in Tempe Ariz., and/or the BT-21 module from Amp'ed RF wireless solutions in San Jose, Calif. Examples of wireless protocols that can be utilized with the present invention include, but are not limited to, the IEEE 802.11a, IEEE 802.11b, IEEE 802.11g and IEEE 802.11n modulation techniques. Another example of the wireless protocols that can be utilized with the present invention is the ZigBee, Z-wave and IEE 802.15.4 modulation technology. Applicants recognize that there are numerous wireless protocols that have been developed that, although not specifically listed, could be utilized with the present invention for data transfer purposes.

In addition, the wireless or wire data transfer can be connected to the Internet using the IP or DHCP protocols whereby the data can be monitored remotely over the Internet using a software program designed to record, display, analyze and/or audit the water parameter data. The present invention would probably have to "log on" to a server to report the water parameters or it could respond to queries once its presence is known to the server.

Also some wireless routers support a form of "private" point-to-point or bridging operation which could be used to transfer water parameter data from the present invention to a receiving apparatus. Other kinds of proprietary protocols to be used with the present invention are possible as well. For example, there is the ISM (industrial, scientific and medical) bands. The ISM bands are defined by the ITU-R in 5.138, 5.150, and 5.280 of the Radio Regulations. Individual countries' use of the bands designated in these sections may differ due to variations in national radio regulations. Because communication devices using the ISM bands must tolerate any interference from ISM equipment, these bands are typically given over to uses intended for unlicensed operation, since unlicensed operation typically needs to be tolerant of interference from other devices anyway. In the United States of America, ISM uses of the ISM bands are governed by Part 18 of the FCC rules, while Part 15 Subpart B contains the rules for unlicensed communication devices, even those that use the ISM frequencies. Part 18 ISM rules prohibit using ISM for communications.

The ISM bands defined by the ITU-R are:

| Frequency range [Hz] | Center frequency [Hz] |
|---|---|
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

While currently the 430 MHz and 900 MHz frequencies are commonly used in the US, it is anticipated by the Applicants that the other frequencies could be used for water parameter transfers.

Another protocol known as CAN or CAN-bus (ISO 11898-1) that was originally designed for automotive applications, but now moving into industrial applications is another type of network that could be used to transfer water parameter data. Devices that are connected by a CAN network are typically sensors, actuators and control devices. A CAN message never reaches these devices directly, but instead a host-processor and a CAN Controller is needed between these devices and the bus.

It is anticipated by the Applicant that the present invention water parameter use display and monitoring device utilizing the said wireless communication with the one or more remote display and/or recorder apparatus can automatically convert back and forth from radio frequency format, ZigBee or Bluetooth format to a cellular format technology to accommodate different range requirements.

The present invention can also use RF mesh technology, which allows meters and other sensing devices to securely route data via nearby meters and relay devices, creating a "mesh" of network coverage. The system supports two-way communication between the water use and water energy use monitoring display apparatus base station 10 (and 126 in FIG. 6) and the remotely positioned display and/or recorder receiver apparatus 50, 56 and can be upgraded remotely, providing the ability to implement future innovations easily and securely.

The electric network access point collects data and periodically transfers this data to defined municipality via a secure cellular network. Each RF mesh-enabled device (meters, relays) is connected to several other mesh-enabled devices, which function as signal repeaters, relaying the data to an access point. The access point device aggregates, encrypts, and sends the data back to municipality or governmental agency over a secure commercial third-party network. The resulting RF mesh network can span large distances and reliably transmit data over rough or difficult terrain. If a meter or other transmitter drops out of the network, its neighbors find another route. The mesh continually optimizes routing to ensure information is passed from its source to its destination as quickly and efficiently as possible.

Furthermore, the present invention can communicate utilizing optical technology and other wireless networks such a cell phone technology or private networks.

The transfer of data or information through wired or wireless technology can be initiated using a "wake up" button or signal from a first or second remote display/recorder.

Also shown in FIG. 6 is another embodiment of the present invention whereby the water energy use monitoring display apparatus base station apparatus 126 is in close proximity to the pressure regulator or pressure reduction valve 124. It is anticipated by the Applicant the water use and water energy use monitoring display apparatus base station apparatus 126 can be incorporated into a pressure regulator (pressure reduction valve) or water meter to provide single apparatus the replaces the water meter or pressure regulator (pressure reduction valve). It is also anticipated by the Applicant that when the water use monitoring display apparatus base station 126 is in close proximity to the highly sensitive flow sensor e.g. the irrigation flow sensor 121, the electrical connection or communication can be hard wired. The typical locations for the highly sensitive water flow sensors with transceivers 120a, 120b, 121 and 123 (and any additional flow sensors) are at the water input supply lines for a typical washing machine 128, a sprinkler system 122, the at the pressure regulator or water pressure reduction valve 124 or at the shower head 122. The very sensitive flow sensors with transceivers 120a, 120b, 121 and 123 can also be located on water using appliances such as sinks, toilets, hot water heaters, clothes washers, bathtubs, and the like.

The use of water flow sensors on the irrigation water source and other outdoor water sources can function to provide independent outdoor water data. The use of indoor water use (data acquired by the installed base system 10 or 126) and outdoor water (data acquired by sensor 121 at irrigation supply 122 use can be individually monitored. This can be useful for an individual or commercial operator to employ water conservation methods (e.g., reduce the sprinkler frequency or duration). Alternately, the monitoring of indoor water use and outdoor water use could be utilized by the particular water supplying municipality or government agency to apply different rates for indoor water use and outdoor water use. Furthermore, since many municipalities change a sewer fee that is calculate as a ratio of the total water use, the monitoring of indoor water use versus outdoor water use can reduce the sewer fees for consumers. In sever situations, a control valve can be located at a particular location, e.g. at the irrigation valve 122 whereby by utilizing the two-way duplex wireless capability through communication means 46 and 54 of the water use and water energy use monitoring display apparatus 10, 126, the water supplying municipality or government agency can remotely control water use (e.g. send out a code that inhibits outdoor water use on certain days or at certain hours of the day).

The highly sensitive flow sensors with transceivers 120a, 120b, 121 and 123, should be designed to determine if the flow is occurring through a particular water fixture is as slow as, for example, 25-50 ml per minute. The highly sensitive flow sensors with transceivers 120a, 120b, 121 and 123 can be programmed to periodically detect slow flow or no flow conditions at particular time intervals, such as, for example, every 10 to 45 seconds. Alternately the water parameter data can be recorded and stored at individual high flow sensor for subsequent transmission as a stream of data points or a data packet. In this regard the recorded data can be transmitted wirelessly to the base station 10, 126 at longer programmable time intervals, such as, for example, every 24 hours. The highly sensitive flow sensor with transceivers 120a, 120b, 121 and 123 are designed as wireless flow sensors and designed to have very low electrical power usage. Power consumption for each highly sensitive water flow sensor with transceivers 120a, 120b, 121 and 123 are designed to be extremely low, for example, about 100-200 micro-amp hours per day. Power can be supplied by batteries, or alternatively, can be connected to the 120/240 volt electrical system. The highly sensitive water flow sensors with transceivers 120a, 120b, 121 and 123, can have an extended battery life by utilizing the interval wireless communications or transmissions and with a long lasting battery pack, such as, for example, the Tadiran series of batteries manufactured by Tadiran U.S. Battery in Lake Success, New York. A sealed door means is utilized to allow battery replacement. In addition, the batteries can be recharging type and accessed with a electrical coupler accessed from the outside of the highly sensitive flow sensors with transceivers 120a, 120b, 121 and 123.

The flow sensor with transceivers (and any additional flow sensors) can be electrically coupled with a microprocessor or microcontroller that has software that learns about water usage at a particular station, home, and/or company. In this embodiment, multiple flow sensors 120a, 120b, 121 and 123 (and any additional flow sensors) can communicate wirelessly or wired with the base station 10, 126 that has software the learns about water usage at particular station, home and/or company. A user can enter a programmed "leak monitoring stage", that promptly compels base station 10, 126 to search for and initiate wireless communication with each independent flow sensors (e.g. flow sensors for the water supply, irrigation system, washing machine, water heater, dishwasher, kitchen and bathroom faucets, toilets, and showers), times when you are home and not home, and remembers the different water use you use at during different times of the day and days of the week. For example, after a period learning the individual flow sensor(s) water use, the software has monitored the washing machine and determined the range of water flow used during the duration of washing cycles and determine timing parameters, such as the washing machine is generally used between 8:00 a.m. to 1:00 p.m. In this example, if a small or large flow that occurs outside of this recorded ranges could send out a warning or alarm. For example, if water is flowing on the washing machine at 1:00 a.m., and appropriate warning or alarm can be generated. In another example, the flow sensor connected to the kitchen faucet can determine the average rate of flow and associated timing parameters. If the kitchen faucet senses that the kitchen faucet has been on outside of the normal range, e.g. for 30 minutes continuous, and if this occurs at times outside of the normal range, after 10:30 p.m., a warning or alarm can be generated. Furthermore, during sleeping hours, water generally in not flowing, except for occasional toilet user. The base station 10, 126 can monitor the flow sensors during the night when occupants are sleep and if a water flow condition occurs, a warning or alarm can be generated. In this capacity, the highly sensitive flow sensor with transceivers 120a, 120b, 121 and 123 (and any additional flow sensors) function as both a flow sensor and a leak detection sensor. The software can also determine is the water flow is on for a long and constant or continuous duration (e.g. 25 minutes), whether it is a high flow or low flow, the base station 10, 126 can determine that a leak is possible and can send an alarm, text, email or other signal to the user or municipality, or turn off the water supply.

At the water use and water energy use monitoring display apparatus/base station 10, 126, (200) received data can be stored and analyzed to determine whether any water fixture in the facility is leaking by monitoring differentiates between normal flow conditions and a slow flow condition. When or if leakage condition is indicated, an alert can be generated on the various displays associated with the water use and water energy use monitoring display apparatus base station 10, 126 and/or initiate a call, using wireless network 44, can be made to the home or office owner/operator or to the municipality or governing agency so that maintenance personnel can be dispatched to turn-off the water supply at the offending residence or office or fix the leaking unit. The data and/or results of analysis conducted at the water use and water energy use monitoring display apparatus base station 10, 126 can be transmitted to a remote central monitoring computer service via satellite, microwave technology, the internet, telephone lines, and the like. At the off-site location, additional analysis and/or monitoring can be accomplished.

The sensitive flow sensors with transceivers are designed to have coordination between the water use and water energy use monitoring display apparatus base station 10, 126 by using software instructions for timing, network position, and polling operations. For example, the water use and water energy use monitoring display apparatus base station 10, 126 can first send a broadcast message to, for example, one or more sensitive flow sensors with transceivers. The broadcast message can instruct the highly sensitive flow sensors with transceivers to, for example, synchronize themselves in the system, set their clocks, and identify their wireless path to the water use and water energy use monitoring display apparatus base station 10, 126. After receiving the broadcast message, the water use and water energy use monitoring display apparatus base station 10, 126 can send an acknowledgement back to the water use and water energy use monitoring display apparatus base station 10, 126 revealing their location in the system. Hence an alert can be generated on the various displays associated with the water use and water energy use monitoring display apparatus base station 10, 126 and/or initiate a call, using wireless network 44, or cell phone can be made to the home or office owner/operator or to the municipality or governing agency so that maintenance personnel and convey the flow sensor that has detected a leak (e.g. irrigation system, washing machine hose, water heater, dishwasher, kitchen and bathroom faucets).

The water use and water energy use monitoring display apparatus base station 10, 126 can also communicate with the sensitive flow sensors with transceivers to include software instructions for programming time intervals for water parameter data transmission.

Coordination of data packet transmissions from the sensitive flow sensors 120a, 120b, 121 and 123 (and any additional flow sensors) can be scheduled. The water use and water energy use monitoring display apparatus base station 10, 126 can run a master schedule for querying each flow sensor. For example, the water use and water energy use monitoring display apparatus base station 10, 126 can transmit a message to a specific coordinator node 18 and that coordinator node can then sequentially request data from each of its flow sensors. This systematic process can reduce data packet collision on the network and can make the use and water energy use monitoring display apparatus base station 10, 126 immediately aware of any flow sensor that might be having trouble transmitting its data packet.

The software in the water use and water energy use monitoring display apparatus base station 10, 126 to perceive water flow characteristics in the facility for a given unit of time, such as, for example, a day, for every unit in the facility. The software should be designed to identify numerous conditions, such as, for example, faulty toilet valves, periodic and irregular water flow for example toilets, faucets, and a slow constant water flow, a characteristic of a leakage condition.

In additionally, the base station 10, 126 can be programmed such that when a leak condition is detect by one of the highly sensitive flow sensors 120a, 120b, 121 and 123 (and any additional flow sensors), the base station 10, 126 will automatically turn off the main water supply.

Water energy use was defined herein as to the ratio of cold or ambient water use to heated water use or to the ratio of hot water use to water flow use. However, the Applicant contends that many other water energy calculations can be programmed for use with the present invention. For example, a commonly known energy calculation such as the "Energy Factor" which includes the ratio of useful energy output from the water heater to the total amount of energy delivered to the water heater might be used with the ratio of total volume of hot water (including the temperature of the hot water monitored over a time period) and total volume of cold or ambient are taken into consideration, resulting in another energy calculation. There are some websites (paystolivegreen.com) that provides a water and energy calculator as shown below which could be used with the present invention. As shown in FIG. 7 is an example of a water energy data format that uses cold/ambient water and hot water to provide water usage and water energy costs. The Applicant contends that many different water energy calculations can be used with the present invention without deviated from its intended use. The water parameter use and monitoring apparatus can communicate with a said typical cell phone, smart phones, or similar apparatus includes an application for a consumer/resident, corporate entity, or municipality that show the daily, weekly and/or monthly water use and/or daily, weekly or monthly water costs.

The water use and water energy use monitoring display apparatus base station 10, 126 can transmit an acknowledgement to each highly sensitive flow sensors 120a, 120b, 121 and 123 after successfully processing a data packet.

Shown in FIG. 8 is a perspective view of a first example application (APP), or a first page of a application (APP) 300, displayed on a typical cell phone, smart phone or similar apparatus 400 (see FIG. 9). This example application (APP) or page 300 is designed as a line graph format to be used by the resident of a home or a representative of a company or a corporation to monitor water conservation, but is it anticipated by the Applicant that the application (APP) 300 could be used by municipal or government representatives.

FIG. 8 shows and example of a first application or page (APP) 300 for Water Use 302 having a daily 304 graph. 306 with day hours 308, designated by the symbol AM 312 and the night hours 310 designated by the symbol PM 314. At the right side of the example first application or page (APP) 300 is the daily total use of water 316 and the daily total cost in dollars (or other currency) 318 that has been downloaded the data 340 from the registered or serving water municipality. Within the daily graph 306 is a plotted line 307 that shows the hourly water use. The plotted line 307 can have a rolling feature whereby new data replaces the oldest data in the graph. A gallon or liter scale can be included on the left side of the daily graph 305 (not shown).

The example of a first application or page (APP) 300 for Water Use 302 can also have a weekly 320 graph 322 with days 324. At the right side of the example first application or page (APP) 300 is the weekly total use of water 326 and the weekly total cost in dollars (or other currency) 328 that has been downloaded the data 340 from the registered or serving water municipality. Within the weekly graph 322 is a plotted line 327 that shows the daily water use. The plotted line 327 can have a rolling feature whereby new data replaces the oldest data in the graph. A gallon or liter scale can be included on the left side of the weekly graph 322 (not shown).

The example of a first application or page (APP) 300 for Water Use 302 can also have a monthly 334 graph 330 with months 332. At the right side of the example first application or page (APP) 300 is the monthly total use of water 336 and the monthly total cost in dollars (or other currency) 338 that has been downloaded the data 340 from the registered or serving water municipality. Within the monthly graph 330 is a plotted line 337 that shows the daily water use. The plotted line 337 can have a rolling feature whereby new data replaces the oldest data in the graph. A gallon or liter scale can be included on the left side of the monthly graph 330 (not shown).

The present invention water parameter use display and monitoring device 10, 126 is designed to transfer data and information by utilizing the wireless communication with the one or more remote display and/or recorder apparatus, or cell phone, smart phone or similar apparatus whereby the remote display and/or recorder apparatus or cell phone, smart phone or similar apparatus can automatically convert back and forth from radio frequency format, ZigBee or Bluetooth format to a cellular format technology to accommodate different range requirements. The typical cell phone, smart phones, or similar apparatus with wireless communication can automatically convert back and forth from radio frequency format, ZigBee or Bluetooth format to a cellular format technology to accommodate range requirements.

Also shown in FIG. 8 is a Download Button 340 which is designed to manually or automatically download water rate and expense data from the servicing and registered water municipality or other source. The cost per gallon, hundred cubic feet (HICF) or other measurement is usually dependent on volume used over a given period. For example, from 0-8 HCF could be billed at $3.64 per HCF, 9-24 HCF could be billed at $4.08 per HCF, and 25-36 HCF could be billed at $5.82 per HCF. This is only an example data that can be downloaded and utilized to determine the daily cost 318, weekly cost 328, or monthly cost 338. Other data can be downloaded from the water municipality or other source such as warnings for drought conditions, metering policies, quality messages, limits, alarms, etc.

Also shown in FIG. 8 is a user, whether it is a home owner or company representative, who can Set Limits 342 for water use to command the water use and water energy use monitoring apparatus base station 10, 126 to turn the water completely off, limit the flow, or sound a verbal or audio alarm. It is anticipated that the servicing and registered water municipality or other source can upload Set Limits 342 to the individual water use and water energy use monitoring apparatus base station 10, 126. It addition, the Set Alarms 344 for water use can be used to display visually or provide audio signals of alarming conditions associated with the daily, weekly or monthly water use. The application (APP) 300 is designed to promote water conservation and monitor for leaking conditions.

Also shown on the FIG. 8 is an optional Water Quality section 350 of the application (APP) 300. As shown, optional water quality Sensor 1 352 can monitoring one or more halogen elements or compounds, monitoring total dissolve solids, monitoring a metallic or iron element or compound, monitoring water hardness, monitoring biological or coliform contaminates, monitoring pH, or any combinations thereof. The plotted line 358 for Sensor 1 shows peaks and valley over the time period 360. The time period can be selected for daily, weekly or monthly. Sensor 2 354, can be another water quality sensor and Sensor X 356 can be one or more water quality sensor taken from the group define above.

Shown below in this optional Water Quality section 350, is a Frequency Soft Button which allows the user to define the time period, daily, weekly or monthly. A user, whether it is a home owner or company representative, who can Set Limits 372 for water quality to command the water use and water energy use monitoring apparatus base station 10, 126 to turn the water completely off, limit the flow, or sound a verbal or audio alarm. It is anticipated that the servicing and registered water municipality or other source can upload Set Limits 372 to the individual water use and water energy use monitoring apparatus base station 10, 126. It addition, the Set Alarms 374 for water use can be used to display visually or provide audio signals of alarming conditions associated with the daily, weekly or monthly water use.

As FIG. 8 is only an example of presentation of the water use and water quality data, it is anticipated that other formats for displaying the daily, weekly, monthly, or annual water use and water quality use. Such formats can be in bar graph format, pie graph format, cosmograph formats, time series graph formats, histogram formats, data plot format, scatter plot format, other graph formats, or a combination of these graph formats.

Figure 9A:
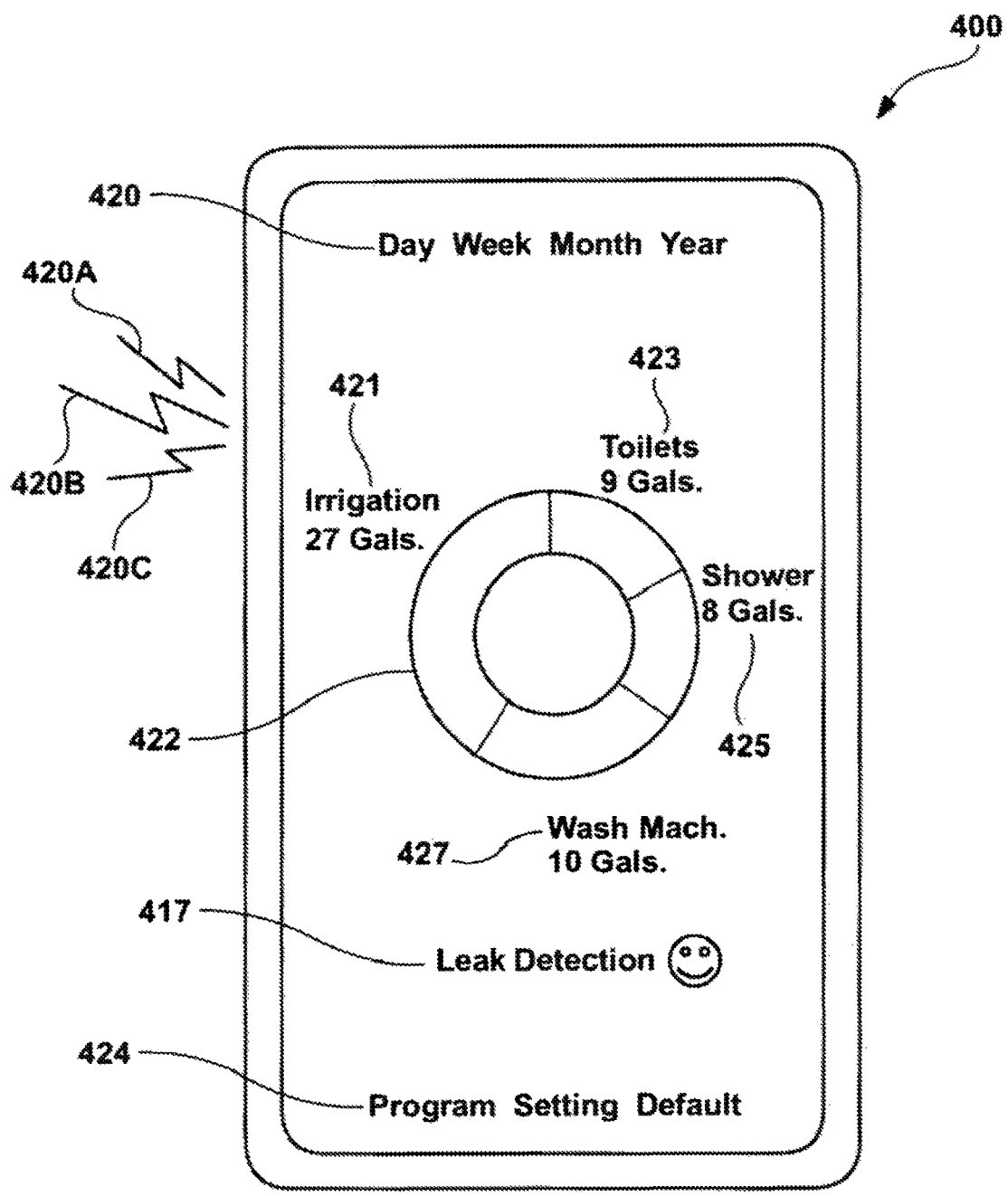
FIG. 9A is a perspective view of a typical cell phone, smart phone or similar apparatus having a third application (APP), or a third page of a (APP), programmed to displaying the soft buttons to determine the period for displaying, graphical of water use devices, leak detection graphical item, and programming/setting soft buttons.

Shown in FIG. 9A is another "APP" or another "APP" page can show, in a pie chart, bar chart, or other format, show the individual water use at particular areas of the house, for example, the showers, the kitchen faucet, the bathroom faucets, the bathroom tub, the bathroom toilets, the washing machine, water heater, dishwasher and/or the outside irrigation system, in addition, outdoor water uses such as pool water maintenance (water addition), Jacuzzi, and water fountains can be included for water use monitoring. The individual water use in different areas of a house (or corporation) can be transferred to an owner, individual user, corporate responsible individuals, government agencies or municipalities to review water use and water conservation information on a remote device, such as a cell phone, smart phone, or similar apparatus, or to a remote computer. Leak sensor and water sensors can be incorporated together or function together as separate devices, or a highly sensitive water sensor can also function as a leak sensor and then functions to transfer individual water use in different areas of a house and transfer this data and leak alarms to an owner, individual user, corporate responsible individuals, government agencies or municipalities to review water use and water conservation information on a remote device, such as a cell phone, smart phone, or similar apparatus, or to a remote computer. This technology can also be applied to corporations which have various water connected apparatuses that need to be monitored for water flow, water use, and water energy use, and water leaking conditions.

Shown in Figures both 9A and 9B is a perspective view of a typical cell phone, smart phone or similar apparatus having a second application (APP), or a second page of a application (APP), programmed to display soft buttons or control activator. FIG. 9 can be a typical cell phone, smart phones, or similar apparatus includes all remote cellular phones using channel access methods defined above (with cellular equipment, public switched telephone network lines, satellite, tower and mesh technology), mobile phones, PDAs, tablets (e.g. refers to all current and future variants, revisions and generations of the Apple IPAD, Samsung Galaxy, HP, Acer, Microsoft, Nook, Google Nexus, Sony, Kindle and all future tablets manufactured by these and other manufactures), Apple IPOD Touch, a smart or internet capable television, wireless timepiece or watch (Apple, Samsung) and other similar apparatus with WIFI and wireless capability, and remote computers and controllers having internet or wireless connectivity. These devices may also be referred to in FIG. 10 as support types and FIG. 11 as remote devices.

The typical cell phone, smart phone or similar apparatus 400 is designed and can also utilized, and show on its display, the example of a first application or page (APP) 300 for Water Use 302 shown in FIG. 8. The typical cell phone, smart phone or similar apparatus 400 can function at the first remote and/or recorder apparatus 50, second remote and/or recorder apparatus 56, and/or communicate under a cellular format technology with offsite central monitoring computer or cell, mobile or other telephone lines via satellite, microwave technology, the internet, cell tower, telephone lines, and the like.

Figure 9B:
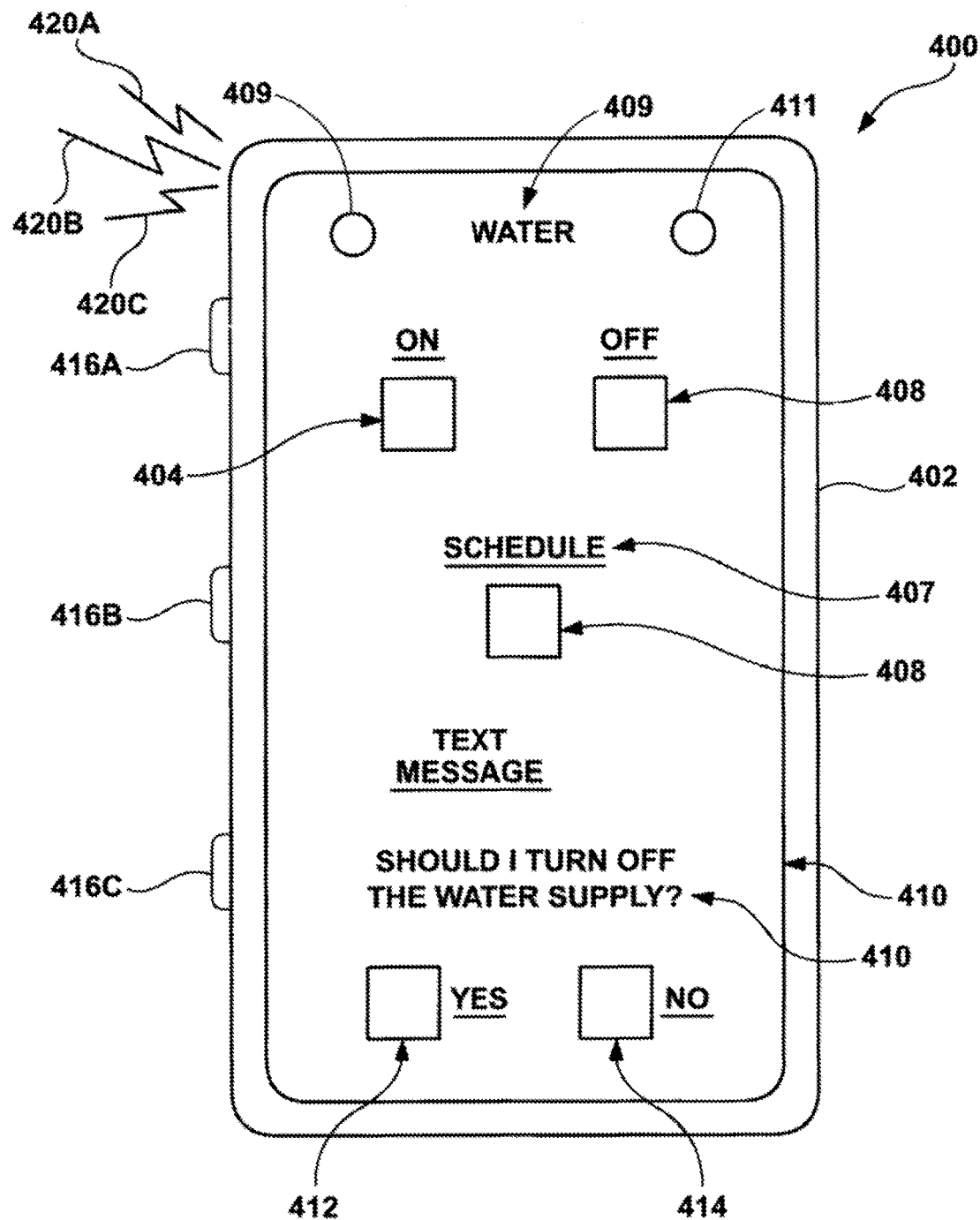
FIG. 9B is a perspective view of a typical cell phone, smart phone or similar apparatus having a second application (APP), or a second page of a (APP), programmed to display soft buttons or control activator.

Referring to FIG. 9B which shows one or more visual signals 409, 411 (e.g. LED or LCD) lights that are turned on (and off after a period of time) to communicate to an individual that the water use and water energy use monitoring display apparatus base station 10, 126 has completed the programmed activity. For example only, 409 could be a red LED light that illuminates when the water system is turned off and 411 could be a green LED light that illuminates when the water system is turned on. This could be useful when a water leak alarm is communicated to the typical cell phone, smart phone or similar apparatus 400. It is anticipated by the Applicant that verbal signal (verbal "water off" or verbal "water on" or simply a playing certain ringtones) can also be used to communicate that the programmed activity has been completed.

Typical cell phones, smart phones, and similar apparatuses 400 may have one or more means of communication that can become established with a particular water use and water energy use monitoring display apparatus base station 10, 126 for wireless communication. The use of Bluetooth wireless technology 420a is commonly a feature found on many cells phones, smart phones and similar apparatus 400. Such Bluetooth wireless communication 420a can be a means to communicate with the water use and water energy use monitoring display apparatus base station 10, 126 to download water use data and information or communicate with optional water shut-off/on mechanism 310 to turn the water on or off or receive decisional text messages 410. Zigbee is another wireless technology that can be used. However, most current cell phones, smart phones or similar apparatus 400 do not possess Zigbee wireless capability.

The use of WIFI (IEEE 802.11 family of wireless local area network) wireless technology 420b is commonly a feature found on many cells phones, smart phones and similar apparatus 400. Such WIFI wireless communication 420b can be a means to communicate remotely with the water use and water energy use monitoring display apparatus base station 10, 126 (with optional water shut-off/on mechanism) wirelessly communicate water use and water energy use and water quality) to download water use data and information. The water use and water energy use monitoring display apparatus base station 10, 126 can have the capability to receive and transfer wireless signals and decisional text messages 410 using WIFI technology directly to the remotely water use and water energy use monitoring display apparatus base station 10, 126. Alternately, the WIFI communication 420b will communicate with a wireless router that has a HTML based interface and configuration page graphic user interface. Remote access from the cell phone, smart phone or similar apparatus 400 could use a short message service (SMS) interface and/or voice of Internet Protocol (VOIP) which communicates with the wireless router. This WIFI technology will access the internet and have the ability to recognize the cell phone, smart phone or similar apparatus 400 phone number for remote capability using SMS interface. A digit numbers security can be used to maintain restricted integrity. Wireless Transmitters and Receivers can be used for WIFI communication 420b to the remotely water use and water energy use monitoring display apparatus base station 10, 126 for individuals lacking internet capability at their residence.

The use of cellular wireless technology 420c is a primary feature of cells phones, smart phones and similar apparatus. Such cellular wireless communication 420c can be a means to communicate with the remotely located water use and water energy use monitoring display apparatus base station 10, 126 (with optional water shut-off/on mechanism) to transfer water use and water energy use and/or water quality data and information, alarms limits (leaking water situations).

An application (APP) or page 402 will have to interface with the Bluetooth 420a, WIFI 420b, or cellular 420c wireless communication means, and send instructions to a specific "paired" to the water use and water energy use monitoring display apparatus base station 10, 126. The water parameter use display and monitoring device 10, 126 is designed to transfer water use and/or water quality data and information (or alarms) by utilizing the wireless communication with the one or more remote display and/or recorder apparatus, or cell phone, smart phone or similar apparatus 400 whereby the remote display and/or recorder apparatus or cell phone, smart phone or similar apparatus 400 can automatically convert back and forth from radio frequency format, ZigBee or Bluetooth format to a cellular format technology to accommodate different range requirements.

Various pairing methods between the water use and water energy use monitoring display apparatus base station 10, 126 and the cell phone, smart phone or similar apparatus 400 are contemplated to be necessary to ensure that proper communication is established between a single and unique water use and water energy use monitoring display apparatus base station 10, 126 in addition to one or more unique cell phone, smart phone or similar apparatus 400. A Quick Response Code (QR code) unit address located on the water use and water energy use monitoring display apparatus base station 10, 126 can communicate with a cell phone, smart phone or similar apparatus 400 having a camera to read QR and establish link to the on the water use and water energy use monitoring display apparatus base station 10, 126. Standard barcodes could would to pair and establish a link between the water use and water energy use monitoring display apparatus base station 10, 126 and the cell phone, smart phone or similar apparatus 400. Near field link and RFID chip technology can also be used to facilitate pairing and establish a link between the water use and water energy use monitoring display apparatus base station 10, 126 and the cell phone, smart phone or similar apparatus 400. Currently bar code readers are applications that can be downloaded for a particular cell phone, smart phone or similar apparatus operation system. Near field links are only recently becoming available on Samsung smart phones, but this technology may be expanded to many, if not all, cell phones, smart phones or similar apparatus.

In operation, an individual who wants to turn off the water system would touch the off the soft button 406 or reply to the text message to turn off the water system 410 "yes" soft button 412, or push the hard button 416b on the a cell phone, smart phone or similar apparatus 400 which will communication with the water use and water energy use monitoring display apparatus base station 10, 126 via the internet, wireless technology (e.g. Bluetooth, ZigBee), and/or cellular format technology and then the paired with the water use and water energy use monitoring display apparatus base station 10, 126 transmit water use, water energy use (and water quality) data and information (or can turn off the water system off) and then when completed will send a returned communication signal to the a cell phone, smart phone or similar apparatus 400 and turn on signal (audio or visual) message 409 that the data or information has been transferred or that the water system is off. An individual who wants to use the second application (APP), or a second page of an application (APP) 401 to turn on the water system would touch the "on" the soft button 404 or reply to the text message to turn off the water system 410 "no" soft button 412, or push the hard button 416a on the a cell phone, smart phone or similar apparatus 400 which will communication with the water use and water energy use monitoring display apparatus base station 10, 126 via the internet, wireless technology (e.g. Bluetooth, ZigBee), and/or cellular format technology and then the paired water use and water energy use monitoring display apparatus base station 10, 126 could download water use date and information or optionally turn off the water system off and then when completed (specified by switches and/or a flow sensor) will send a returned communication signal to the a cell phone, smart phone or similar apparatus 400 and turn on signal (audio or visual) message 409 that the water system is off.

The cell phone, smart phone or similar apparatus can be programmed to utilized geo-fencing technology that uses a radius around a home, corporation, point location or can be a predefined set of boundaries, like school attendance zones or neighborhood boundaries. When a device having geo-fencing technology of a location-based service enters or exits a geo-fence area, the device receives a generated notification of such movement. This notification might contain specific information about the location of the device or simply transfer the location information to a remote apparatus. The device having geo-fencing generally uses GPS (global positional system) for location, determination but with multiple cell towers servicing a cell phone, smart phone or similar apparatus, the multiple cell towers format can utilize triangulation or multi-lateration of radio signals between (several) radio towers of the network and the phone. To locate the phone using multi-lateration of radio signals, it must emit at least one other signal (roaming) to contact the next nearby antenna tower (this location process does not require an active call). GSM cell phone technology is based on the signal strength to nearby antenna masts. The technology of locating is based on measuring power levels and antenna patterns and uses the concept that a powered mobile phone always communicates wirelessly with one of the closest base stations, so knowledge of the location of the base station implies the cell phone is nearby. Advanced systems determine the sector in which the mobile phone resides and roughly estimate also the distance to the base station. Further approximation can be done by interpolating signals between adjacent antenna towers. Qualified services may achieve a precision of down to 50 meters in urban areas where mobile traffic and density of antenna towers is sufficiently high whereas. Rural and desolate areas may see miles between base stations and therefore determine locations is obviously less precise. WiFi data can also be used to identify a cell phone, smart phone or similar apparatus location. Poor performance of the GPS-based methods in indoor environment and increasing popularity of WiFi have encouraged companies to design new and feasible methods to carry out WiFi-based indoor positioning. Many cell phones, smart phones and similar apparatus combine GPS) with Wi-Fi for both active calling and positioning systems. When a device with geo-fencing technology exist or enters a defined area, a notice might be sent to a cell phone, smart phone or similar apparatus, an email account or perform a or software operation. Geo-fencing allows users of the system to draw zones around places of residence or corporations, customer's sites and secure areas. So a cell phone can be programmed for a defined geo-fence location and can provide a warning to the user or operator via SMS or Email that the water supply is on or provide the user with an option of turning off the water supply.

Figure 10:
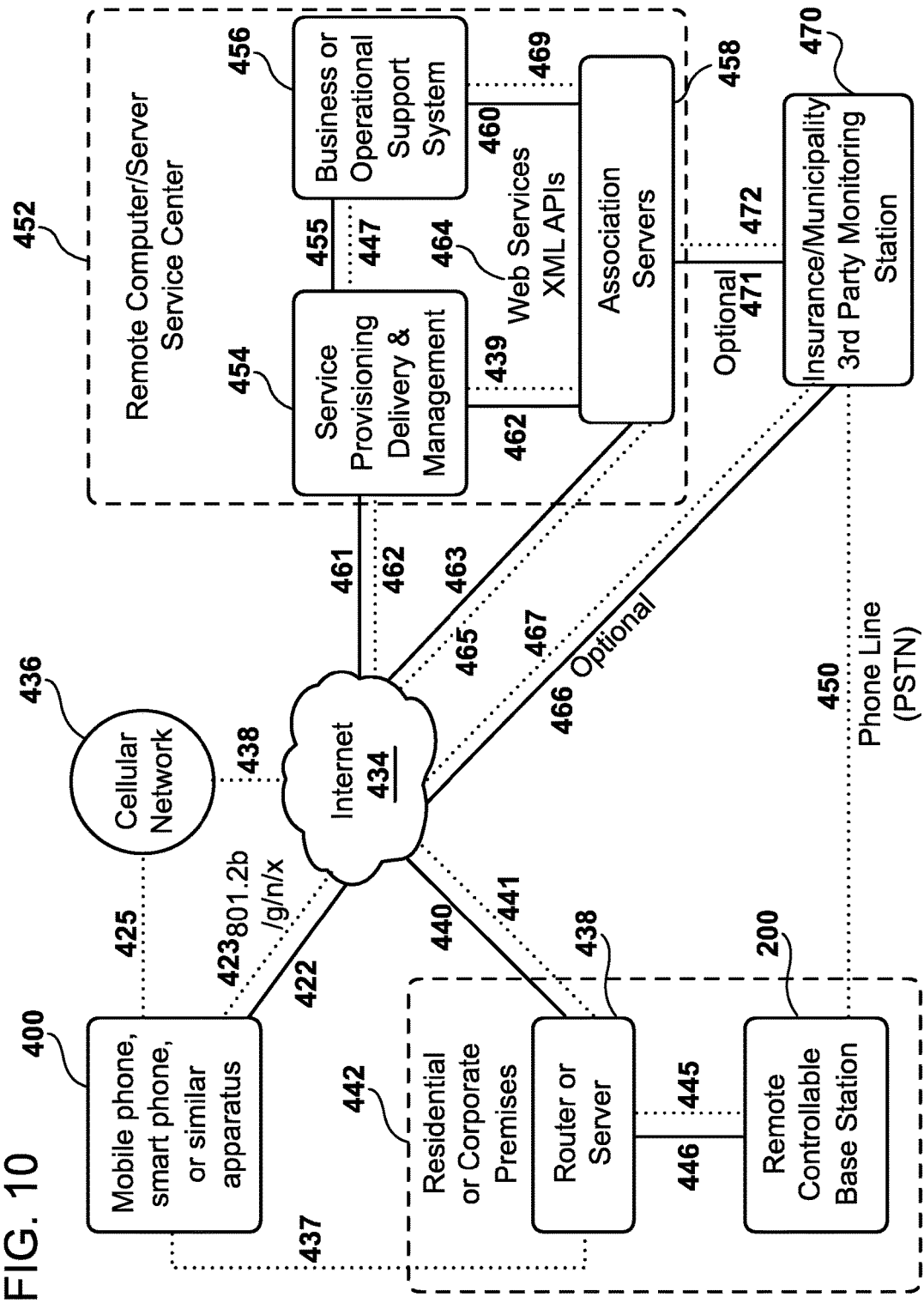
FIG. 10 is a block diagram of the more integrated system.

To ensure that data and information transfer and communication is available at all times and that information or data has integrity that does not alter in any way when the cell phone, smart phone or similar apparatus 400 is not local but is in a remote long range location, and to endure that information or data has been correctly and promptly transferred, a remote service facility can be utilized with the present invention. In FIG. 10 is a block diagram of a method that provides additional integrity technology for the transfer of data. At a home or business customer premises 442, a modem and router/server 438 connected to a cable, DSL, satellite or other service, e.g. TI internet connection, that connects with the water use and water energy use monitoring display apparatus base station 200 via wired 446 or wireless means 445. The broadband modem and router 438 connects to the internet 433 via wired 440 or wireless 441 means and communicate with the governmental agency, insurance company, municipality agencies and/or third party station 470 via an optional wired 466 or wireless 467 means or via an optional wired 466 or wireless 467 means to a remote computer/server service center (cloud) hosted by an insurance, municipality agencies and/or third party monitoring, and data center) with the communications takes place via a communication network 434, 436 (e.g., cellular network, internet, etc.). The modem router/server 438 can communicate directly with a home owners mobile phone, smart phone, or similar apparatus 400 to the network utilizing communications that takes place via a communication network wired 422 or wireless 423 or cellular network 436, via the internet to cellular tower network communication 438 and via cellular tower network to mobile phone, smart phone, or similar apparatus 425. These remote computer/server service centers ("the cloud") 452 manage the system operations necessary to deliver the integrity of the system service described herein. The combination of the modem/router 438 and the remote computer/server service center (cloud) 452 enable a variety of devices 430 (e.g., PCs, mobile phones and PDAs, computers, televisions) to communicate with the water use and water energy use monitoring display apparatus base station 200 and allows users to remotely access water use, water energy use (water quality data) or to control the residential or commercial water supply.

Remote computer/server service centers 452 utilize cloud monitoring tools, specifically, enable cloud providers to track the performance, continuity and security of all of the components that support service delivery: the hardware, software and services in the data center and throughout the network infrastructure. Within the remote computer/server service center 452 are management modules service provisioning and delivery management 454 which takes an end-to-end approach to managing delivery and activation of services in an environment made increasingly complex by third parties, multiple vendors and multiple technologies. The business operation support system 456 utilize software applications that support customer-facing activities such as billing, order management, customer relationship management, call center automation. The operational support system 456 software and hardware applications that support back-office activities which operate a telco's network, provision and maintain customer services. Both support systems 456 are traditionally used by network planners, service designers, operations, architects, support, and engineering teams in the service provider. These software programs and hardware use web services 464 such as XML, APIs and token authentication technology.

The integrated insurance, municipality agency or other third party service 470 can also coordinate the monitoring of compliance data use and/or perform the services of the Remote Operational Service Centers 452 and the optional communication with the internet 434.

In addition to standard HTTP or HTTPS communications, the modem and router/server 438 and remote computer/server service center 438 can support the use of a cellular network 436 (both GPRS, GSM and CDMA options are available) as another means to provide the primary broadband connection 438 to the internet 434. Routers/servers such as those currently seen in homes or companies are enabled to communicate with the internet via a DSL line (over the standard switch telephone network or cable modem. One viable option is to build a cellular network circuitry into the broadband router or remote base station. As one example of the internet of things technology, Particle Inc. in California manufactures a microprocessor/microcontroller called the Electron that includes a SIM car and a unique cellular service. Alternately, a smart phone can be used as a "hotspot". When configured as such, the smart phone t"hotspot" turns instantly into a broadband router to which the remotely communicates with the water use and water energy use monitoring display apparatus base station 200 (not shown).

Figure 11:
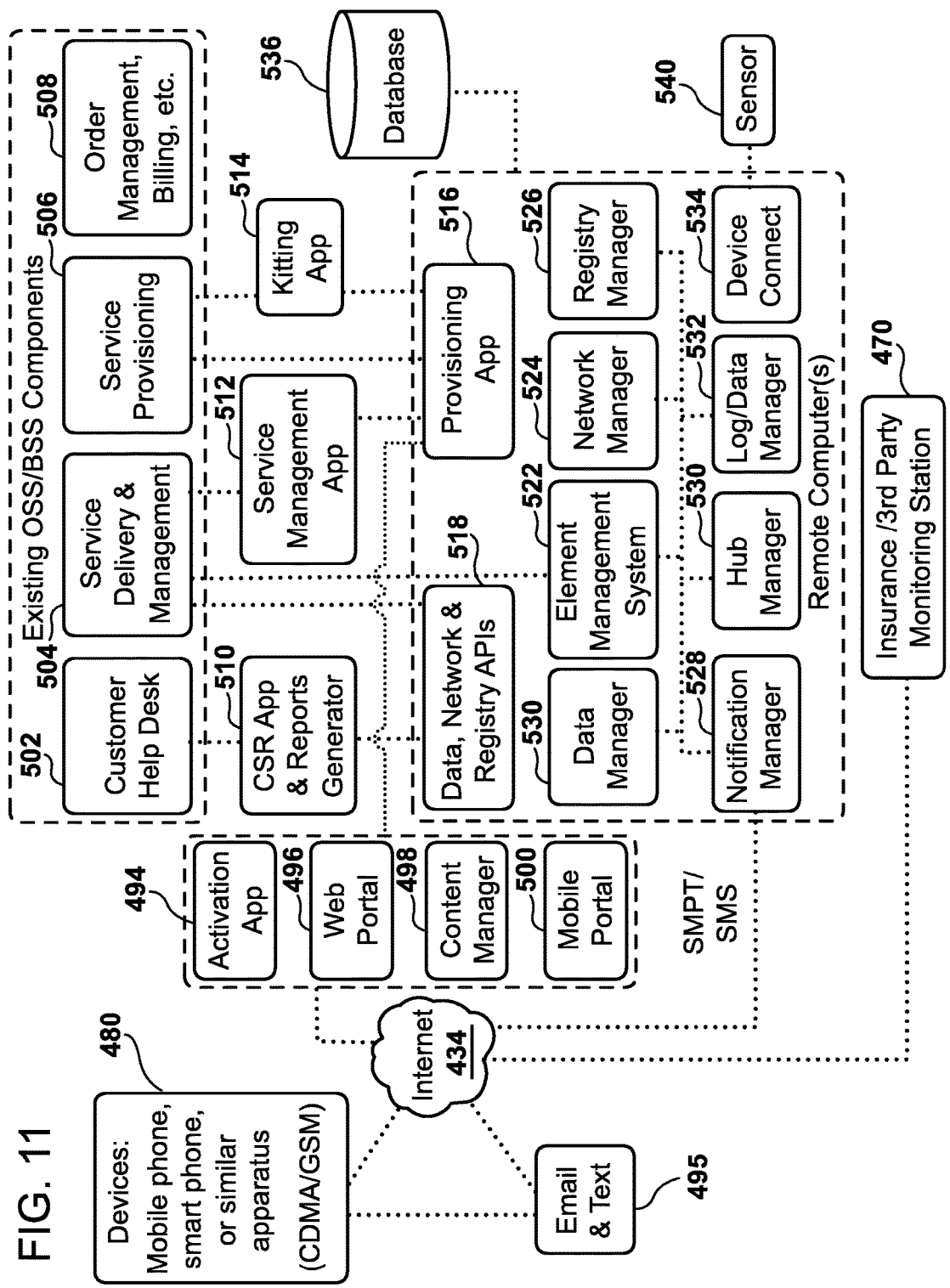
FIG. 11 is a block diagram of components of the more integrated system

FIG. 11 is a block diagram of components of the present invention, under an embodiment, showing a more detailed description of the components. The diverse collection of apparatus/devices 480 range from computer 482, PC applications or programs 484, or touch screen keypads, mobile devices 486, email 488, hub 490 or wireless (GPRS, GSM or CDMA) or internet connected televisions 492.

The apparatus/devices 480 accessing a web portal application 496 through the internet 434, which performs an end-user configuration and customization of the integrated service. In addition, device management is capable of performed by the mobile portal application 500. A mobile device 486 (e.g., PDA, mobile phone, etc.) accessing the integrated system Mobile Portal 500.

There are numerous types of server components of the Remote Operation Data Service Center 452. Business Components which manage information about the controlling/monitoring devices, using Web 2.0, and XML APIs (see FIG. 10). Within the OSS/BSS Components are the Customer Help Desk 502 which provides information about remote devices and base station installment instructions and operation and technology questions. The Service Delivery and Management Application 504 enables operators to administer the service (these components also access the Business Components via the XML APIs, and also via published SNMP MIBs). Service provisioning 506 can be used to include a $3^{rd}$ party to monitor leak flow sensors located at a residence or company and provide alarms or send messages to the client when water leak problems are detected. If the residence or company hires a $3^{rd}$ party or has account with a $3^{rd}$ party, an insurance company and/or municipality agencies, the Order, Management and Billing Component 508 will manage this service.

The server components provide access, and management of, the objects associated with an integrated broad. It is a location where modem/router 438 and the water use and water energy use monitoring display apparatus base station 200 is located in a home or company, and is also commonly referred to as a site or premises; the site or premises can include any type of structure (e.g., home, office, warehouse, etc.) at which a modem/router 438 and the water use and water energy use monitoring display apparatus base station 200 are located. Remote devices can only access the networks to which they have been granted permission through activation (e.g. pairing process).

The low-level service management activities for the integrated system service. They define all of the remote devices, for example, the cell phone, smart phone or similar apparatus 400, computer browser. PC applications or programs or TV (with internet capability), associated with residential or corporate premise network, analyze how the devices interact, and trigger associated actions (such as sending signals to turn on or off the water system, or provide notifications to home or company owners). All changes in device states are monitored and logged for subsequent evaluation. The business components also manage all interactions with external systems as required, including sending alarms and other related self-monitoring data to the owners or the optional insurance, municipality agency or a third party monitoring station. The following Operational Support Systems (OSS) and Business Support Systems (BSS) various components manage the main elements of the integrated security system service, but the embodiment is not so limited: A Registry Manager 526 defines and manages remote devices and networks. This component is responsible for the creation, modification and termination of devices and networks. A Network Manager 524 defines and manages security and self-monitoring devices that are deployed on a network (site). This component handles the creation, modification, deletion and configuration of the devices, as well as the creation of automations, schedules and notification rules associated with those devices. An element management system 522 manages one or more of a specific type of telecommunication network elements. A Data Manager 530 manages access to current and historical state data for an existing network and its devices. This component specifically does not provide any access to network management capabilities, such as adding new devices to a network, which are handled exclusively by the Network Manager 524. To achieve optimal performance for all types of queries, data for current device states is stored separately from, but linked together, in the historical activity data (a.k.a. "logs") in the database.

Additional operational support system and business support systems direct and manage communications with certain remote devices and systems. For example, Hub Manager 530 directly manages all communications with the remotely located water use and water energy use monitoring display apparatus base station 200 and the remote devices 480 receiving information about device state changes, changing the configuration of devices, and downloading new versions or software updates to the remotely located water use and water energy use monitoring display apparatus base station 200 and/or remote devices 480 hardware. A Notification Manager 528 is responsible for sending all notifications to clients via SMS (mobile phone messages), email (via a relay server like an SMTP email server), etc. The Element Management System 522 is a Business Component that manages all activities associated with service installation, scaling and monitoring, and filters and packages service operations data for use by the service management applications.

The OSS/BSS store information about the devices that they manage in the one or more databases 536. The one or more databases 536 store information about users, networks, devices and logged activities. This database interaction is performed via an appropriate interface. For security purposes, the various OSS/BSS components manage all data storage and retrieval. The various OSS/BSS components provide web services-based APIs that provided communication routes application components use to access the various other OSS/BSS components. Business Components' capabilities. Functions of application components include presenting integrated security system service data to end-users, performing administrative duties, and integrating with external systems and back-office applications.

API (application program interface) is a set of routines, protocols, and tools for building software applications. The API specifies how software components should interact and APIs are used when programming graphical user interface (GUI) components. A good API makes it easier to develop a program by providing all the building blocks. The primary functions of the data, network and registry APIs for the OSS/BSS components include, but are not limited to, the following: A registry API 518 provides access to the various software components and hardware allowing management of networks and devices. A network API 518 provides access to the various software and hardware components, allowing management of devices on a network. A data API 518 provides access to the various software and hardware components, such as setting and retrieving (current and historical) data about device states. A provisioning API 516 provides a convenient way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The OSS/BSS components also have an XML-based device connect interface 534 for quickly adding support for new devices to the integrated security system. This interface 534 is a flexible, standards-based mechanism for defining the properties of new devices and how they can be managed. Although the format is flexible enough to allow the addition of any type of future device, pre-defined XML profiles are currently available for adding common types of devices such as new sensors 540 (e.g. water quality sensor).

Once a user sets up a service, an Activation Application Application 494 delivers a first display to the user on either a display mean on the water use and water energy use monitoring display apparatus base station 200 and/or on a display means on the remote devices 480. This pairing technology or other application secure means associates a user with a remote device 480 and the remotely water use and water energy use monitoring display apparatus base station 200. It primarily uses functionality published by the Provisioning API. Alternately, a web portal application 496 can run on PC and cell phone browsers and delivers the web-based interface to the integrated system devices. This application allows users to manage their networks (e.g. add devices and create automations) as well as to view/change device states. Because of the wide scope of capabilities of this application, it uses three different Business Component APIs that include the Registry Manager API, Network Manager API, and Data Manager API 518. A Mobile Portal 500 is a small-footprint web-based interface that runs on cell phones, mobile phones and similar apparatuses. Potentially, the interaction with the Business Components is primarily via the Data Manager API. Custom portals and targeted client applications can be provided leveraging the same Business Component APIs used by the above applications. A Content Manager Application Component 498 delivers content to a variety of users. It sends multimedia type user interface components to widget container clients (both PC and browser-based), as well as to advanced touch screen keypad clients.

A number of application components ensure overall management of the OSS/BSS service. These applications, referred to as Service Management Application Components 512, are configured to offer off-the-shelf solutions for production management of the integrated security system service including provisioning, overall service monitoring, customer support, and reporting, for example. The Service Management Application 512 allows service administrators to perform activities associated with service installation, scaling and monitoring/alerting. This application interacts heavily with the Element Management System 522 Business Component to execute its functionality, and also retrieves its monitoring data from that component via protocols. The CSR APP and Report Generator 510 is useful for provide reports in specific format for residential home owners and user, company owner and users, and/or the insurance company or a municipality agency. A Kitting Application 514 is used by employees performing service provisioning tasks. A Customer Help Desk 502 can be incorporated into the system to provide FAQs, service and maintenance calls. Service Delivery and Management 504 refers to the installing and management of the remote controllable base stations 200 at various residences and corporations. The Service Provisioning module 506 refers to the scheduling of maintenance of communication equipment and remote controllable base stations 200. The Order, Management and Billing module 508 relates to those services provided and management of services, such as monthly reports, surveillance programs, account receivables and well business costs, assets, liabilities and capital expenditures.

Figure 12:
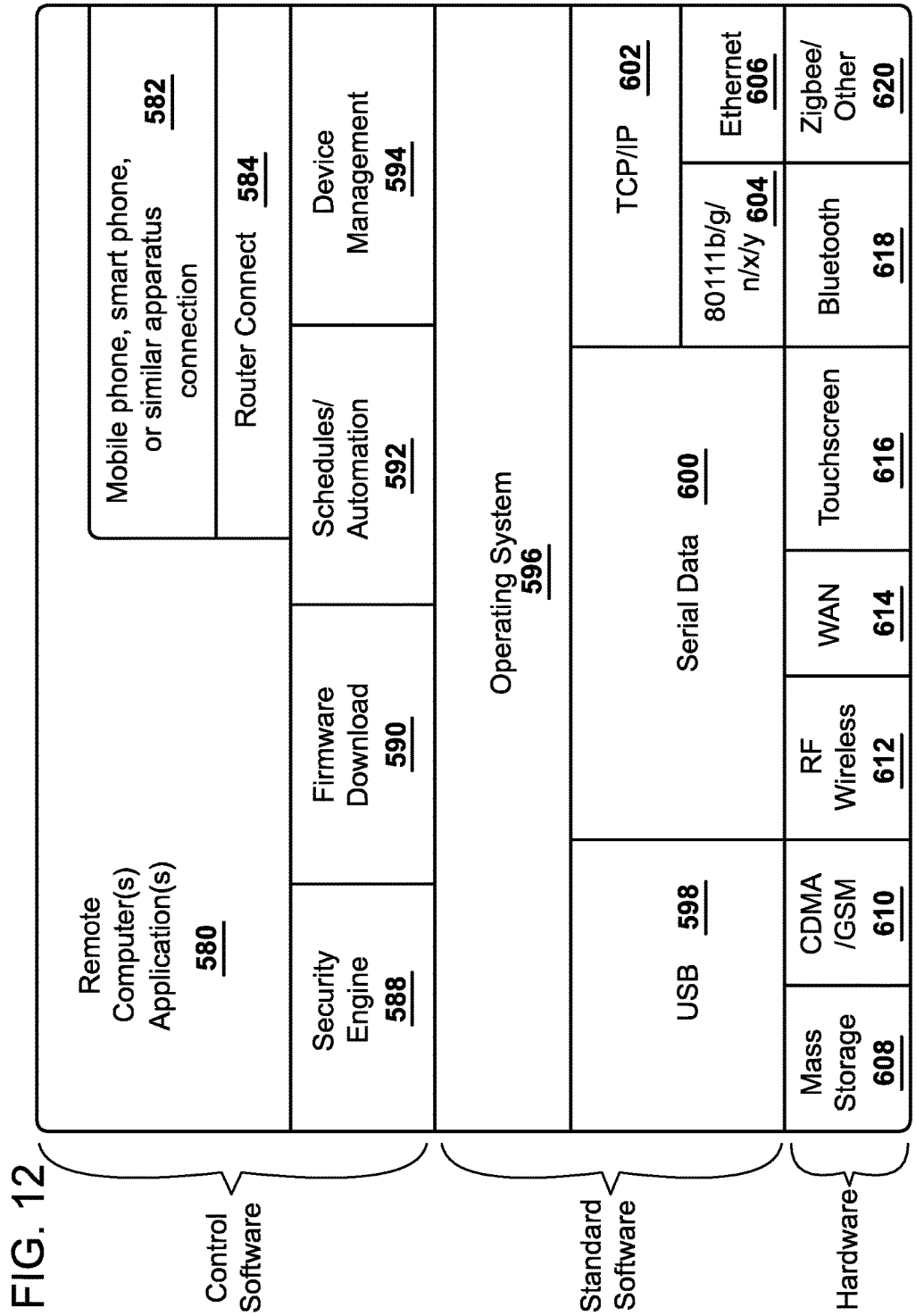
FIG. 12 is a block diagram of the more integrated software and applications.

FIG. 12 is a block diagram including base station software or applications. The base station software architecture has relatively small programmed instructions that are efficient, thereby simplifying its integration into other consumer appliances such as service routers. The software architecture also provides a high degree of security against unauthorized access. This section describes the various key components of the base station software architecture.

The control software includes a remote computer application layer 580 which is the main program that orchestrates the operations the mobile phone, smart phone or similar apparatus connection software 582, the modem/router connection 584 and the optional base LED/LCD panel connections. The Security Engine 588 provides robust protection against intentional and unintentional intrusion into the integrated water use and water energy use monitoring display and remotely controllable base station 200 (10, 126) both from inside the premises as well as from the WAN, LAN or Internet or outside premises). The Security Engine 588 comprises one or more sub-modules or components that perform functions including, but not limited to, the following: Encryption including the evolving secure socket layer (SSL) encryption to provide secure communication. Bi-directional authentication between the water use and water energy use monitoring display and remotely controllable base station 200 (10, 126) and the remote mobile phone, smart phone or similar apparatus 480 is used to confirm that the soft ware instructs have been completed. Data sent from the modem/router server 438 to the remote mobile phone, smart phone or similar apparatus 480 (or vice versa) is digitally signed as an additional layer of security. Non-repudiation technology that prevents a sender from denying that a message, data or information was sent can be incorporated to prevent fraudulent activities. Digital signing provides both authentication and validation that the data has not been altered in transit. The modem/router 438 provides for SSL encapsulation of signal data sent over the internet 434 for complete integrity. Wireless IEEE 802.11b/g/n/x with WEP, WPA-PSK [TKIP], WPA2-PSK [AES], WPA-PSK [TKIP]+WPA2-PSK [AES] or other security protocol variant to ensure that signals and communications always takes place using the strongest available protection. Attempts to activate gateway-enabled devices by intentional and unintentional intrusion are detected by the Security Engine. Pairing remote devices 480 have the information with the correct serial number or activation key (pairing) can be activated for use with the water use and water energy use monitoring display and remotely controllable base station 200 (10, 126).

As standards evolve, and new encryption and authentication methods are proven to be useful, and older mechanisms proven to be breakable, the remote mobile phone, smart phone or similar apparatus 480 and the water use and water energy use monitoring display and remotely controllable base station 200 (10, 126), or components of the OSS/BSS can be upgraded by downloading updated software wirelessly or by a physically means of swapping out electrical components to provide new and better security for communications between the remote mobile phone, smart phone or similar apparatus 480 and the water use and water energy use monitoring display and remotely controllable base station 200 (10, 126).

A firmware download module 590 allows for secure updates to the modem/router 438 or remote device firmware through the Device Management Application 594 providing a transparent hassle-free mechanism for the service provider to deploy new features and bug fixes to the installed user base. The firmware download mechanism 590 is tolerant of connection loss, power interruption and user interventions (both intentional and unintentional). Such robustness reduces down time and customer support issues.

The schedules/automation engine 582 manages the user-defined rules of interaction between the different devices and for executing the user defined schedules of the off/on water system schedules.

Device connection software 582 includes definitions of all supported devices (e.g., key chains, mobile phone, smart phone or similar apparatus 400, water sensors, etc.) using a standardized plug-in architecture. The device connection module 582 offers an interface that can be used to quickly add support for any new device as well as enabling interoperability between devices that use different technologies/protocols. For common device types, pre-defined sub-modules have been defined, making supporting new devices of these types even easier.

The device management module 594 is in charge of all discovery, installation and configuration of both wired and wireless IP devices coupled or connected to the system. Networked IP devices require user configuration of many IP and security parameters to management module of an embodiment handles the details of this configuration.

The Operating Software 596 can be any variety of operating systems such as Linux, Windows, Apples OS or other programs. The advantage of an operating system is its ability to conduct multi-tasking operations that allows more than one program to be running in concurrency. The Standard software thus can function to cooperate with the control software, the hardware layer, USB systems 598, serial data ports 600, TCP/IP protocols 602, WiFi 802.11 b/g/n/x/y and/or Ethernet ports. The Hardware layer includes mass storage discs 608, CDMA/GSM cellular circuitry 610, RF WiFi circuitry 612, WAN 614, touchscreen technology 616, BlueTooth circuitry 618, ZigBee and other wireless technology 620.

The system and method of the present invention provide an automated system that can reliably identify and report the status of flow through water fixtures found in various rooms, area, and/or facilities. In a real time, the identification of leaks can be brought to the attention of an owner or appropriate repair individual thereby offsetting costs of system implementation of the present invention by savings in water costs and benefits in water conservation.

While this invention has been described as having a preferred design, the present invention can be further modified within the spirit and scope of this disclosure. The application is therefore intended to cover any variations, uses, or adaptations of the invention using its general principles. Further, this application is intended to cover such departures from the present disclosure as come within known or customary practice and the art to which this invention pertains and which fall within the limits of the appended claims.

The invention claimed is:

1. A water use monitoring and leak detection apparatus comprising:
    a base station apparatus designed to be connected to a main water supply means;
    said base station includes a joint means for connecting to a cold/ambient water supply, or a joint means for connecting to a cold/ambient water supply and a joint means for connecting to a hot water supply, said base station have a joint means for connecting to outgoing water supply line(s) for a home residence, company or building structure;
    electrical circuitry including one or more microprocessors or microcontrollers with a power source contained with said base station apparatus;
    said power source is either AC powered, DC powered, or powered with one or more batteries, said power source is electrically connected to said electrical circuitry;
    one or more flow sensors in communication with a water supply, said one or more flow sensors in electrical communication with said electrical circuitry;
    one or more wired or wireless electrical communication means, said wired or wireless electrical communication means having the capability to transfer water parameter, water energy and/or water quality information or data to one or more remote apparatuses, said wired or wireless electrical communication means utilizes protection technology to securely provide water use, water energy and/or water quality information and/or data in a confidential format;
    said base station includes mesh-enabled circuitry that can communicate with other base stations for transferring water flow, water energy and/or water quality data;
    said base station(s) functioning as one or more access points that transfer said water flow, water energy and/or water quality data, using encryption and identification technology to an internet connection;
    said water flow, water energy and/or water quality data transferred over the internet connection to one or more remote computers or computer servers, and;
    said remote computers or servers allow registered owners and users to access their registered water flow, water energy and/or water quality data using a cell phone, smart phone, mobile phone, or a mobile electronic communication device.

2. A water use monitoring and leak detection apparatus comprising:
    a base station in close proximity to a main water supply;
    said base station includes a joint means for connecting to a cold/ambient water supply, or a joint means for connecting to a cold/ambient water supply and a joint means for connecting to a hot water supply, said base station have a joint means for connecting to outgoing water supply line(s) for a home residence, company or building structure;
    said base station further comprising a first power supply, said first power supply is either AC powered, DC powered, or powered with one or more batteries, said first power supply electrically connected to a first circuitry which has one or more microprocessors or microcontrollers;
    one or more water flow sensors in communication with a water supply, said one or more water flow sensors in electrical connection with a first electrical circuitry;
    said base station monitors and processes water parameter data including water flow, water energy, and/or water quality data;
    said base station includes software that controls and sequences the water parameter data and prepares said data for wired or wireless transfer;
    a receiving station, said receiving station having a second electrical circuitry including one or more second microprocessors, said receiving station remotely located from said base station;
    said receiving station having a second power supply, said second power supply is either AC power, DC power, or powered with one or more batteries, said second power supply electrically connected to a second circuitry;
    said first electrical circuitry of said base station is in wire or wireless communication with said second electrical circuity of said receiving station;
    said receiving station designed to establish Wi-Fi, Bluetooth or ZigBee electrical communication with a wireless router/server, and/or cellular communication with a cell tower technology, and any combinations thereof;
    said receiving station includes mesh-enabled circuitry that can communicate with other receiving stations for transferring water flow, water energy and/or water quality data to one or more access points;
    said receiving station or a custom transfer apparatus functioning as one or more access points for transferring said water flow, water energy and/or water quality data over an internet connection to one or more remote computers or computer servers; and
    said computer servers allow registered owners and users to access their registered water flow, water energy and/or water quality data using a cell phone, smart phone, mobile phone or a mobile electronic communication device.

3. The water use monitoring and leak detection apparatus of claim 1, wherein said cell phone, smart phones, mobile phones, mobile electronic communication device such as PDAs, tablets (refers to all current and variants, revisions and generations of the APPLE®, SAMSUNG®, HP®, ACER®, MICROSOFT®, NOOK®, GOOGLE®, SONY®, KINDLE® and other tablets manufactured by these and other manufactures), APPLE TOUCH®, a smart or internet capable television, wireless timepiece or wireless watch and other electronic apparatuses with Wi-Fi and wireless capability, and remote computers and controllers having internet, wireless cell format technology connectivity utilizing cellular, Wi-Fi, ZigBee and/or Bluetooth, and any combinations thereof, to communication with the remote cellular phones (with cellular equipment, public switched telephone network lines, satellite, microwave, tower and mesh technology.

4. The water use monitoring and leak detection apparatus of claim 2, wherein said cell phone, smart phones, mobile phones, mobile electronic communication device such as PDAs, tablets (refers to all current and variants, revisions and generations of the APPLE®, SAMSUNG®, HP®, ACER®, MICROSOFT®, NOOK®, GOOGLE®, SONY®, KINDLE® and other tablets manufactured by these and other manufactures), APPLE TOUCH®, a smart or internet capable television, wireless timepiece or wireless watch and other electronic apparatuses with Wi-Fi and wireless capability, and remote computers and controllers having internet, wireless cell format technology connectivity utilizing cellular, Wi-Fi, ZigBee and/or Bluetooth, and any combinations thereof, to communication with the remote cellular phones (with cellular equipment, public switched telephone network lines, satellite, microwave, tower and mesh technology.

5. The water use monitoring and leak detection apparatus of claim 1, further comprising said base station including an electronic water control valve wherein said base station is programmed to automatically turns off the main water supply when a leak is detected or alternately can send an alert signal when a leak is detected to said cell phone, smart phone, mobile phone, or other mobile electronic communication device wherein a user is provided an election to send a command to the base station to control the electronic water control valve to turn off or leave on the main water supply.

6. The water use monitoring and leak detection apparatus of claim 1, wherein said one or more water flow sensors includes independent flow sensors for the main water supply, an irrigation water supply, one or more showers, one or more hot water heaters, one or more washing machines, one or more dishwashers, one or more kitchen faucets, one or more bathroom faucets, one or more toilets, one or more refrigerator water dispenser or ice maker, a Jacuzzi water supply, a pool water supply, and/or a fountain water supply, any other water use device, or any combinations thereof.

7. The water use monitoring and leak detection apparatus of claim 1, further comprising a water use calibration mode for learning the patterns and signature of water use devices within a home, corporation, building or structure.

8. The water use monitoring and leak detection apparatus of claim 1, further comprising automatic learning mode whereby learning software privately tracks an owner's water flow and volume use for a period, assigning water patterns and water signatures to each specific water use device.

9. The water use monitoring and leak detection apparatus of claim 2, further comprising a water use calibration mode for learning the patterns and signature of water use devices within a home, corporation, building or structure.

10. The water use monitoring and leak detection apparatus of claim 2, further comprising automatic learning mode whereby learning software privately tracks an owner's water flow and volume use for a period, assigning water patterns and water signatures to each specific water use device.

11. The water use monitoring and leak detection apparatus of claim 1, wherein said cell phone, smart phones, er mobile phone, or other mobile electronic communication device utilizes geo-fencing technology to provide an owner or user information that they have traveled beyond the defined geo-fence territory and provides the owner or user the option to turn on and off the main water supply.

12. The water use monitoring and leak detection apparatus of claim 1, further comprising a water control means or a variable water flow means, said water control means or variable water flow means controlled by programming instructions from said microprocessor or microcontroller for turning on and off said water control means or setting a variable water flow means, said water control means or variable water flow means can be activated by an owner's or user's cell phone, smart phones, mobile phone, or other mobile electronic communication device, or by a remote apparatus or computer or alternately activated by said one or more wireless or wired means controlled by a municipality or governmental agency.

13. The water use monitoring and leak detection apparatus of claim 2, wherein said cell phone, smart phones, mobile phone, or other mobile electronic communication device utilizes geo-fencing technology to provide an owner or user information that they have traveled beyond the defined geo-fence territory and provides the owner or user the option to turn on and off the main water supply.

14. The water use monitoring and leak detection apparatus of claim 2, further comprising a water shut control means or a variable water flow means, said water control means or variable water flow means controlled by programming instructions from said microprocessor or microcontroller for turning on and off said water control means or setting a variable water flow means, said water control means or variable water flow means can be activated by an owner's or user's cell phone, smart phones, mobile phone, or other mobile electronic communication device, or by a remote apparatus or computer or alternately activated by said one or more wireless or wired means controlled by a municipality or governmental agency.

15. The water use monitoring and leak detection apparatus of claim 1, wherein the transfer of water use, water energy, and/or water quality can "piggy back" on smart electric and/or gas data transfer protocols whereby a third wireless means has the capability to "piggy back" or be designed to be incorporated into and/or cooperation with electric and gas smart meters communication/transmission mesh technology.

16. The water use monitoring and leak detection apparatus of claim 3, wherein said cell phone, smart phones, mobile phone, or other mobile electronic communication device with wireless communication can automatically convert back and forth from radio frequency format, ZigBee or Bluetooth format to a cellular format technology to accommodate range requirements.

17. The water use monitoring and leak detection apparatus of claim 1, wherein the base station can be incorporated into or serve as the pressure regulator or primary water meter at a residential home or commercial facility.

18. The water use monitoring and leak detection apparatus of claim 2, wherein the transfer of water use, water energy, and/or water quality can "piggy back" on smart electric and/or gas data transfer protocols whereby a third wireless means has the capability to piggy back" or be designed to be incorporated into and/or cooperation with electric and gas smart meters communication/transmission mesh technology.

19. The water use monitoring and leak detection apparatus of claim 2, wherein the base station can be incorporated into or serve as the pressure regulator or primary water meter at a residential home or commercial facility.

20. The water use monitoring and leak detection apparatus of claim 1, further comprising a water flow generation apparatus that can be utilized with rechargeable batteries, said rechargeable batteries being supplemented with electrical energy generated by a turbine or other water flow type electrical generation means in hydraulic connection with said water supply source for powering the base unit.

21. The water use monitoring and leak detection apparatus of claim 1, wherein a single flow rate sensor monitors and detects the source use for one or more main water supply, one or more irrigation system, one or more showers, one or more hot water heaters, one or more washing machines, one or more dishwashers, one or more kitchen faucets, one or more bathroom faucets, one or more toilets, one or more refrigerators with water dispenser and ice making supply lines, one or more Jacuzzi(s), one or more pool water supplies, and/or one or more fountain water supplies, any other water use device, or any combinations thereof, the base station software recording a unique water pattern or water signature for each water use device.

22. The water use monitoring and leak detection apparatus of claim 1, wherein said monitoring and water source detection can be displayed in a line, graphical or other format one or more wireless or wired remote apparatuses comprises a typical cell phone, smart phones, mobile phone, or other mobile electronic communication device.

23. The water use monitoring and leak detection apparatus of claim 2, further comprising said base station including an electronic water control valve wherein said base station is programmed to automatically turns off the main water supply when a leak is detected or alternately can send an alert signal when a leak is detected to a said cell phone, smart phone, mobile phone, or other mobile electronic communication device whereby a user is provided an election to send a command to the base station to control the electronic water control valve to turn off or leave on the main water supply.

24. The water use monitoring and leak detection apparatus of claim 2, wherein said one or more water flow sensors includes independent flow sensors for the main water supply, an irrigation water supply, one or more showers, one or more hot water heaters, one or more washing machines, one or more dishwashers, one or more kitchen faucets, one or more bathroom faucets, one or more toilets, one or more refrigerator water dispenser or ice maker, a Jacuzzi water supply, a pool water supply, and/or a fountain water supply, any other water use device, or any combinations thereof.

25. The water use monitoring and leak detection apparatus of claim 2, further comprising a water flow generation apparatus that can be utilized with rechargeable batteries, said rechargeable batteries being supplemented with electrical energy generated by a turbine or other water flow type electrical generation means in hydraulic connection with said water supply source for powering the base unit.

26. The water use monitoring and leak detection apparatus of claim 2, wherein a single flow sensor monitors and detects the source use for one or more main water supply, one or more irrigation system, one or more showers, one or more hot water heaters, one or more washing machines, one or more dishwashers, one or more kitchen faucets, one or more bathroom faucets, one or more toilets, one or more refrigerators with water dispenser and ice making supply lines, one or more Jacuzzi(s), one or more pool water supplies, and/or one or more fountain water supplies, any other water use device, or any combinations thereof, the base station software recording a unique water pattern or water signature for each water use device.

27. The water use monitoring and leak detection apparatus of claim 2, wherein said monitoring and water source detection can be displayed in a line, graphical or other format one or more wireless or wired remote apparatuses comprises a typical cell phone, smart phones, mobile phone or other mobile electronic communication device.

28. The water use monitoring apparatus of claim 1, further compromising one or more pressure sensors, said one or more pressure sensors in electrical connection with said first electrical circuitry.

29. The water use monitoring and leak detection apparatus of claim 1, further compromising one or more temperature sensors, said one or more temperature sensors in electrical connection with said first electrical circuitry.

30. The water use monitoring and leak detection apparatus of claim 1, further compromising one or more acoustic/sound monitoring sensors, said one or more acoustic/sound monitoring sensors in electrical connection with said first electrical circuitry.

31. The water use monitoring and leak detection apparatus of claim 2, further comprising one or more pressure sensors, said one or more pressure sensors in electrical connection with said first electrical circuitry.

32. The water use monitoring and leak detection apparatus of claim 2, further comprising one or more temperature sensors, said one or more temperature sensors in electrical connection with said first electrical circuitry.

33. The water use monitoring and leak detection apparatus of claim 2, further comprising one or more acoustic/sound monitoring sensors, said one or more acoustic/sound monitoring sensors in electrical connection with said first electrical circuitry.

34. The water use monitoring and leak detection apparatus of claim 4, wherein said cell phone, smart phones, mobile phone or other mobile electronic communication device with wireless communication can automatically convert back and forth from radio frequency format, ZigBee or Bluetooth format to a cellular format technology to accommodate range requirements.

* * * * *

(12) INTER PARTES REVIEW CERTIFICATE (2086th)
United States Patent (10) Number: US 9,749,792 K1
Klicpera (45) Certificate Issued: May 14, 2021

(54) WATER USE MONITORING APPARATUS

(71) Applicant: Michael Edward Klicpera

(72) Inventor: Michael Edward Klicpera

(73) Assignee: REIN TECH, INC.

Trial Number:

IPR2020-00100 filed Oct. 29, 2019

Inter Partes Review Certificate for:

Patent No.: 9,749,792
Issued: Aug. 29, 2017
Appl. No.: 14/596,460
Filed: Jan. 14, 2015

The results of IPR2020-00100 are reflected in this inter partes review certificate under 35 U.S.C. 318(b).

INTER PARTES REVIEW CERTIFICATE
U.S. Patent 9,749,792 K1
Trial No. IPR2020-00100
Certificate Issued May 14, 2021

AS A RESULT OF THE INTER PARTES REVIEW PROCEEDING, IT HAS BEEN DETERMINED THAT:

Claims 1-5, 12, 14, 17, 19, 22, 23 and 27 are cancelled.

\* \* \* \* \*